(12) United States Patent
Momo et al.

(10) Patent No.: US 10,403,879 B2
(45) Date of Patent: Sep. 3, 2019

(54) ELECTROLYTIC SOLUTION, SECONDARY BATTERY, ELECTRONIC DEVICE, AND METHOD OF MANUFACTURING ELECTRODE

(71) Applicant: Semiconductor Energy Laboratory Co., LTD., Atsugi-shi, Kanagawa-ken (JP)

(72) Inventors: Junpei Momo, Kanagawa (JP); Yohei Momma, Kanagawa (JP); Masaki Yamakaji, Kanagawa (JP); Teppei Oguni, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 609 days.

(21) Appl. No.: 14/976,504

(22) Filed: Dec. 21, 2015

(65) Prior Publication Data

US 2016/0190545 A1 Jun. 30, 2016

(30) Foreign Application Priority Data

Dec. 25, 2014 (JP) ................. 2014-263238

(51) Int. Cl.
| | |
|---|---|
| *H01M 4/04* | (2006.01) |
| *H01M 10/052* | (2010.01) |
| *H01M 10/04* | (2006.01) |
| *H01M 10/058* | (2010.01) |
| *C25D 11/00* | (2006.01) |

(Continued)

(52) U.S. Cl.
CPC ........... *H01M 4/0452* (2013.01); *C25D 11/00* (2013.01); *C25D 21/02* (2013.01); *C25D 21/10* (2013.01); *H01M 4/0445* (2013.01); *H01M 4/0471* (2013.01); *H01M 10/049* (2013.01); *H01M 10/052* (2013.01); *H01M 10/058* (2013.01); *H01M 2220/30* (2013.01)

(58) Field of Classification Search
CPC ............. H01M 4/0452; H01M 4/0445; H01M 4/0471; H01M 10/049; H01M 10/052; H01M 10/058
USPC ...................................................... 429/231.95
See application file for complete search history.

(56) References Cited

U.S. PATENT DOCUMENTS

| 4,764,853 A | 8/1988 | Thomas et al. |
|---|---|---|
| 6,134,902 A | 10/2000 | Curry |

(Continued)

FOREIGN PATENT DOCUMENTS

| JP | 08-255635 A | 10/1996 |
|---|---|---|
| JP | 10-223259 A | 8/1998 |

(Continued)

*Primary Examiner* — Amanda C. Walke
(74) *Attorney, Agent, or Firm* — Nixon Peabody LLP; Jeffrey L. Costellia

(57) ABSTRACT

To provide a method of manufacturing a lithium-ion secondary battery having stable charge characteristics and lifetime characteristics. A positive electrode is subjected to an electrochemical reaction in a large amount of electrolytic solution in advance before a secondary battery is completed. In this manner, the positive electrode can have stability. The use of the positive electrode enables manufacture of a highly reliable secondary battery. Similarly, a negative electrode is subjected to an electrochemical reaction in a large amount of electrolytic solution in advance. The use of the negative electrode enables manufacture of a highly reliable secondary battery.

22 Claims, 30 Drawing Sheets

(51) Int. Cl.
*C25D 21/02* (2006.01)
*C25D 21/10* (2006.01)

(56) References Cited

U.S. PATENT DOCUMENTS

| | | | |
|---|---|---|---|
| 7,179,561 B2 | 2/2007 | Niu et al. | |
| 7,745,047 B2 | 6/2010 | Zhamu et al. | |
| 7,842,432 B2 | 11/2010 | Niu et al. | |
| 7,939,218 B2 | 5/2011 | Niu | |
| 7,977,007 B2 | 7/2011 | Niu et al. | |
| 7,977,013 B2 | 7/2011 | Niu et al. | |
| 8,278,011 B2 | 10/2012 | Zhu et al. | |
| 8,884,845 B2 | 11/2014 | Yamazaki et al. | |
| 2005/0079423 A1 | 4/2005 | Matsubara et al. | |
| 2007/0295718 A1 | 12/2007 | Takei et al. | |
| 2008/0254296 A1 | 10/2008 | Handa et al. | |
| 2008/0261112 A1 | 10/2008 | Nagata et al. | |
| 2008/0268348 A1* | 10/2008 | Katoh | H01M 2/1673 429/323 |
| 2009/0045680 A1 | 2/2009 | Litch et al. | |
| 2009/0070988 A1 | 3/2009 | Honda et al. | |
| 2009/0123850 A1 | 5/2009 | Takeuchi et al. | |
| 2010/0035093 A1 | 2/2010 | Ruoff et al. | |
| 2010/0081057 A1 | 4/2010 | Liu et al. | |
| 2010/0143798 A1 | 6/2010 | Zhamu et al. | |
| 2010/0176337 A1 | 7/2010 | Zhamu et al. | |
| 2010/0248034 A1 | 9/2010 | Oki et al. | |
| 2010/0310941 A1 | 12/2010 | Kumta et al. | |
| 2010/0330421 A1 | 12/2010 | Cui et al. | |
| 2011/0012067 A1 | 1/2011 | Kay | |
| 2011/0111303 A1 | 5/2011 | Kung et al. | |
| 2011/0121240 A1 | 5/2011 | Amine et al. | |
| 2011/0159372 A1 | 6/2011 | Zhamu et al. | |
| 2011/0229795 A1 | 9/2011 | Niu et al. | |
| 2011/0244328 A1 | 10/2011 | Iriyama et al. | |
| 2011/0291240 A1 | 12/2011 | Yamazaki | |
| 2011/0292564 A1 | 12/2011 | Yamazaki | |
| 2012/0107680 A1* | 5/2012 | Amiruddin | H01M 4/386 429/206 |
| 2013/0017443 A1 | 1/2013 | Yamazaki | |
| 2013/0067726 A1 | 3/2013 | Kuriki et al. | |
| 2016/0111710 A1 | 4/2016 | Momo et al. | |

FOREIGN PATENT DOCUMENTS

| | | | |
|---|---|---|---|
| JP | 2002-093411 A | 3/2002 | |
| JP | 2005-157317 A | 6/2005 | |
| JP | 2006-190556 A | 7/2006 | |
| JP | 2006-216451 A | 8/2006 | |
| JP | 2008-098155 A | 4/2008 | |
| JP | 2009-076372 A | 4/2009 | |
| JP | 2013-069418 A | 4/2013 | |
| WO | WO 2012170311 A2 * | 12/2012 | H01M 4/1395 |

* cited by examiner

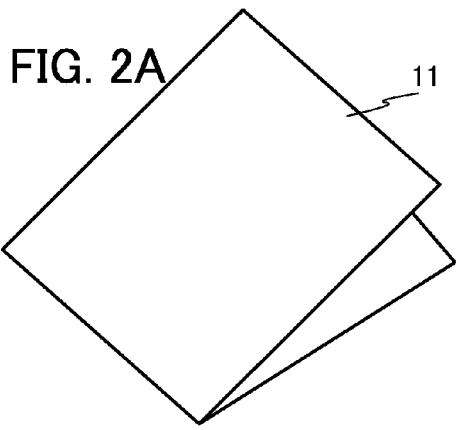
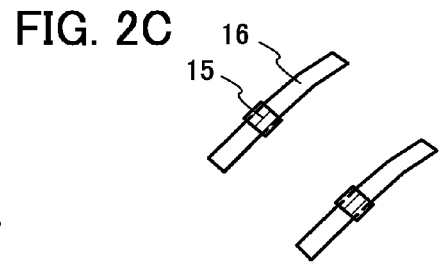
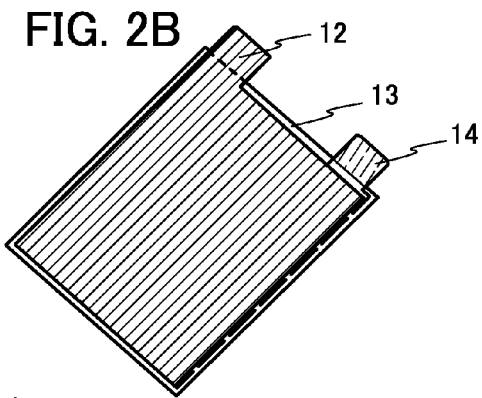
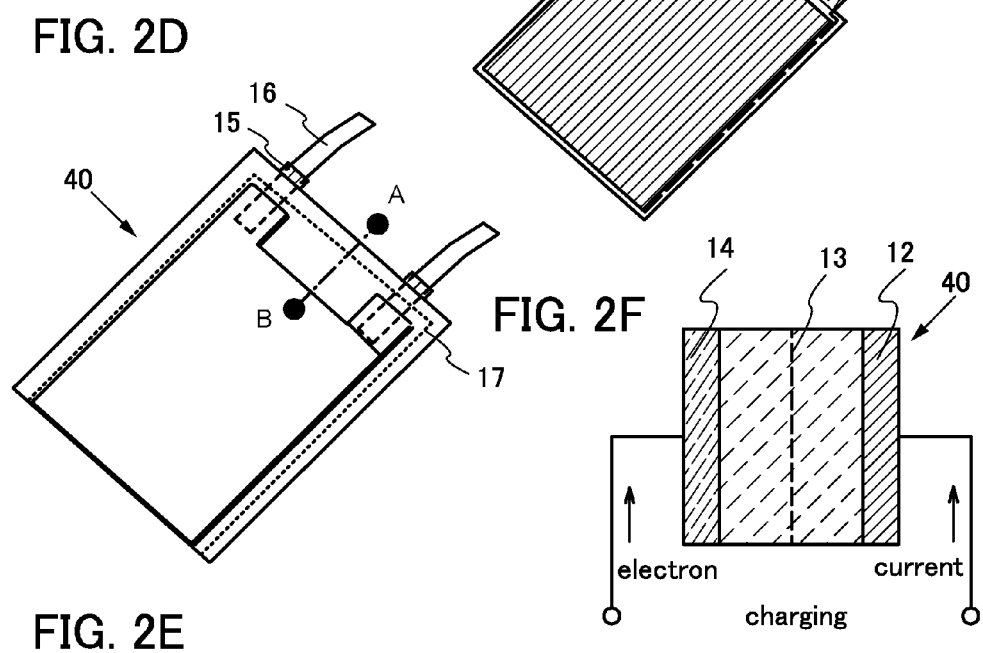
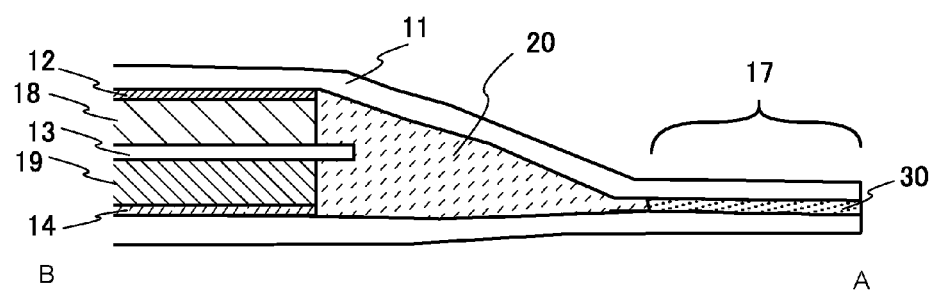

FIG. 15A
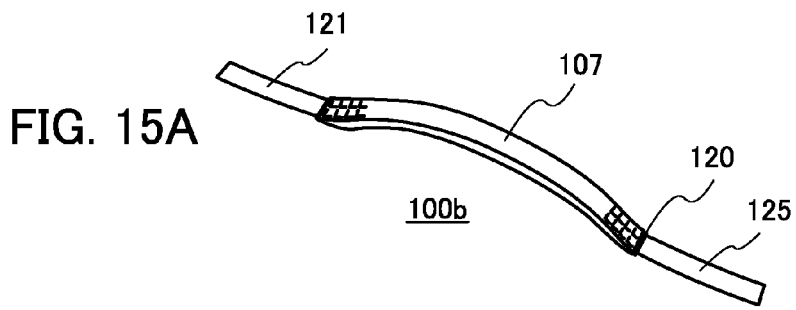
FIG. 15B
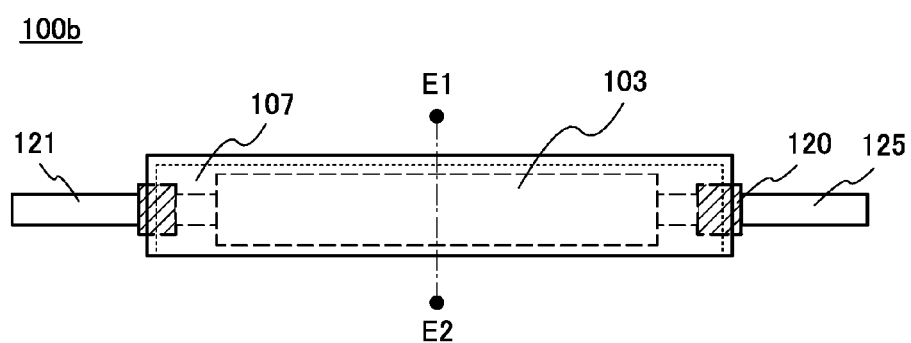
FIG. 15C1    FIG. 15C2
FIG. 15D
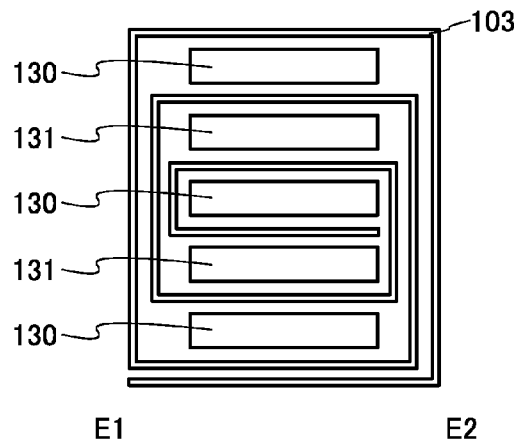

FIG. 18A1 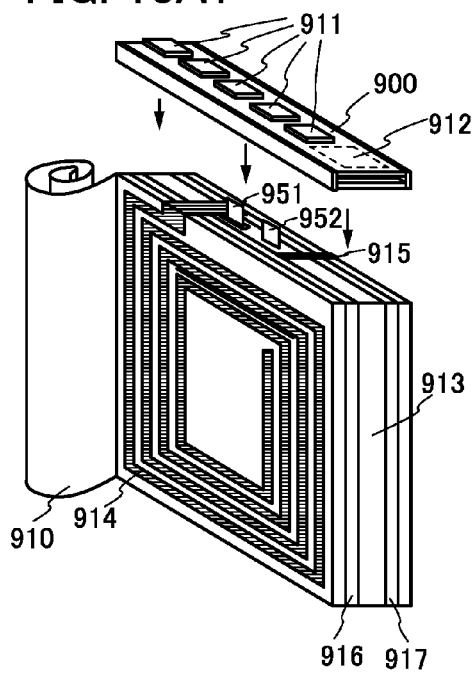
FIG. 18A2 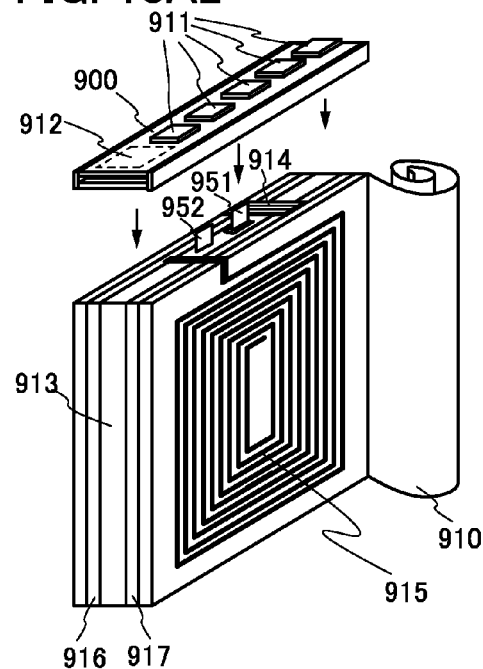
FIG. 18B1 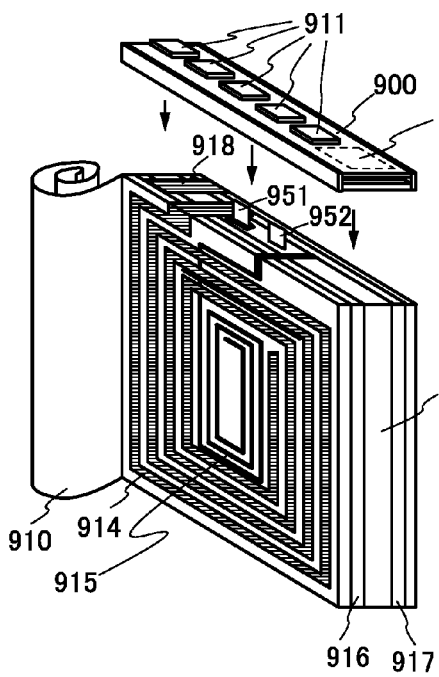
FIG. 18B2 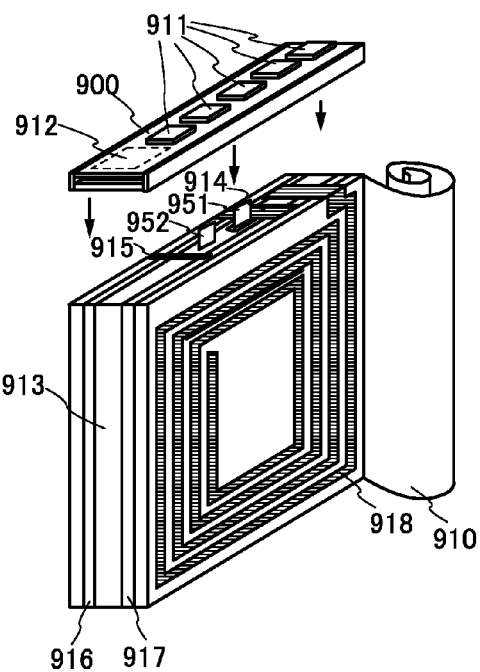

FIG. 20A
FIG. 20B
FIG. 20C
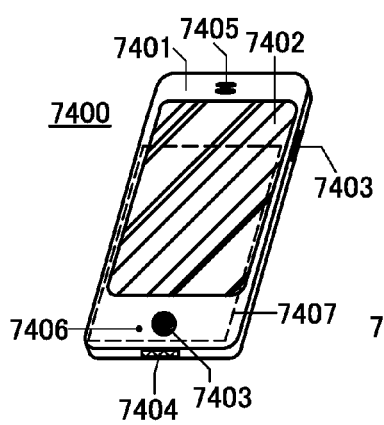
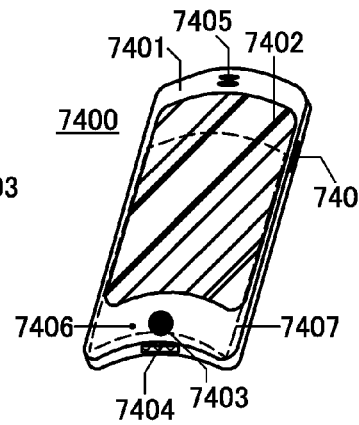
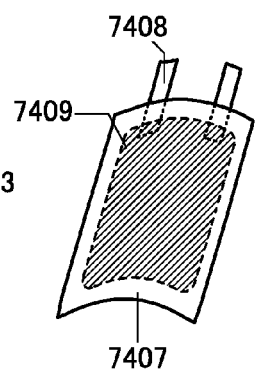
FIG. 20D
FIG. 20E
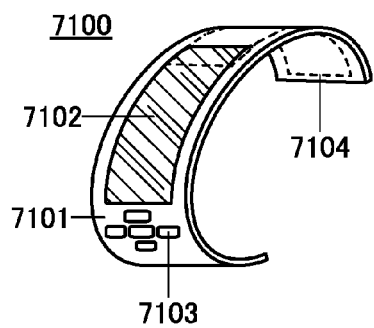
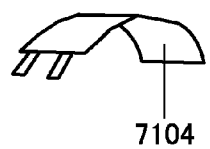
FIG. 20F
FIG. 20G
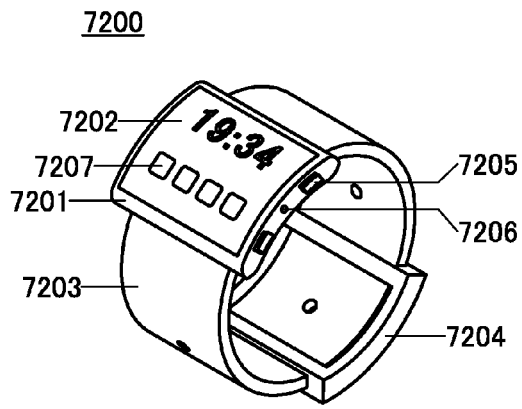
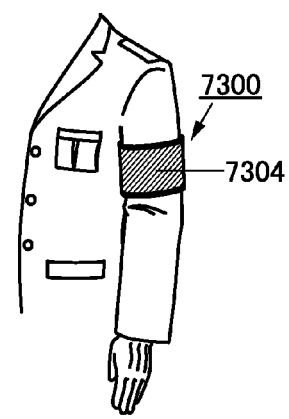

1300

ELECTROLYTIC SOLUTION, SECONDARY BATTERY, ELECTRONIC DEVICE, AND METHOD OF MANUFACTURING ELECTRODE

BACKGROUND OF THE INVENTION

1. Field of the Invention

The present invention relates to an object, a method, or a manufacturing method. The present invention relates to a process, a machine, manufacture, or a composition of matter. One embodiment of the present invention relates to a semiconductor device, a display device, a light-emitting device, a power storage device, a driving method therefor, or a manufacturing method thereof. In particular, one embodiment of the present invention relates to a manufacturing apparatus for a storage battery.

Note that electronic devices in this specification mean all devices which operate by being supplied with electric power, and electronic devices including power sources, electronic devices and electro-optical devices including power sources such as storage batteries, information terminal devices including storage batteries, vehicles including storage batteries, and the like are all electronic devices.

2. Description of the Related Art

In recent years, portable information terminals typified by smartphones have been actively developed. Portable information terminals, which are a kind of electronic devices, are desired to be lightweight and compact by users.

Patent Document 1 discloses an example of a hands-free wearable device with which information can be visually obtained anywhere, specifically, a google-type display device that includes a CPU and is capable of data communication. The device disclosed in Patent Document 1 is also a kind of electronic device.

Most wearable devices and portable information terminals include secondary batteries (also referred to as batteries) that can be repeatedly charged and discharged, and have problems in that there is a limitation on the time for operation of the wearable devices and the portable information terminals because of their light weight and compactness. Secondary batteries used in wearable devices and portable information terminals should be lightweight and should be able to be used for a long time.

Examples of secondary batteries include a nickel-metal hydride battery and a lithium-ion secondary battery. In particular, lithium-ion secondary batteries have been actively researched and developed because the capacity thereof can be increased and the size thereof can be reduced.

Electrodes serving as a positive electrode or a negative electrode of lithium-ion secondary batteries are formed using, for example, metal lithium, a carbon-based material, or an alloy-based material. Lithium-ion secondary batteries are divided into lithium metal batteries, lithium-ion secondary batteries, and lithium polymer secondary batteries according to the kind of electrolyte. Furthermore, batteries are divided into thin batteries (also referred to as laminated batteries), cylindrical batteries, coin-type batteries, and rectangular batteries according to the kind of an exterior material in which electrodes and an electrolyte are packed.

REFERENCE

Patent Document

Patent Document 1: Japanese Published Patent Application No. 2005-157317

SUMMARY OF THE INVENTION

A lithium-ion secondary battery using an electrolytic solution is manufactured in such a manner that a positive electrode (e.g., a lithium-containing oxide material), a negative electrode (e.g., carbon), or another member is surrounded by an exterior material, an electrolytic solution is put into the surrounded region, and the exterior material is sealed. The first charge is performed after the manufacture of the lithium-ion secondary battery or before sealing.

In the first charge, which is also called the initial charge, a chemical reaction occurs at an electrode interface or an electrolytic solution interface. When the electrolytic solution is decomposed near the positive electrode or the negative electrode, a gas can be generated, more particularly near the negative electrode in many cases and near the positive electrode that includes a high-potential active material. In charge, lithium ions released from a lithium-containing oxide material are transferred to and inserted into the negative electrode. At this time, the product generated by the decomposition of the electrolytic solution might react with lithium to form a component that is unnecessary for the insertion of Li. This product might affect the transfer of lithium ions and the like, leading to a change in the characteristics of the battery. Furthermore, lithium inside the battery is consumed by the formation of the product which is a component irrelevant to the battery capacity. Since lithium is not supplied from the outside, the reduction in effective carrier ions means a reduction in battery capacity.

An object of one embodiment of the present invention is to provide a method of manufacturing a lithium-ion secondary battery having stable charge characteristics and lifetime characteristics.

Another object of one embodiment of the present invention is to provide a novel electrolytic solution used for the manufacture of a lithium-ion secondary battery. Another object of one embodiment of the present invention is to provide a novel manufacturing method, a novel electrolytic solution, a novel power storage device, or a novel secondary battery.

Note that the descriptions of these objects do not preclude the existence of other objects. In one embodiment of the present invention, there is no need to achieve all the objects. Other objects will be apparent from and can be derived from the descriptions of the specification, the drawings, the claims, and the like.

In view of the above, during the manufacture of a secondary battery, an electrode is fully electrochemically reacted in a large amount of electrolytic solution to form a reaction product, typically a gas, in advance. Then, the electrode is used to manufacture the secondary battery.

Not only in the initial charge, but whenever a gas is generated in the secondary battery, the sealed region expands and thus the secondary battery expands, which might degrade the characteristics of the battery.

Before the secondary battery is completed, an electrode is subjected to an electrochemical reaction in a large amount of electrolytic solution in advance, so that the electrode can have stability. The use of the electrode enables the secondary battery to be highly reliable. Furthermore, although the initial charge also changes part of the quality of the large amount of electrolytic solution, not this large amount of electrolytic solution containing the reaction product but a small amount of electrolytic solution prepared separately is used in manufacturing the secondary battery. The use of the electrode subjected to the initial charge can reduce generation of the reaction product by a reaction with the small amount of electrolytic solution.

One embodiment of the present invention is a method of manufacturing an electrode, which includes the steps of: placing an electrode including an active material layer and a current collector into an electrolytic solution including a lithium salt; supplying a potential to the electrode; and forming a reaction product in at least one of the active material layer and the current collector.

In the method of manufacturing an electrode, the electrolytic solution includes a halogen.

In the method of manufacturing an electrode, the electrolytic solution includes fluorine.

In the method of manufacturing an electrode, the electrolytic solution includes fluorine and lithium.

In the method of manufacturing an electrode, the electrolytic solution includes perchlorate.

Another embodiment of the present invention is an electronic device including a secondary battery including the electrode manufactured by the manufacturing method, and an antenna, an operation switch, a microphone, or a speaker.

According to one embodiment of the present invention, a method of manufacturing a lithium-ion secondary battery having stable charge characteristics and lifetime characteristics can be provided.

According to one embodiment of the present invention, a novel electrolytic solution used for manufacture of a lithium-ion secondary battery can be provided. According to one embodiment of the present invention, a novel manufacturing method, a novel electrolytic solution, a novel power storage device, or a novel secondary battery can be provided.

Note that the description of the plurality of effects does not preclude the existence of other effects. In one embodiment of the present invention, there is no need to achieve all the effects described above. In one embodiment of the present invention, an object other than the above objects, an effect other than the above effects, and a novel feature will be apparent from the description of the specification and the drawings.

BRIEF DESCRIPTION OF THE DRAWINGS

In the accompanying drawings:

FIGS. 2A to 2F illustrate manufacturing steps of a thin secondary battery of one embodiment of the present invention;

FIGS. 15A and 15B are a perspective view and a top view, respectively, of a structure example of a secondary battery, and FIGS. 15C1, 15C2, and 15D are cross-sectional views thereof;

FIGS. 18A1, 18A2, 18B1, and 18B2 illustrate examples of a power storage system;

FIGS. 20A to 20G illustrate examples of electronic devices;

DETAILED DESCRIPTION OF THE INVENTION

Figure 1:
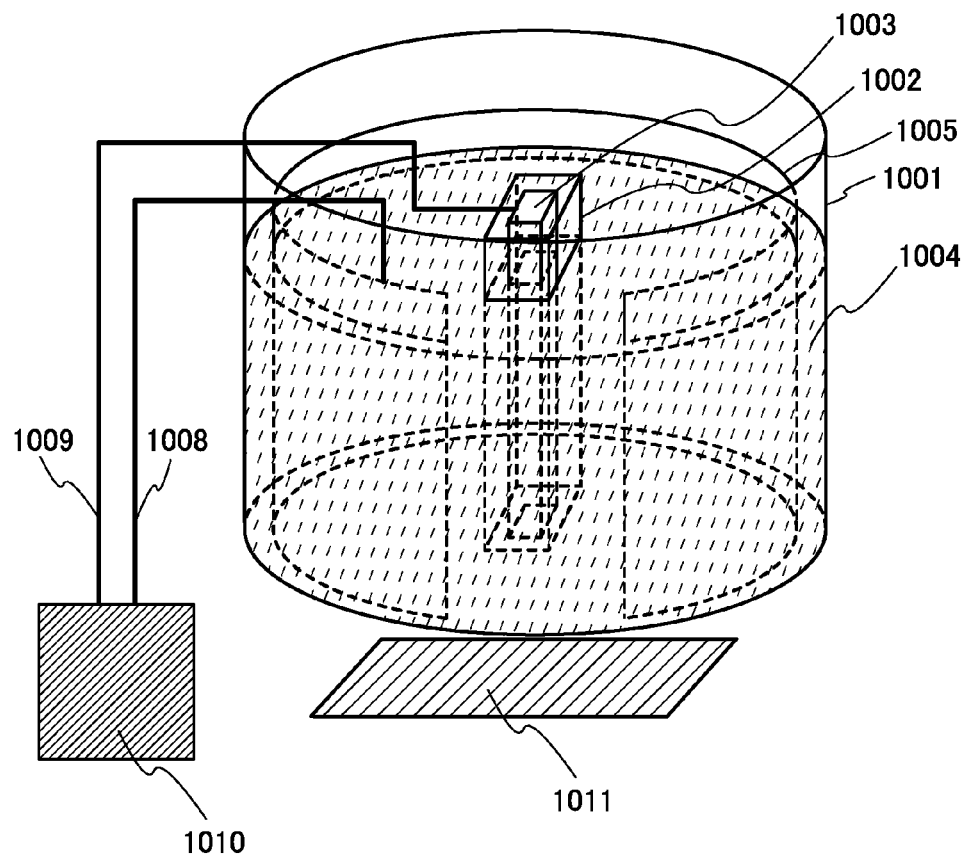
FIG. 1 is a schematic perspective view of a manufacturing apparatus of one embodiment of the present invention.

Embodiments and examples of the present invention will be described below in detail with reference to the drawings. However, the present invention is not limited to the descriptions below, and it is easily understood by those skilled in the art that modes and details disclosed herein can be modified in various ways. Furthermore, the present invention is not construed as being limited to the descriptions of the embodiments and the examples.

The term "electrically connected" includes the case where components are connected through an "object having any electric function". There is no particular limitation on the "object having any electric function" as long as electric signals can be transmitted and received between the components connected through the object. Accordingly, even when the expression "electrically connected" is used, there is a case in which no physical connection is made and a wiring is just extended in an actual circuit.

The position, size, range, or the like of each component illustrated in drawings and the like is not accurately represented in some cases for simplification. Therefore, the disclosed invention is not necessarily limited to the position, size, range, or the like disclosed in the drawings and the like. In addition, some components might not be illustrated for easy understanding.

Ordinal numbers such as "first", "second", and "third" in this specification and the like are used in order to avoid confusion among components and do not denote the priority or the order such as the order of steps or the stacking order. A term without an ordinal number in this specification and the like might be provided with an ordinal number in a claim in order to avoid confusion among components. A term with an ordinal number in this specification and the like might be provided with a different ordinal number in a claim. Moreover, a term with an ordinal number in this specification and the like might not be provided with any ordinal number in a claim.

Note that in all drawings used to illustrate the embodiments, portions that are identical or portion having similar functions are denoted by the same reference numerals, and their repetitive description may be omitted.

Embodiment 1

In this embodiment, a manufacturing method and a manufacturing apparatus for an electrode for a secondary battery of one embodiment of the present invention are described with reference to FIG. 1, FIGS. 2A to 2F, FIG. 3, FIG. 4, and FIGS. 5A to 5C.

FIG. 2A is a perspective view of an exterior body 11 of a secondary battery 40. FIG. 2B is a perspective view in which a positive electrode, a separator, and a negative electrode are stacked. FIG. 2C illustrates lead electrodes 16 for leading the positive electrode and the negative electrode to the outside of the exterior body 11, and each lead electrode includes a sealing layer 15. FIG. 2D is a perspective view of the secondary battery 40. FIG. 2E illustrates an example of a cross section of the secondary battery 40 taken along the dashed-dotted line A-B in FIG. 2D. FIG. 2F illustrates a current flow in charging the secondary battery 40.

A sheet made of a flexible base material is prepared as the exterior body 11. As the sheet, a stack, a metal film provided with an adhesive layer (also referred to as a heat-seal layer) or sandwiched between adhesive layers, is used. As the adhesive layer, a heat-seal resin film containing, e.g., polypropylene or polyethylene is used. In this embodiment, a metal sheet, specifically, aluminum foil whose top surface is provided with a nylon resin and whose bottom surface is provided with a stack including an acid-proof polypropylene film and a polypropylene film is used as the sheet. In FIG. 2A, the sheet is cut and folded in half.

The positive electrode includes at least a positive electrode current collector 12 and a positive electrode active material layer 18. The negative electrode includes at least a negative electrode current collector 14 and a negative electrode active material layer 19. Although the storage battery electrodes (the positive electrode and the negative electrode) in the shape of rectangular sheets are shown in FIG. 2B, the shape of the storage battery electrodes is not limited thereto and can be any appropriate shape. The active material layer is formed over only one surface of the current collector; however, active material layers may be formed on both surfaces of the current collector. The active material layer is not necessarily formed over an entire surface of the current collector, and a region including no active material layer, such as a region for connection to an electrode tab, is provided as appropriate.

In the secondary battery, for example, the separator 13 has a thickness of approximately 25 μm; the positive electrode current collector 12 has a thickness of approximately 20 μm to 40 μm; the positive electrode active material layer 18 has a thickness of approximately 100 μm; the negative electrode active material layer 19 has a thickness of approximately 100 μm; and the negative electrode current collector 14 has a thickness of approximately 20 μm to 40 μm.

As the positive electrode current collector and the negative electrode current collector, materials having high conductivity can be used.

The current collector in the positive electrode can be formed using, for example, a metal such as iron, nickel, copper, aluminum, titanium, tantalum, or manganese, or an alloy thereof (e.g., stainless steel). Preferably, aluminum, which improves the reversibility of the charge and discharge characteristics of the positive electrode when used as the positive electrode current collector, is used.

The current collector in the negative electrode can be formed using, for example, a metal such as iron, nickel, copper, aluminum, titanium, tantalum, or manganese, or an alloy thereof (e.g., stainless steel). Preferably, a metal that does not form an alloy with lithium, such as copper or nickel, is used.

The positive electrode current collector and the negative electrode current collector may each be coated with carbon, nickel, titanium, or the like. Furthermore, silicon, neodymium, scandium, molybdenum, or the like may be added to improve heat resistance. The positive and negative electrode current collectors can have any of various shapes including a foil-like shape, a sheet-like shape, a plate-like shape, a net-like shape, a cylindrical shape, a coil shape, a punching-metal shape, an expanded-metal shape, a porous shape, and a shape of non-woven fabric as appropriate. The positive and negative electrode current collectors may be formed to have micro irregularities on the surfaces thereof in order to enhance adhesion to active materials. The positive and negative electrode current collectors each preferably have a thickness of more than or equal to 5 μm and less than or equal to 30 μm.

As the active material used in the positive electrode or the negative electrode, a material into and from which carrier ions such as lithium ions can be inserted and extracted is used. The average diameter or diameter distribution of the active material particles can be controlled by crushing, granulation, and classification by an appropriate means.

Examples of positive electrode active materials that can be used for the positive electrode active material layer 18 include a composite oxide with an olivine structure, a composite oxide with a layered rock-salt structure, and a composite oxide with a spinel structure. Specifically, a compound such as $LiFeO_2$, $LiCoO_2$, $LiNiO_2$, $LiMn_2O_4$, $V_2O_5$, $Cr_2O_5$, or $MnO_2$ can be used.

Alternatively, a complex material ($LiMPO_4$ (general formula) (M is one or more of Fe(II), Mn(II), Co(II), and Ni(II))) can be used. Typical examples of the general formula $LiMPO_4$ which can be used as a material are lithium compounds such as $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ (a+b≤1, 0<a<1, and 0<b<1), $LiFe_cNi_dCo_ePO_4$, $LiFe_cNi_dMn_ePO_4$, $LiNi_cCo_dMn_ePO_4$ (c+d+e≤1, 0<c<1, 0<d<1, and 0<e<1), and $LiFe_fNi_gCo_hMn_iPO_4$ (f+g+h+i≤1, 0<f<1, 0<g<1, 0<h<1, and 0<i<1).

Alternatively, a complex material such as $Li_{(2-j)}MSiO_4$ (general formula) (M is one or more of Fe(II), Mn(II), Co(II), and Ni(II); j is greater than or equal to 0 and less than or equal to 2) may be used. Typical examples of the general formula $Li_{(2-j)}MSiO_4$ which can be used as a material are lithium compounds such as $Li_{(2-j)}FeSiO_4$, $Li_{(2-j)}NiSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$ ($k+l \leq 1$, $0 < k < 1$, and $0 < l < 1$), $Li_{(2-j)}Fe_mNi_nCo_qSiO_4$, $Li_{(2-j)}Fe_mNi_nMn_qSiO_4$, $Li_{(2-j)}Ni_mCo_nMn_qSiO_4$ ($m+n+q \leq 1$, $0 < m < 1$, $0 < n < 1$, and $0 < q < 1$), and $Li_{(2-j)}Fe_rNi_sCo_tMn_uSiO_4$ ($r+s+t+u \leq 1$, $0 < r < 1$, $0 < s < 1$, $0 < t < 1$, and $0 < u < 1$).

Still alternatively, a nasicon compound expressed by $A_xM_2(XO_4)_3$ (general formula) (A=Li, Na, or Mg, M=Fe, Mn, Ti, V, Nb, or Al, X=S, P, Mo, W, As, or Si) can be used for the positive electrode active material. Examples of the nasicon compound are $Fe_2(MnO_4)_3$, $Fe_2(SO_4)_3$, and $Li_3Fe_2(PO_4)_3$. Further alternatively, for example, a compound expressed by $Li_2MPO_4F$, $Li_2MP_2O_7$, or $Li_5MO_4$ (general formula) (M=Fe or Mn), a perovskite fluoride such as $FeF_3$, a metal chalcogenide (a sulfide, a selenide, or a telluride) such as $TiS_2$ and $MoS_2$, an oxide with an inverse spinel structure such as $LiMVO_4$, a vanadium oxide ($V_2O_5$, $V_6O_{13}$, $LiV_3O_8$, or the like), a manganese oxide, or an organic sulfur compound can be used as the positive electrode active material.

As the positive electrode active material, a lithium-manganese composite oxide that is represented by a composition formula $Li_xMn_yM_zO_w$ can also be used. Here, the element M is preferably silicon, phosphorus, or a metal element other than lithium and manganese, and further preferably nickel. In addition, $x/(y+z)$ is preferably larger than or equal to 0 and smaller than 2, z is larger than 0, and $(y+z)/w$ is preferably larger than or equal to 0.26 and smaller than 0.5. Note that the lithium-manganese composite oxide is an oxide containing at least lithium and manganese, and may contain at least one selected from chromium, cobalt, aluminum, nickel, iron, magnesium, molybdenum, zinc, indium, gallium, copper, titanium, niobium, silicon, phosphorus, and the like. The lithium-manganese composite oxide preferably has a layered rock-salt crystal structure. The lithium-manganese composite oxide may have a layered rock-salt crystal structure and a spinel crystal structure. The average diameter of a particle of the lithium-manganese composite oxide is preferably greater than or equal to 5 nm and less than or equal to 50 for example.

In the case where carrier ions are alkali metal ions other than lithium ions, or alkaline-earth metal ions, a material containing an alkali metal (e.g., sodium and potassium) or an alkaline-earth metal (e.g., calcium, strontium, barium, beryllium, and magnesium) instead of lithium may be used as the positive electrode active material.

The positive electrode active material layer 18 may further include a binder for increasing adhesion of active materials, a conductive additive for increasing the conductivity of the positive electrode active material layer 18, and the like in addition to the above-described positive electrode active materials.

A material with which lithium can be dissolved and precipitated or a material into and from which lithium ions can be inserted and extracted can be used for a negative electrode active material of the negative electrode active material layer 19; for example, a lithium metal, a carbon-based material, an alloy-based material, or the like can be used.

The lithium metal is preferable because of its low redox potential (3.045 V lower than that of a standard hydrogen electrode) and a high specific capacity per unit weight and per unit volume (3860 mAh/g and 2062 mAh/cm$^3$).

Examples of the carbon-based material include graphite, graphitizing carbon (soft carbon), non-graphitizing carbon (hard carbon), a carbon nanotube, graphene, carbon black, and the like.

Examples of the graphite include artificial graphite such as meso-carbon microbeads (MCMB), coke-based artificial graphite, or pitch-based artificial graphite and natural graphite such as spherical natural graphite.

Graphite has a low potential substantially equal to that of a lithium metal (0.1 V to 0.3 V vs. Li/Li$^+$) when lithium ions are intercalated into the graphite (while a lithium-graphite intercalation compound is formed). For this reason, a lithium-ion secondary battery can have a high operating voltage. In addition, graphite is preferable because of its advantages such as a relatively high capacity per unit volume, small volume expansion, low cost, and safety greater than that of a lithium metal.

For the negative electrode active material, an alloy-based material or an oxide that enables charge-discharge reactions by an alloying reaction and a dealloying reaction with lithium can be used. In the case where carrier ions are lithium ions, a material containing at least one of Al, Si, Ge, Sn, Pb, Sb, Bi, Ag, Au, Zn, Cd, In, Ga, and the like can be used as such an alloy-based material, for example. Examples of an alloy-based material including such elements are $Mg_2Si$, $Mg_2Ge$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, $InSb$, and $SbSn$.

Alternatively, for the negative electrode active material, an oxide such as SiO, SnO, $SnO_2$, titanium dioxide ($TiO_2$), lithium titanium oxide ($Li_4Ti_5O_{12}$), lithium-graphite intercalation compound ($Li_xC_6$), niobium pentoxide ($Nb_2O_5$), tungsten dioxide ($WO_2$), or molybdenum dioxide ($MoO_2$) can be used. Such elements have a higher capacity than carbon. In particular, silicon has a significantly high theoretical capacity of 4200 mAh/g. For this reason, silicon is preferably used as the negative electrode active material. Note that SiO refers to the powder of a silicon oxide including a silicon-rich portion and can also be referred to as $SiO_y$ (2>y>0). Examples of SiO include a material containing one or more of $Si_2O_3$, $Si_3O_4$, and $Si_2O$ and a mixture of Si powder and silicon dioxide ($SiO_2$). Furthermore, SiO may contain another element (e.g., carbon, nitrogen, iron, aluminum, copper, titanium, calcium, and manganese). In other words, SiO refers to a colored material containing two or more of single crystal silicon, amorphous silicon, polycrystalline silicon, $Si_2O_3$, $Si_3O_4$, $Si_2O$, and $SiO_2$. Thus, SiO can be distinguished from Si (x is 2 or more), which is clear and colorless or white. Note that in the case where a secondary battery is manufactured using SiO as a material thereof and SiO is oxidized because of repeated charge and discharge cycles, SiO is changed into $SiO_2$ in some cases.

Still alternatively, for the negative electrode active materials, $Li_{3-x}M_xN$ (M=Co, Ni, or Cu) with a $Li_3N$ structure, which is a nitride containing lithium and a transition metal, can be used. For example, $Li_{2.6}Co_{0.4}N_3$ is preferable because of high charge and discharge capacity (900 mAh/g and 1890 mAh/cm$^3$).

A nitride containing lithium and a transition metal is preferably used, in which case lithium ions are contained in the negative electrode active materials and thus the negative electrode active materials can be used in combination with a material for a positive electrode active material that does not contain lithium ions, such as $V_2O_5$ or $Cr_3O_8$. In the case of using a material containing lithium ions as a positive electrode active material, the nitride containing lithium and a transition metal can be used for the negative electrode active material by extracting the lithium ions contained in the positive electrode active material in advance.

Alternatively, a material that causes a conversion reaction can be used for the negative electrode active materials; for example, a transition metal oxide that does not cause an alloy reaction with lithium, such as cobalt oxide (CoO), nickel oxide (NiO), and iron oxide (FeO), may be used. Other examples of the material which causes a conversion reaction include oxides such as $Fe_2O_3$, CuO, $Cu_2O$, $RuO_2$, and $Cr_2O_3$, sulfides such as $CoS_{0.89}$, NiS, and CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$. Note that any of the fluorides can be used as a positive electrode active material because of its high potential.

The negative electrode active material layer 19 may further include a binder for increasing adhesion of active materials, a conductive additive for increasing the conductivity of the negative electrode active material layer 19, and the like in addition to the above negative electrode active materials.

As the separator 13, an insulator can be used. For example, cellulose (paper), polypropylene with pores, or polyethylene with pores can be used.

An electrolytic solution 20 is formed of an electrolyte and a solvent, and a material in which carrier ions can be transferred is used.

As the electrolyte, a material including a lithium salt is preferably used, and an electrolyte including a lithium salt including an ion with delocalized charge is especially preferably used. Typical examples of such an electrolyte are lithium salts such as $LiPF_6$, $LiClO_4$, $LiAsF_6$, $LiBF_4$ (lithium tetrafluoroborate), $LiCF_3SO_3$, $Li(CF_3SO_2)_2N$, $Li(C_2F_5SO_2)_2N$, and LiBOB (lithium bis(oxalato)borate). One of these electrolytes may be used alone or two or more of them may be used in an appropriate combination and in an appropriate ratio.

As the solvent of the electrolytic solution 20, an aprotic organic solvent is preferably used. Typical examples of aprotic organic solvents include ethylene carbonate (EC), propylene carbonate, dimethyl carbonate, diethyl carbonate (DEC), γ-butyrolactone, acetonitrile, dimethoxyethane, tetrahydrofuran, and the like, and one or more of these materials can be used.

When a gelled high-molecular material is used as the solvent of the electrolytic solution 20, safety against liquid leakage and the like is improved. Furthermore, the storage battery can be thinner and more lightweight. Typical examples of gelled high-molecular materials are a polyacrylate gel, a polymethacrylate gel, a polyacrylonitrile gel, a polyethylene oxide-based gel, a polypropylene oxide-based gel, a fluorine-based polymer gel, and the like.

Alternatively, the use of one or more of ionic liquids (room temperature molten salts) which have features of non-flammability and non-volatility as a solvent of the electrolytic solution 20 can prevent the storage battery from exploding or catching fire even when the storage battery internally shorts out or the internal temperature increases owing to overcharging or the like. An ionic liquid is a salt in the fluid state and has high ion mobility (conductivity). An ionic liquid contains a cation and an anion. Examples of ionic liquids include an ionic liquid containing an ethylmethylimidazolium (EMI) cation and an ionic liquid containing an N-methyl-N-propyltuberidinium ($PP_{13}$) cation.

Instead of the electrolytic solution 20, a solid electrolyte including an inorganic material such as a sulfide-based inorganic material or an oxide-based inorganic material, or a solid electrolyte including a high-molecular material such as a polyethylene oxide (PEO)-based high-molecular material may alternatively be used. When the solid electrolyte is used, a separator and a spacer are not necessary. Furthermore, the battery can be entirely solidified; therefore, there is no possibility of liquid leakage and thus the safety of the battery is dramatically increased.

Figure 3:
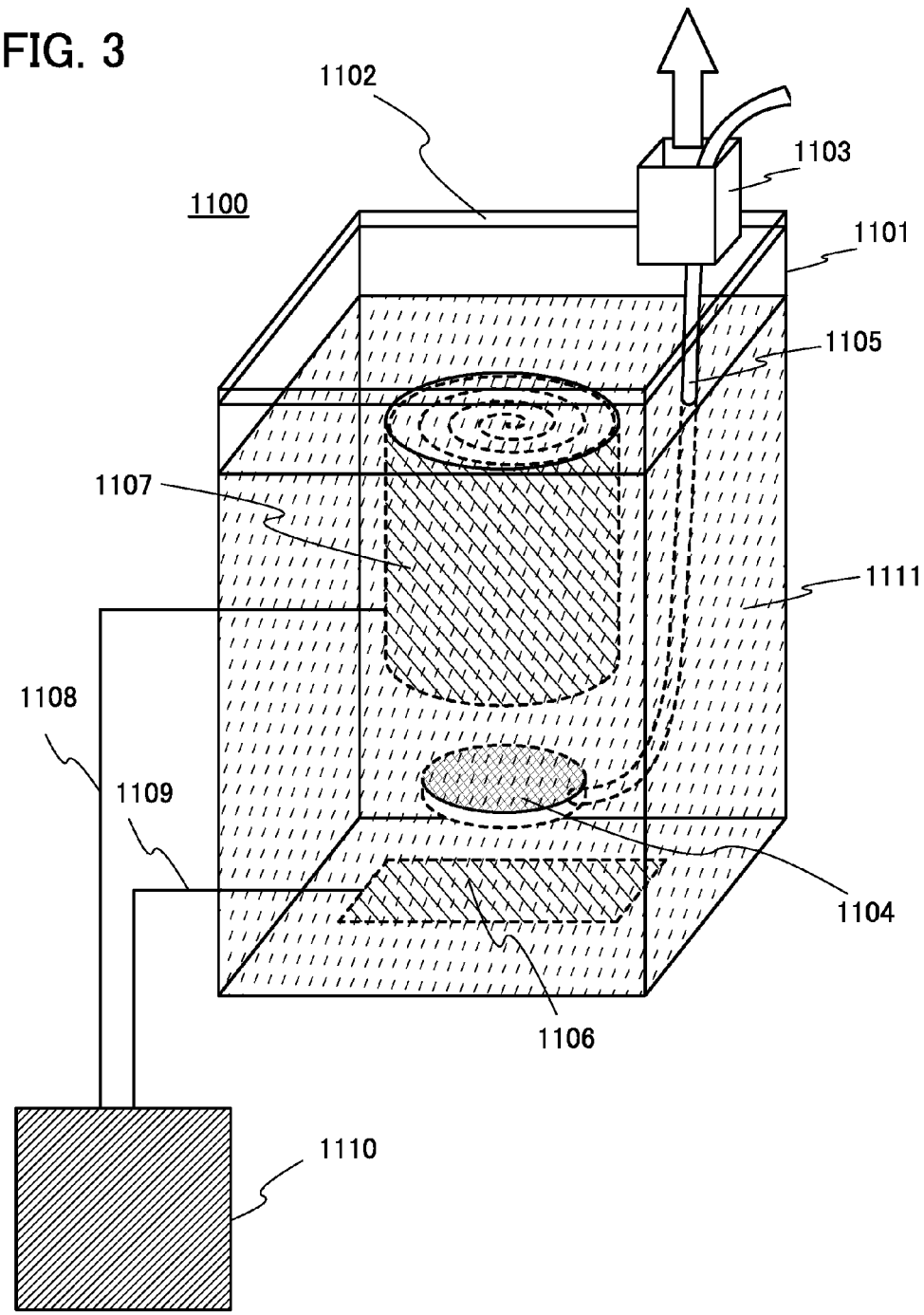
FIG. 3 is a schematic view of a manufacturing apparatus of one embodiment of the present invention.
Figure 4:
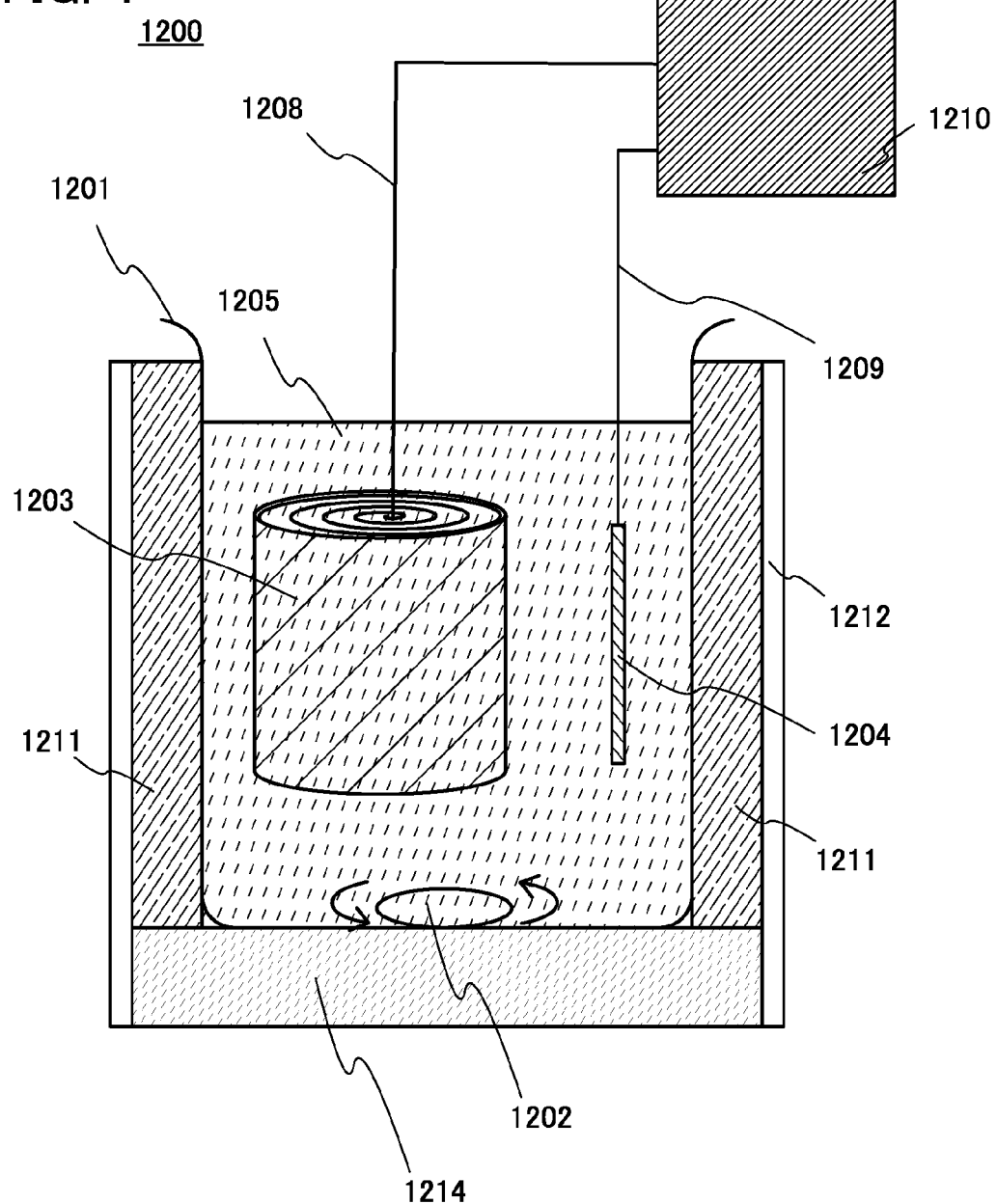
FIG. 4 is a schematic view of a manufacturing apparatus of one embodiment of the present invention.

Next, an apparatus and a processing method with which, during formation of a secondary battery, an electrode is electrochemically reacted in a large amount of electrolytic solution to form a reaction product in advance, are illustrated in FIG. 1, FIG. 3, and FIG. 4.

FIG. 1 is a schematic view illustrating a manufacturing apparatus 1000 according to one embodiment of the present invention. The manufacturing apparatus 1000 includes a container 1001, a separator 1002, a counter electrode 1003, an electrolytic solution 1004, an electrode 1005 to be treated, a first cord 1008, a second cord 1009, a control device 1010, and a heating means 1011.

The container 1001 has a function of storing an electrolytic solution. The container 1001 has a circular base in FIG. 1 but may have a rectangle base as in the manufacturing apparatus in FIG. 3 as long as the container 1001 can store an electrolytic solution. As the container, a material that is chemically and thermally stable when in contact with the electrolytic solution, such as glass, stainless steel, or resin, can be used.

Preferably, the electrolytic solution 1004 put in the container 1001 is used only in the electrochemical reaction of the positive electrode or the negative electrode. An electrolytic solution used in the secondary battery may include the same combination of constitutive materials as those in the electrolytic solution 1004, but is preferably a newly prepared one that is yet to be subjected to an electrochemical reaction, not the electrolytic solution 1004 itself used in the electrochemical reaction.

For the manufacturing apparatus and manufacturing method according to one embodiment of the present invention, in which an electrode is put in and taken out of the container before and after the electrochemical reaction, the process is preferably performed in an air atmosphere so that the apparatus does not need to have a complex structure. For this reason, as the electrolyte of the electrolytic solution, a chemically and thermally stable material is preferably used and an electrolyte including a lithium salt including an ion with delocalized charge is especially preferably used. As such an electrolyte, a plurality of halogen-containing lithium salts can be used. For example, a fluorine-containing imide lithium salt such as $Li(CF_3SO_2)_2N$ (lithium bis(trifluoromethylsulfonyl)imide, which is also referred to as "LiTFSA" or "LiTFSI"), $Li(C_2F_5SO_2)_2N$ (lithium perfluoromethylsulfomethanide, which is also referred to as "LiBETI"), or $LiN(SO_2F)_2$ (lithium bis(fluorosulfonyl)imide, which is also referred to as "LiFSA"), or a lithium salt such as $LiPF_6$ (lithium hexafluorophosphate), $LiClO_4$ (lithium perchlorate), or LiBOB (lithium bis(oxalato)borate) can be used as appropriate in consideration of the reactivity with a material forming the positive electrode or the negative electrode, and one or more of them can be used.

As the solvent of the electrolyte, an aprotic organic solvent is preferably used. Typical examples of aprotic organic solvents include ethylene carbonate (EC), propylene carbonate, dimethyl carbonate, diethyl carbonate (DEC), γ-butyrolactone, acetonitrile, dimethoxyethane, tetrahydrofuran, and the like, and one or more of these materials can be used.

A current collector (sheet-like electrode) of which one surface or both surfaces is/are provided with an active material layer (layers) as the electrode 1005 to be treated is prepared, and the sheet-like electrode is put in the electrolytic solution 1004 in the container 1001 in the manufacturing apparatus. The electrode 1005 to be treated is the positive electrode or negative electrode of the secondary battery.

The counter electrode 1003 is placed to form an electric field with the electrode 1005 to be treated thereby causing an electrochemical reaction in the electrode 1005 to be treated, and is preferably formed using lithium. Not only lithium but also a carbon-based material, such as graphite, graphitizing carbon (soft carbon), non-graphitizing carbon (hard carbon), a carbon nanotube, graphene, or carbon black, or a silicon-based material such as SiO can be used.

The electrode 1005 to be treated which is put in the electrolytic solution is electrically connected via a holding means (e.g., a conductive fastener such as a wiring clip). The holding means is electrically connected to the control device 1010 via the first cord 1008. In the method illustrated in FIG. 1, the electrode 1005 to be treated is put along the inside wall of the container 1001 and the counter electrode 1003 is put so as to be surrounded by the electrode 1005 to be treated, although the shapes of the electrodes depend on uses. The method of putting them in the container is selected according to the shapes of the electrodes such that the electrodes are held by the holding means and separated from each other so as to avoid an electrical short-circuit. Although the electrode 1005 to be treated and the counter electrode 1003 may be only spatially separated, they are preferably separated by the separator 1002, which is placed in the periphery of the counter electrode 1003, so as not to unintentionally contact each other.

As the separator 1002, an insulator can be used. For example, cellulose (paper), polyethylene with pores, or polypropylene with pores can be used.

The control device 1010 has at least two cord wirings. One of the cord wirings (first cord 1008) is electrically connected to the electrode to be treated via the holding means, and the other cord wiring (second cord 1009) is electrically connected to the counter electrode 1003. The electrolytic solution 1004 is put between the two cord wirings of the control device 1010. The control device 1010 adjusts the amount of current and voltage that are supplied and applied to the electrolytic solution 1004 between the two cord wirings, and the like to perform oxidation or reduction of the electrode 1005 to be treated placed in the electrolytic solution.

During the oxidation or reduction of the electrode 1005 to be treated, the electrolytic solution is heated by the heating means 1011. This can promote the electrochemical reaction and enable the oxidation and reduction treatment to be performed in a short time. The heating means 1011 may be placed in the container.

During the oxidation or reduction of the electrode 1005 to be treated, the electrolytic solution is stirred by a stirring means, which can promote the electrochemical reaction and enable short-time oxidation treatment and reduction treatment.

FIG. 3 is a schematic view illustrating a manufacturing apparatus 1100, which is another example according to one embodiment of the present invention. The manufacturing apparatus 1100 includes a container 1101, a lid 1102, an exhaust port 1103, an outlet 1104, a tube 1105, a counter electrode 1106, an electrode 1107 to be treated, a first cord 1108, a second cord 1109, a control device 1110, and an electrolytic solution 1111.

As illustrated in FIG. 3, the electrolytic solution 1111 can be stirred in the following method. The tube 1105 is made to pass through the exhaust port 1103 of the lid 1102 so that an end of the tube 1105 is put into the electrolytic solution 1111. An inert gas is introduced into the tube 1105 and continuously supplied into the electrolytic solution 1111 via the outlet 1104 at the end of the tube 1105. A plurality of bubbles of the inert gas are formed and move in the electrolytic solution 1111. Thus, the flow of the electrolytic solution is formed. As the inert gas, argon is preferably used.

FIG. 4 is a schematic view illustrating a manufacturing apparatus 1200, which is another example according to one embodiment of the present invention. The manufacturing apparatus 1200 includes a container 1201, a stirring means 1202, an electrode 1203 to be treated, a counter electrode 1204, an electrolytic solution 1205, a first cord 1208, a second cord 1209, a control device 1210, a heater 1211, a cover 1212, and a stand 1214.

As the stirring means 1202, a stirring bar or the like can be used as in FIG. 4. A device incorporated in the stand 1214 controls the number of rotations of the stirring means 1202.

Next, process methods in the cases where the electrode to be treated is a negative electrode and where the electrode to be treated is a positive electrode are described referring to the schematic view of the manufacturing apparatus in FIG. 1.

In the case where the electrode 1005 to be treated is a negative electrode and the control device 1010 applies an electric field between the electrode to be treated and the counter electrode 1003 to cause an electrochemical reaction, an electrolyte including a lithium salt including an ion with delocalized charge is preferably used as a component of the electrolytic solution 1004.

As such an electrolyte, a lithium salt containing a halogen is preferred. A fluorine-containing imide lithium salt such as $Li(CF_3SO_2)_2N$ (hereinafter, also referred to as "LiTFSA" or "LiTFSI"), $Li(C_2F_5SO_2)_2N$ (hereinafter, also referred to as "LiBETI"), or $LiN(SO_2F)_2$ (hereinafter, also referred to as "LiFSA") can be used.

As another lithium salt containing a halogen, $LiClO_4$ or the like can be used.

As another lithium salt containing no halogen, LiBOB (lithium bis(oxalato)borate) may be used.

Any one or combination of these lithium salts may be used.

As the solvent of the electrolyte, an aprotic organic solvent is used. Typical examples of aprotic organic solvents include ethylene carbonate (EC), propylene carbonate, dimethyl carbonate, diethyl carbonate (DEC), γ-butyrolactone, acetonitrile, dimethoxyethane, tetrahydrofuran, and the like, and one or more of these materials can be used.

With the control device 1010, a potential at a desired level is applied to each of the electrode 1005 to be treated and the counter electrode 1003 to cause an electrochemical reaction.

In the case where the electrode 1005 to be treated is a positive electrode and the control device 1010 applies an electric field between the electrode to be treated and the counter electrode 1003 to cause an electrochemical reaction, an electrolyte including a lithium salt including an ion with delocalized charge is preferably used as a component of the electrolytic solution 1004.

In such an electrolyte, for example, LiFSA as a fluorine-containing imide lithium salt can be used as a lithium salt containing a halogen. As another lithium salt containing a halogen, $LiPF_6$, $LiBF_4$, $LiClO_4$ or the like can be used.

As another lithium salt containing no halogen, LiBOB (lithium bis(oxalato)borate) may be used.

Any one or combination of these lithium salts may be used.

As the solvent of the electrolyte, an aprotic organic solvent is used. Typical examples of aprotic organic solvents include ethylene carbonate (EC), propylene carbonate, dimethyl carbonate, diethyl carbonate (DEC), γ-butyrolactone, acetonitrile, dimethoxyethane, tetrahydrofuran, and the like, and one or more of these materials can be used.

A fluorine-containing solvent or an additive agent can further be used. For example, fluoroethylene carbonate (FEC) is preferably used as an additive agent that improves characteristics of a secondary battery.

With the control device 1010, a potential at a desired level is applied to each of the electrode 1005 to be treated and the counter electrode 1003 to cause an electrochemical reaction.

To the positive electrode, a potential higher than the standard electrode potential is applied in many cases. This can dissolve the metal included in the positive electrode current collector. Since a metal such as aluminum has a surface provided with aluminum oxide as a passivating film, this film prevents the dissolution of the metal.

Although chemically and thermally stable, the fluorine-containing imide lithium salt might react with metal included in a current collector, and, in particular, is likely to react with and dissolve aluminum used as a current collector.

However, a lithium salt such as $LiPF_6$ or $LiBF_4$ can react with the metal included in the positive electrode current collector and form a halide of the metal. For example, with the use of aluminum as the metal included in the positive electrode current collector, a lithium salt of a fluorine-based material such as $LiPF_6$ or $LiBF_4$ can react with aluminum and form aluminum fluoride. A film of the halide of the metal serves as a protective film to prevent the dissolution from the current collector.

Although fluorine is not contained in $LiClO_4$, $LiClO_4$ can react with the metal included in the positive electrode current collector. For example, with the use of aluminum as the metal included in the positive electrode current collector, aluminum oxide can be formed in the electrolytic solution. A film of aluminum oxide prevents and keeps the dissolution of the metal included in the positive electrode current collector from continuing even when a potential higher than the standard electrode potential is applied.

Thus, for the process of the positive electrode, to form the protective film preventing the dissolution from the current collector on a current collector surface is effective. To form this film, it is preferable that a fluorine-containing imide lithium salt such as LiTFSA or LiFSA or a lithium salt such as $LiPF_6$ or $LiBF_4$ be used as a lithium salt, and that an electrolyte in which $LiClO_4$ is mixed be further used.

After an electrochemical reaction (oxidation or reduction), the electrode 1005 to be treated is taken out of the electrolytic solution 1004 in the container. Then, the electrode 1005 to be treated is dried and processed into a desired shape. A stack of the positive electrode, the separator, and the negative electrode is packed and an electrolytic solution is introduced in a region surrounded by the exterior body 11 having an opening. The opening of the exterior body 11 is closed by thermocompression. A thermocompression-bonded region 17 is illustrated in FIGS. 2D and 2E. In this manner, the secondary battery illustrated in FIG. 2E can be manufactured.

Here, the current flow in charging the secondary battery is described with reference to FIG. 2F. When a secondary battery using lithium is regarded as a closed circuit, lithium ions transfer and a current flows in the same direction. Note that in the secondary battery using lithium, an anode and a cathode change places in charge and discharge, and an oxidation reaction and a reduction reaction occur on the corresponding sides; hence, an electrode with a high redox potential is called a positive electrode and an electrode with a low redox potential is called a negative electrode. For this reason, in this specification, the positive electrode is referred to as a "positive electrode" and the negative electrode is referred to as a "negative electrode" in all the cases where charge is performed, discharge is performed, a reverse pulse current is supplied, and a charging current is supplied. The use of the terms "anode" and "cathode" related to an oxidation reaction and a reduction reaction might cause confusion because the anode and the cathode change places at the time of charging and discharging. Thus, the terms "anode" and "cathode" are not used in this specification. If the term "anode" or "cathode" is used, it should be mentioned that the anode or the cathode is which of the one at the time of charging or the one at the time of discharging and corresponds to which of a positive electrode or a negative electrode.

Two terminals in FIG. 2F are connected to a charger, and the secondary battery 40 is charged. As the charge of the secondary battery 40 proceeds, a potential difference between the electrodes increases. The positive direction in FIG. 2F is the direction in which a current flows from one terminal outside the secondary battery 40 to the positive electrode current collector 12, flows from the positive electrode current collector 12 to the negative electrode current collector 14 in the secondary battery 40, and flows from the negative electrode to the other terminal outside the secondary battery 40. In other words, a current flows in the direction of a flow of a charging current.

Although an example of a small battery used in a portable information terminal or the like is described in this embodiment, one embodiment of the present invention is not limited to this example. Application to a large battery provided in a vehicle or the like is also possible.

According to one embodiment of the present invention, the initial irreversible capacity of the positive electrode and the negative electrode can be reduced, and a secondary battery having a high electrode capacity, high-speed charge and discharge characteristics, and improved cycle performance can be provided.

In Embodiment 1, one embodiment of the present invention is described. Other embodiments of the present invention are described in Embodiments 2 to 6. Note that one embodiment of the present invention is not limited thereto. That is, various embodiments of the invention are described in Embodiments 1 to 6, and thus one embodiment of the present invention is not limited to a specific embodiment. Although an example of application to a lithium-ion secondary battery is described as one embodiment of the present invention, one embodiment of the present invention is not limited to this example. Depending on circumstances or conditions, one embodiment of the present invention can be used for a variety of secondary batteries such as a lead storage battery, a lithium-ion polymer secondary battery, a nickel-hydrogen storage battery, a nickel-cadmium storage battery, a nickel-iron storage battery, a nickel-zinc storage battery, a silver oxide-zinc storage battery, a solid-state battery, an air battery, a primary battery, a capacitor, and a lithium ion capacitor. Furthermore, depending on circumstances or conditions, for example, one embodiment of the present invention is not necessarily used for a lithium-ion secondary battery.

This embodiment can be implemented in an appropriate combination with any of the structures described in the other embodiments.

Embodiment 2

In this embodiment, a variety of modes of power storage devices manufactured according to one embodiment of the present invention will be described.

[Coin-Type Storage Battery]

Figure 5A:
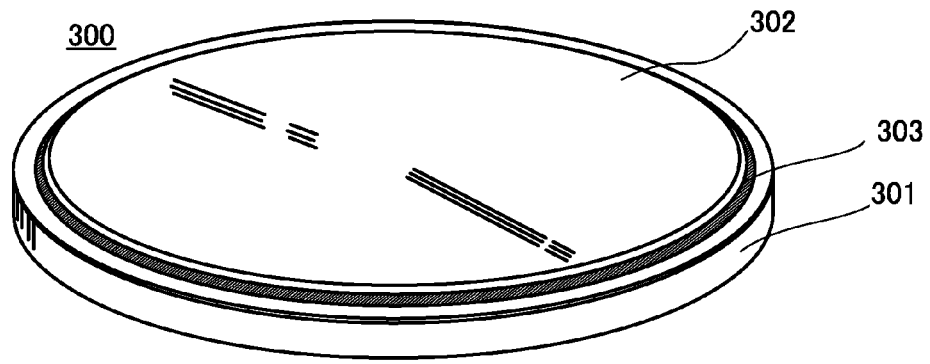
FIGS. 5A and 5B illustrate coin-type secondary batteries.
Figure 5B:
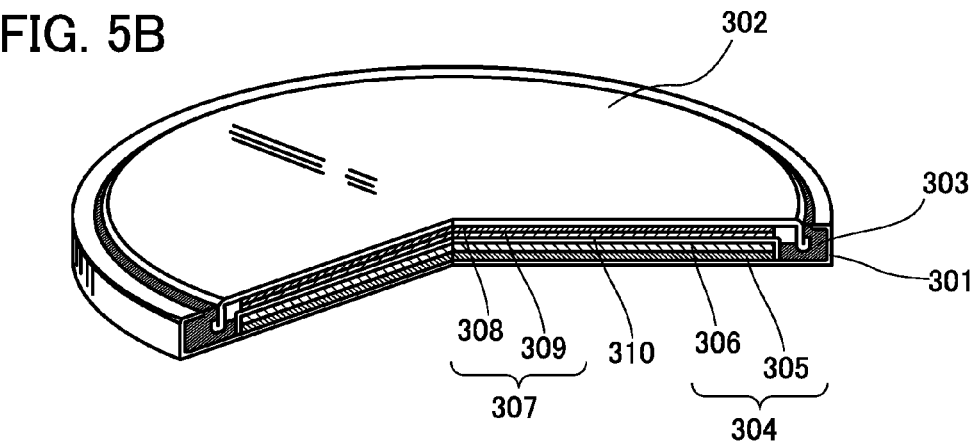

FIG. 5A is an external view of a coin-type (single-layer flat type) storage battery, and FIG. 5B is a cross-sectional view thereof.

In a coin-type storage battery 300, a positive electrode can 301 doubling as a positive electrode terminal and a negative electrode can 302 doubling as a negative electrode terminal are insulated from each other and sealed by a gasket 303 made of polypropylene or the like. A positive electrode 304 includes a positive electrode current collector 305 and a positive electrode active material layer 306 provided in contact with the positive electrode current collector 305. The positive electrode active material layer 306 may further include a binder for increasing adhesion of positive electrode active materials, a conductive additive for increasing the conductivity of the positive electrode active material layer, and the like in addition to the active materials. As the conductive additive, a material that has a large specific surface area is preferably used; for example, acetylene black (AB) can be used. Alternatively, a carbon material such as a carbon nanotube, graphene, or fullerene can be used.

A negative electrode 307 includes a negative electrode current collector 308 and a negative electrode active material layer 309 provided in contact with the negative electrode current collector 308. The negative electrode active material layer 309 may further include a binder for increasing adhesion of negative electrode active materials, a conductive additive for increasing the conductivity of the negative electrode active material layer, and the like in addition to the negative electrode active materials. A separator 310 and an electrolyte (not illustrated) are provided between the positive electrode active material layer 306 and the negative electrode active material layer 309.

Any of the materials described in Embodiment 1 is used as a negative electrode active material in the negative electrode active material layer 309. Before a battery is assembled, oxidation treatment and reduction treatment are performed on the negative electrode 307 in an electrolytic solution with the use of the apparatus described in Embodiment 1.

Any of the materials for the current collectors that are described in Embodiment 1 is used for the current collectors such as the positive electrode current collector 305 and the negative electrode current collector 308.

For the positive electrode active material layer 306 and the negative electrode active material layer 309, a material into and from which lithium ions can be inserted and extracted can be used. For example, any of the materials for the positive electrode active material layer that are described in Embodiment 1 is used. Before a battery is assembled, oxidation treatment and reduction treatment are performed on the positive electrode 304 in an electrolytic solution with the use of the apparatus described in Embodiment 1.

As the separator 310, an insulator can be used. For example, cellulose (paper), polyethylene with pores, or polypropylene with pores can be used.

As the electrolyte of the electrolytic solution, a material which contains carrier ions is used. Typical examples of the electrolyte are lithium salts such as $LiPF_6$, $LiClO_4$, $LiAsF_6$, $LiBF_4$, $LiCF_3SO_3$, $Li(CF_3SO_2)_2N$, and $Li(C_2F_5SO_2)_2N$. One of these electrolytes may be used alone, or two or more of them may be used in an appropriate combination and in an appropriate ratio.

Note that when carrier ions are alkali metal ions other than lithium ions, or alkaline-earth metal ions, instead of lithium in the above lithium salts, an alkali metal (e.g., sodium and potassium), an alkaline-earth metal (e.g., calcium, strontium, barium, beryllium, and magnesium) may be used for the electrolyte.

As a solvent of the electrolytic solution, a material in which carrier ions can be transferred is used. As the solvent of the electrolytic solution, an aprotic organic solvent is preferably used. Typical examples of aprotic organic solvents include ethylene carbonate (EC), propylene carbonate, dimethyl carbonate, diethyl carbonate (DEC), γ-butyrolactone, acetonitrile, dimethoxyethane, tetrahydrofuran, and the like, and one or more of these materials can be used. When a gelled high-molecular material is used as the solvent of the electrolytic solution, safety against liquid leakage and the like is improved. Furthermore, the storage battery can be thinner and more lightweight. Typical examples of gelled high-molecular materials are a silicone gel, a polyacrylate gel, a polymethacrylate gel, a polyacrylonitrile gel, a polyethylene oxide-based gel, a fluorine-based polymer gel, and the like. Alternatively, the use of one or more kinds of ionic liquids (room temperature molten salts) which have features of non-flammability and non-volatility as a solvent of the electrolytic solution can prevent the storage battery from exploding or catching fire even when the storage battery internally shorts out or the internal temperature increases owing to overcharging and others.

For the positive electrode can 301 and the negative electrode can 302, a metal having a corrosion-resistant property to an electrolytic solution, such as nickel, aluminum, or titanium, an alloy of such a metal, or an alloy of such a metal and another metal (e.g., stainless steel or the like) can be used. Alternatively, the positive electrode can 301 and the negative electrode can 302 are preferably covered with nickel, aluminum, or the like in order to prevent corrosion due to the electrolytic solution. The positive electrode can 301 and the negative electrode can 302 are electrically connected to the positive electrode 304 and the negative electrode 307, respectively.

The negative electrode 307, the positive electrode 304, and the separator 310 are immersed in the electrolytic solution. Then, as illustrated in FIG. 5B, the positive electrode 304, the separator 310, the negative electrode 307, and the negative electrode can 302 are stacked in this order with the positive electrode can 301 positioned at the bottom, and the positive electrode can 301 and the negative electrode can 302 are subjected to pressure bonding with the gasket 303 interposed therebetween. In such a manner, the coin-type storage battery 300 can be manufactured.

Figure 5C:
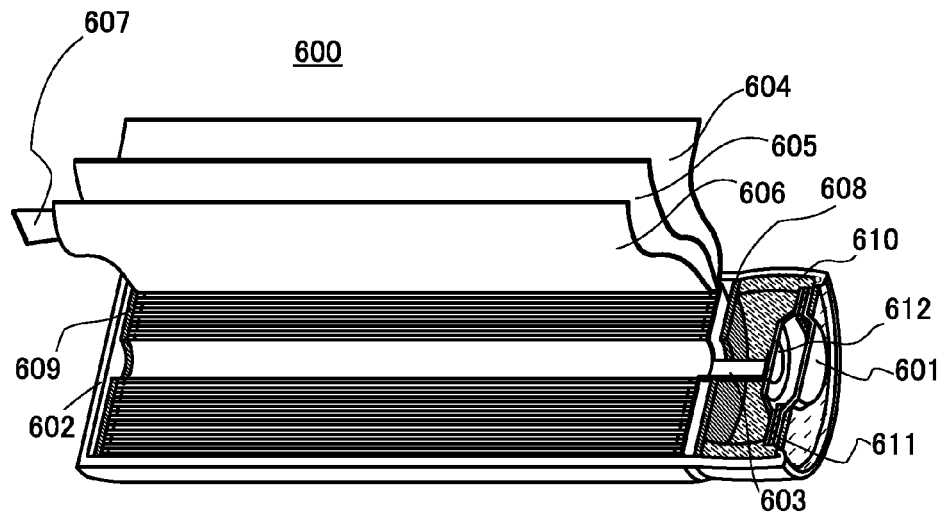
FIG. 5C illustrates a cylindrical secondary battery.

FIG. 5C illustrates an example of a cylindrical storage battery. FIG. 5C is a schematic cross-sectional view of the cylindrical storage battery 600. The cylindrical storage battery 600 includes a positive electrode cap (battery lid) 601 and a battery can (outer can) 602. The positive electrode cap 601 and the battery can 602 are insulated from each other by a gasket (insulating gasket) 610.

Inside the battery can 602 having a hollow cylindrical shape, a battery element in which a strip-like positive electrode 604 and a strip-like negative electrode 606 are wound with a stripe-like separator 605 interposed therebetween is provided. Although not illustrated, the battery element is wound around a center pin. One end of the battery can 602 is close and the other end thereof is open. For the battery can 602, a metal having a corrosion-resistant property to an electrolytic solution, such as nickel, aluminum, or titanium, an alloy of such a metal, or an alloy of such a metal and another metal (e.g., stainless steel or the like) can be used. Alternatively, the battery can 602 is preferably covered with nickel, aluminum, or the like in order to prevent corrosion due to the electrolytic solution. Inside the battery can 602, the battery element in which the positive electrode, the negative electrode, and the separator are wound is provided between a pair of insulating plates 608 and 609 that face each other. Furthermore, a nonaqueous electrolytic solution (not illustrated) is injected inside the battery can 602 provided with the battery element. As the nonaqueous electrolytic solution, a nonaqueous electrolytic solution that is similar to those of the coin-type storage battery and a laminate storage battery can be used.

Although the positive electrode 604 and the negative electrode 606 can be formed in a manner similar to that of the positive electrode and the negative electrode of the coin-type storage battery 600 described above, the difference lies in that, since the positive electrode and the negative electrode of the cylindrical storage battery are wound, active materials are formed on both sides of the current collectors. A positive electrode terminal (positive electrode current collecting lead) 603 is connected to the positive electrode 604, and a negative electrode terminal (negative electrode current collecting lead) 607 is connected to the negative electrode 606. Both the positive electrode terminal 603 and the negative electrode terminal 607 can be formed using a metal material such as aluminum. The positive electrode terminal 603 and the negative electrode terminal 607 are resistance-welded to a safety valve mechanism 612 and the bottom of the battery can 602, respectively. The safety valve mechanism 612 is electrically connected to the positive electrode cap 601 through a positive temperature coefficient (PTC) element 611. The safety valve mechanism 612 cuts off electrical connection between the positive electrode cap 601 and the positive electrode 604 when the internal pressure of the battery exceeds a predetermined threshold value. The PTC element 611, which serves as a thermally sensitive resistor whose resistance increases as temperature rises, limits the amount of current by increasing the resistance, in order to prevent abnormal heat generation. Note that barium titanate ($BaTiO_3$)-based semiconductor ceramic can be used for the PTC element.

Note that in this embodiment, the coin-type storage battery and the cylindrical storage battery are given as examples of the storage battery; however, any of storage batteries with a variety of shapes, such as a sealed storage battery and a square-type storage battery, can be used. Furthermore, a structure in which a plurality of positive electrodes, a plurality of negative electrodes, and a plurality of separators are stacked or wound may be employed.

[Thin Storage Battery 1]

Figure 6:
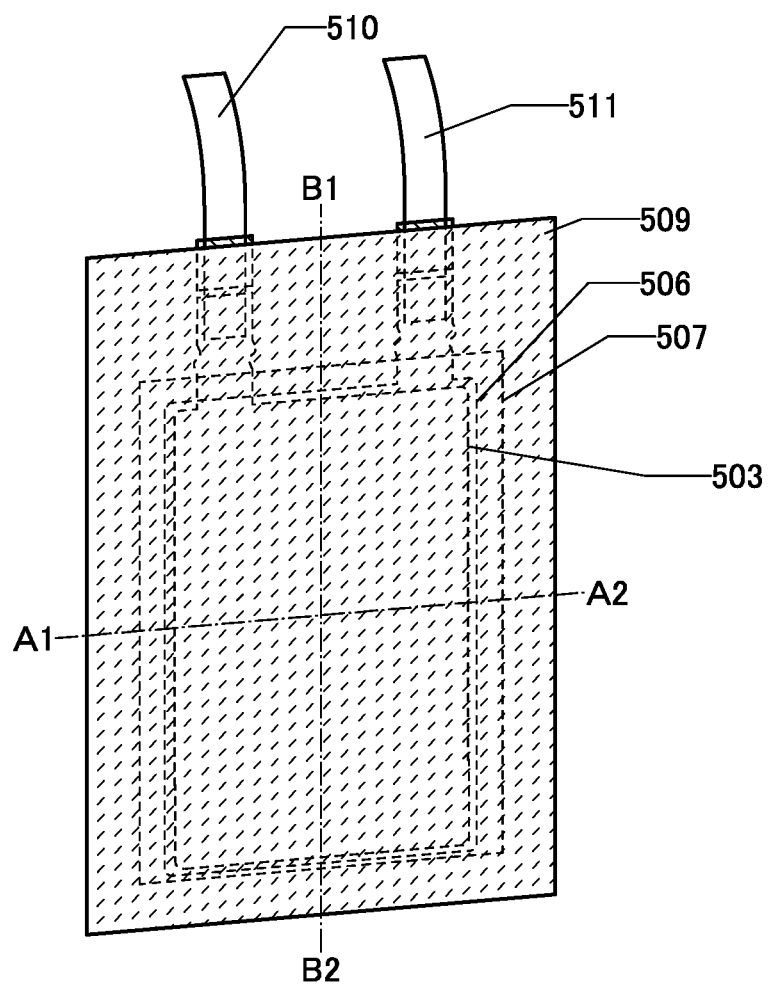
FIG. 6 illustrates a thin storage battery.

FIG. 6 illustrates a thin storage battery as an example of a storage device. When a flexible thin storage battery is used in an electronic device at least part of which is flexible, the storage battery can be bent as the electronic device is bent.

Figure 7A:
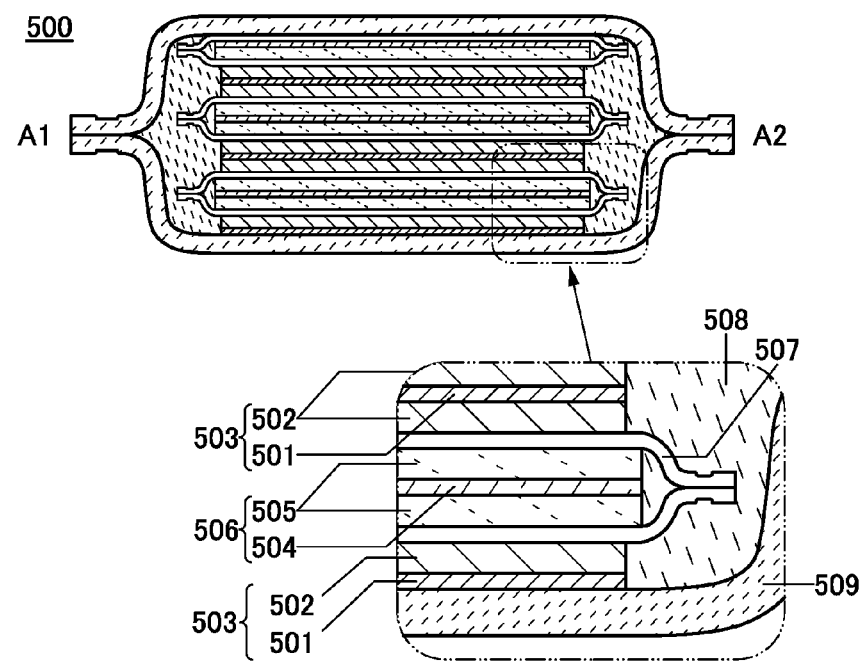
FIGS. 7A and 7B are cross-sectional views of electrodes.
Figure 7B:
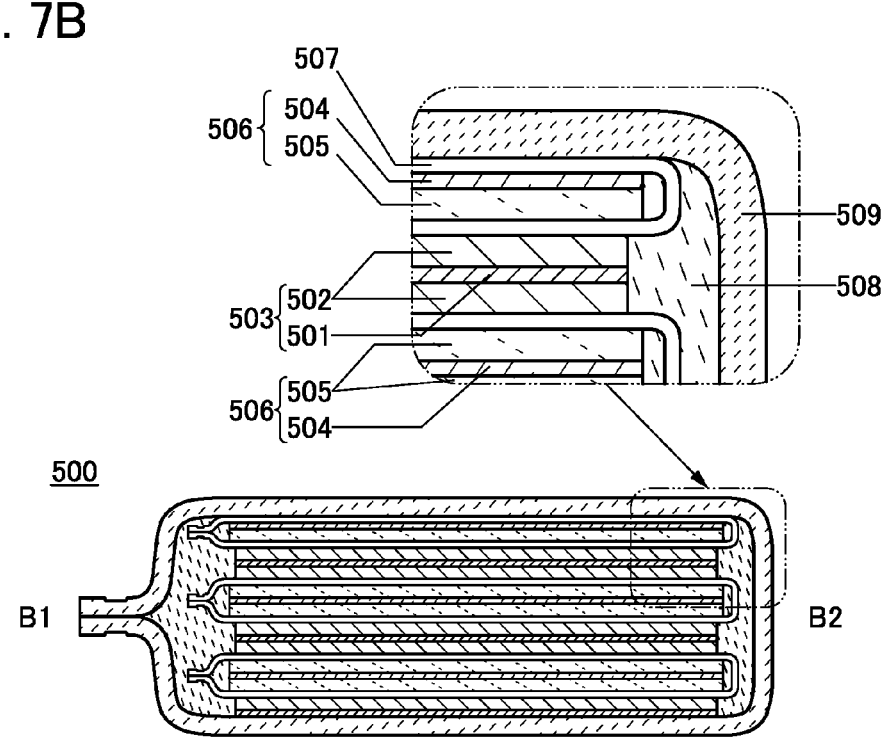

FIG. 6 is an external view of a thin storage battery 500. FIG. 7A is a cross-sectional view along the dashed-dotted line A1-A2 in FIG. 6, and FIG. 7B is a cross-sectional view along the dashed-dotted line B1-B2 in FIG. 6. The thin storage battery 500 includes a positive electrode 503 including a positive electrode current collector 501 and a positive electrode active material layer 502, a negative electrode 506 including a negative electrode current collector 504 and a negative electrode active material layer 505, a separator 507, an electrolytic solution 508, and an exterior body 509. The separator 507 is placed between the positive electrode 503 and the negative electrode 506, which are provided in a region surrounded by the exterior body 509. The electrolytic solution 508 is included in the region surrounded by the exterior body 509.

As at least one of the positive electrode 503 and the negative electrode 506, the electrode of one embodiment of the present invention is used. The electrode of one embodiment of the present invention may be used as both the positive electrode 503 and the negative electrode 506.

Here, a structure of the positive electrode 503 is described. The electrode of one embodiment of the present invention is preferably used as the positive electrode 503. Here, an example of using the electrode described in Embodiment 1 as the positive electrode 503 is described.

For the electrolytic solution 508 and the separator 507, the materials described in Embodiment 1 can be used.

Figure 8A:
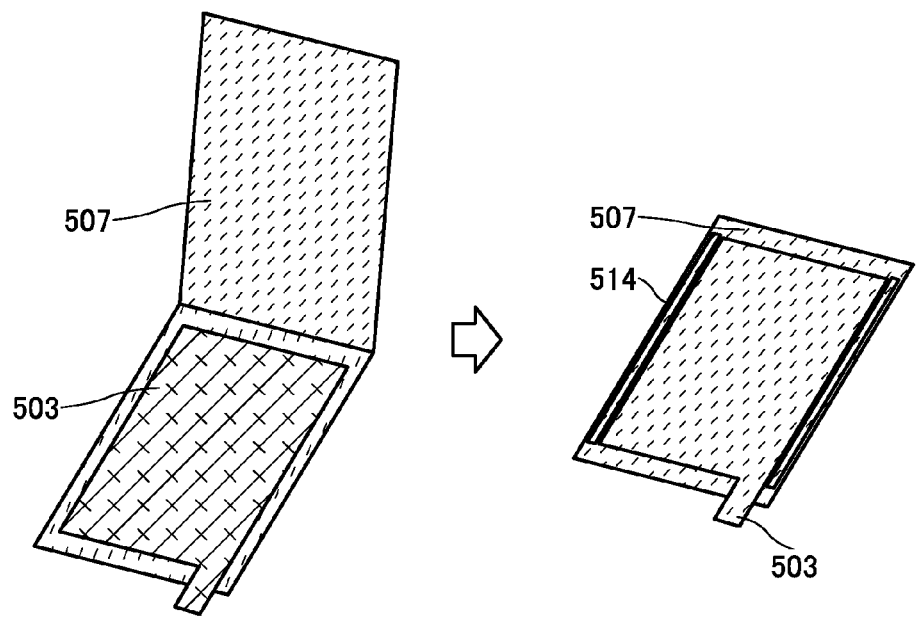
FIGS. 8A and 8B each illustrate a thin storage battery.
Figure 8B:
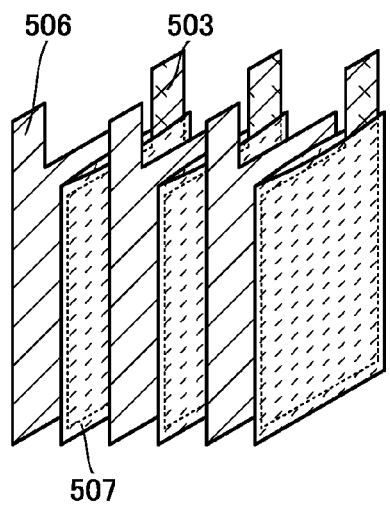

The separator 507 is preferably formed to have a bag-like shape to surround one of the positive electrode 503 and the negative electrode 506. For example, as illustrated in FIG. 8A, the separator 507 is folded in two so that the positive electrode 503 is sandwiched, and sealed with a sealing portion 514 in a region outside the region overlapping with the positive electrode 503; thus, the positive electrode 503 can be reliably supported inside the separator 507. Then, as illustrated in FIG. 8B, the positive electrodes 503 surrounded by the separators 507 and the negative electrodes 506 are alternately stacked and provided in the exterior body 509, whereby the thin storage battery 500 can be formed.

Described here is an example in which a particle containing the lithium-manganese composite oxide described in Embodiment 1 is used as the positive electrode active material, the electrode described in Embodiment 1 is used as the positive electrode 503, and an active material containing silicon is used as the negative electrode active material.

The capacity of the active material containing silicon, such as silicon or SiO, per weight and volume of the active material is high, and accordingly, capacity per weight and volume of the storage battery can be increased.

Figure 9A:
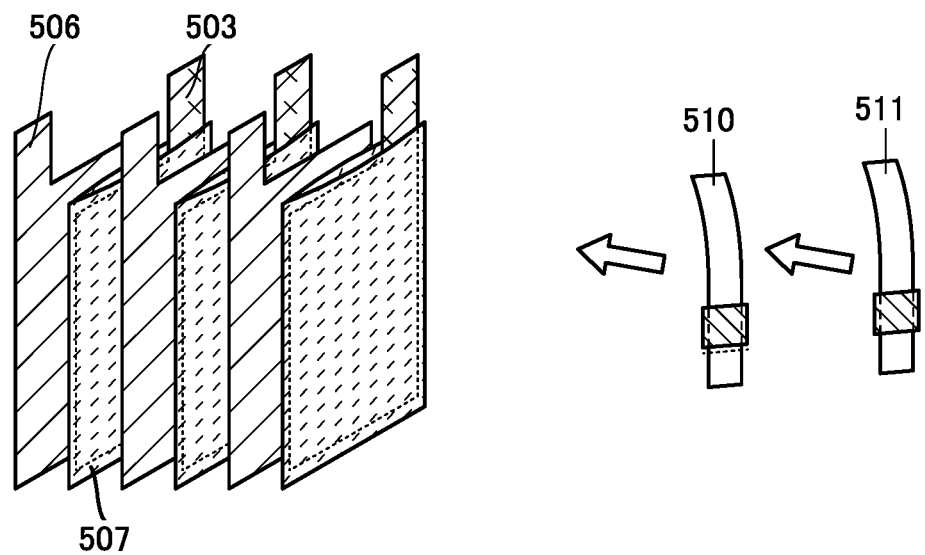
FIGS. 9A and 9B each illustrate a thin storage battery.
Figure 9B:
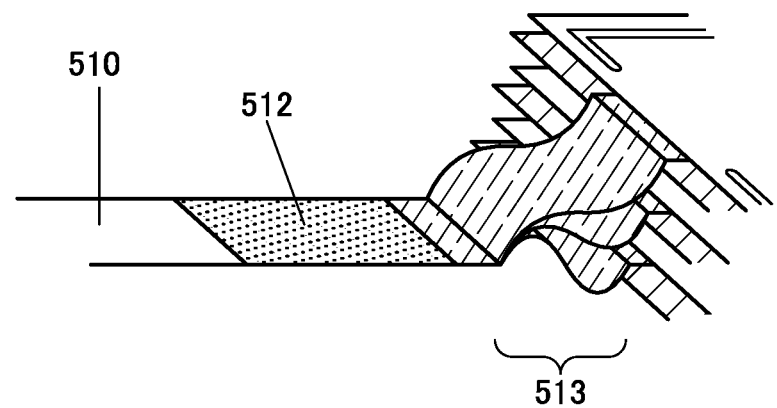

FIGS. 9A and 9B each illustrate an example in which a current collector is welded to a lead electrode, specifically, the positive electrode current collector 501 is welded to a positive electrode lead electrode 510. The positive electrode current collector 501 is welded to the positive electrode lead electrode 510 in a welding region 512 by ultrasonic welding or the like. The positive electrode current collector 501 includes a bent portion 513 illustrated in FIG. 9B, and it is therefore possible to relieve stress due to external force applied after formation of the storage battery 500. Thus, the storage battery 500 can have high reliability.

In the thin storage battery 500 illustrated in FIG. 6 and FIGS. 7A and 7B, the positive electrode lead electrode 510 and a negative electrode lead electrode 511 are welded to the positive electrode current collectors 501 in the positive electrode 503 and the negative electrode current collectors 504 in the negative electrode 506, respectively, by ultrasonic welding such that part of the positive electrode lead electrode 510 and part of the negative electrode lead electrode 511 are exposed to the outside. The positive electrode current collector 501 and the negative electrode current collector 504 can double as terminals for electrical contact with the outside. In that case, the positive electrode current collector 501 and the negative electrode current collector 504 may be arranged so that part of the positive electrode current collector 501 and part of the negative electrode current collector 504 are exposed to the outside the exterior body 509 without using lead electrodes.

Figure 10:
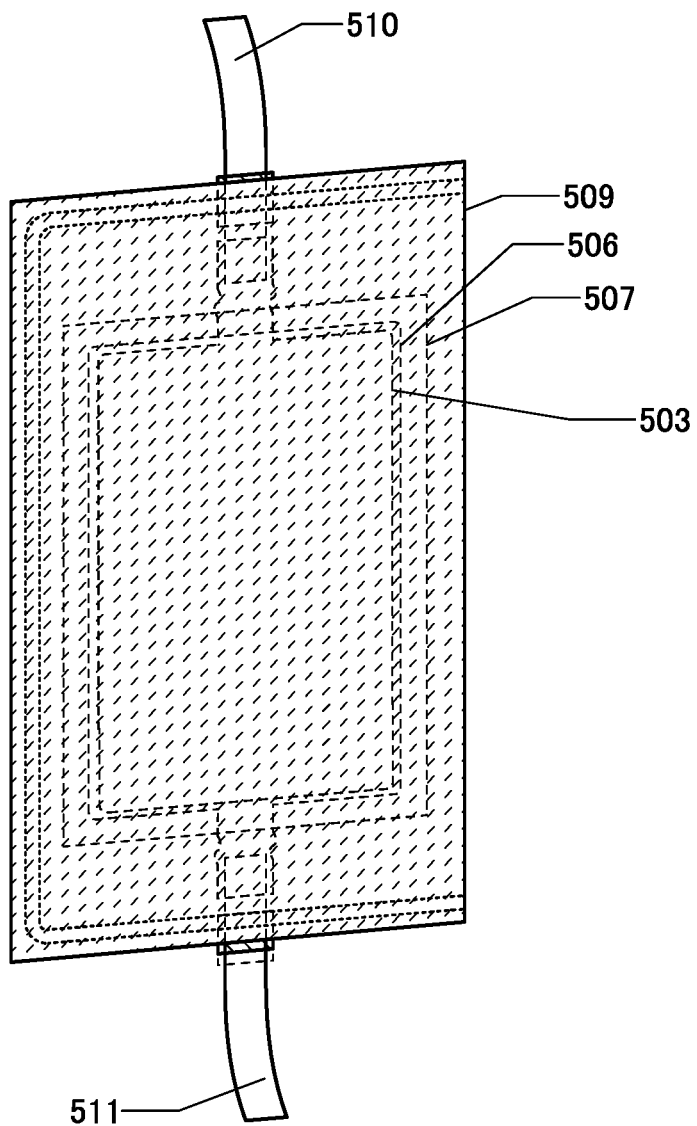
FIG. 10 illustrates a thin storage battery.

Although the positive electrode lead electrode 510 and the negative electrode lead electrode 511 are provided on the same side in FIG. 6, the positive electrode lead electrode 510 and the negative electrode lead electrode 511 may be provided on different sides as illustrated in FIG. 10. The lead electrodes of a storage battery of one embodiment of the present invention can be freely positioned as described above; therefore, the degree of freedom in design is high. Accordingly, a product including a storage battery of one embodiment of the present invention can have a high degree of freedom in design. Furthermore, a yield of products each including a storage battery of one embodiment of the present invention can be increased.

As the exterior body 509 in the thin storage battery 500, for example, a film having a three-layer structure in which a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide-based resin, a polyester-based resin, or the like is provided as the outer surface of the exterior body over the metal thin film can be used.

The example in FIG. 6 includes five positive electrode-negative electrode pairs (the positive and negative electrodes face each other). It is needless to say that the number of pairs of electrodes is not limited to five, and may be more than or less than five. In the case of using a large number of electrode layers, the storage battery can have high capacity. In contrast, in the case of using a small number of electrode layers, the storage battery can have a small thickness and high flexibility.

In the above structure, the exterior body 509 of the storage battery can change its form with a radius of greater than or equal to 10 mm, preferably greater than or equal to 30 mm. One or two films are used as the exterior body of the storage battery. In the case where the storage battery has a layered structure, the storage battery has a cross section sandwiched by two curved surfaces of the films when it is bent.

Figure 11A:
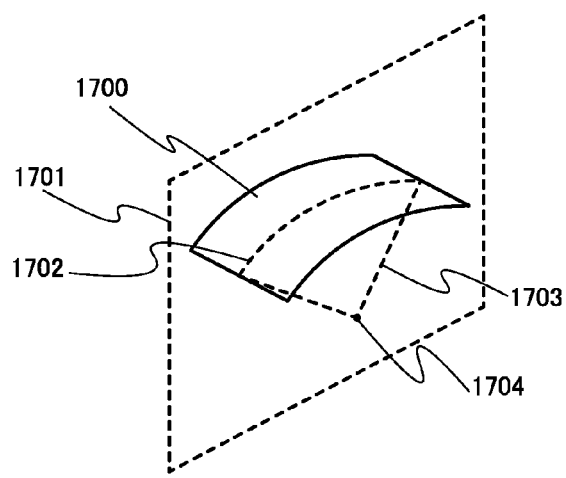
FIGS. 11A to 11C illustrate the radius of curvature of a surface.
Figure 11B:
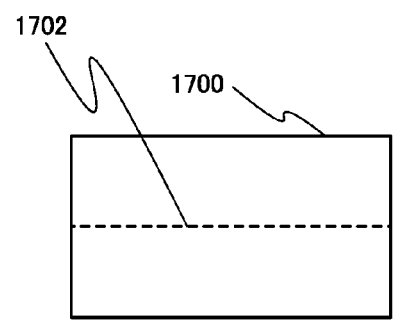
Figure 11C:
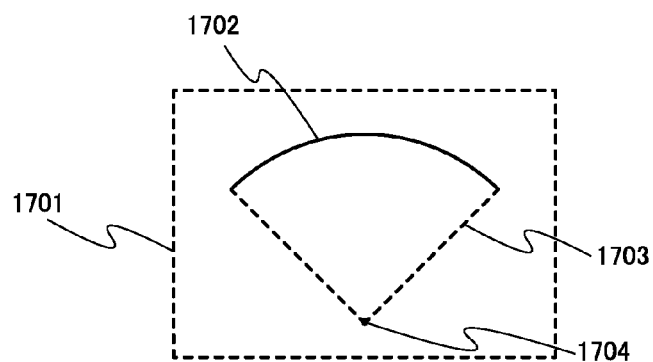

Description is given of the radius of curvature of a surface with reference to FIGS. 11A to 11C. In FIG. 11A, on a plane 1701 along which a curved surface 1700 is cut, part of a curve 1702 of the curved surface 1700 is approximate to an arc of a circle, and the radius of the circle is referred to as a radius of curvature 1703 and the center of the circle is referred to as a center 1704 of curvature. FIG. 11B is a top view of the curved surface 1700. FIG. 11C is a cross-sectional view of the curved surface 1700 taken along the plane 1701. When a curved surface is cut by a plane, the radius of curvature of a curve in a cross section differs depending on the angle between the curved surface and the plane or on the cut position, and the smallest radius of curvature is defined as the radius of curvature of a surface in this specification and the like.

Figure 12A:
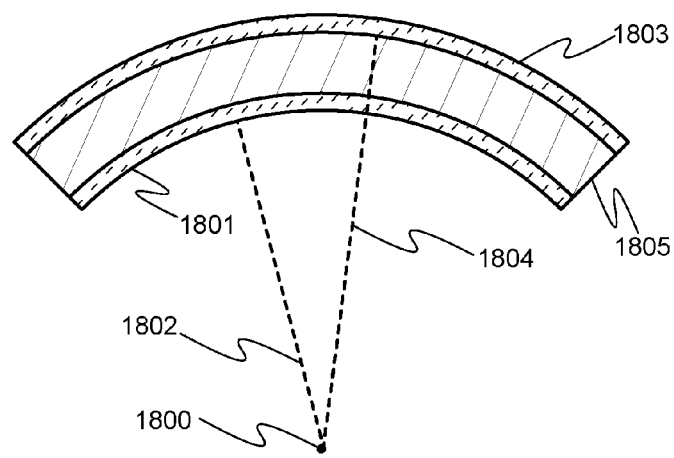
FIGS. 12A to 12D illustrate the radius of curvature of a film.
Figure 12B:
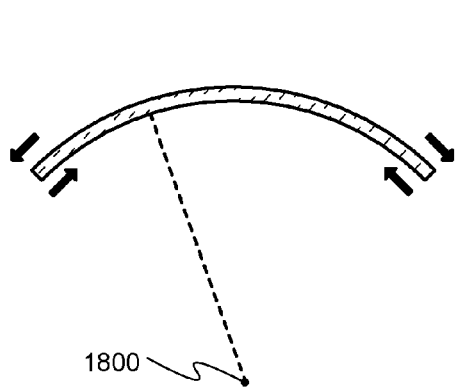

In the case of bending a secondary battery in which electrodes, an electrolytic solution, and the like which are denoted by reference numeral 1805 are sandwiched between two films as exterior bodies, a radius of curvature 1802 of a film 1801 close to a center of curvature 1800 of the secondary battery is smaller than a radius of curvature 1804 of a film 1803 far from the center of curvature 1800 (FIG. 12A). When the secondary battery is curved and has an arc-shaped cross section, compressive stress is applied to a surface of the film on the side closer to the center of curvature 1800 and tensile stress is applied to a surface of the film on the side farther from the center of curvature 1800 (FIG. 12B). However, by forming a pattern including convex portions or concave portions on surfaces of the exterior bodies, the influence of a strain can be reduced to be acceptable even when compressive stress and tensile stress are applied. For this reason, the secondary battery can change its form such that the exterior body on the side closer to the center of curvature has a curvature radius greater than or equal to 30 mm, preferably greater than or equal to 10 mm.

Figure 12C:
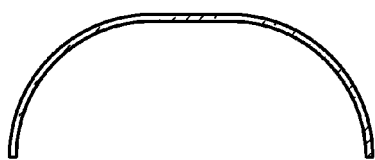
Figure 12D:

Note that the cross-sectional shape of the secondary battery is not limited to a simple arc shape, and the cross section can be partly arc-shaped; for example, a shape illustrated in FIG. 12C, a wavy shape illustrated in FIG. 12D, or an S shape can be used. When the curved surface of the secondary battery has a shape with a plurality of centers of curvature, the secondary battery can change its form such that a curved surface with the smallest radius of curvature among radii of curvature with respect to the plurality of centers of curvature, which is a surface of the exterior body on the side closer to the center of curvature, has a curvature radius greater than or equal to 10 mm, preferably greater than or equal to 30 mm.

[Thin Storage Battery 2]

Figure 13A:
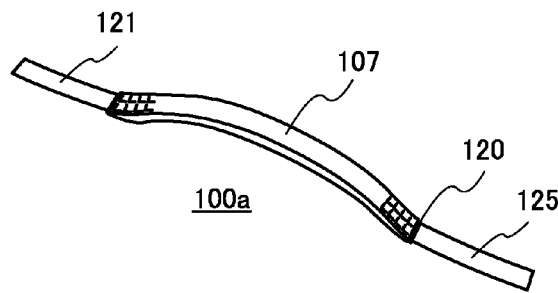
FIGS. 13A to 13C are a perspective view, a top view, and a cross-sectional view of a structure example of a secondary battery.
Figure 13B:
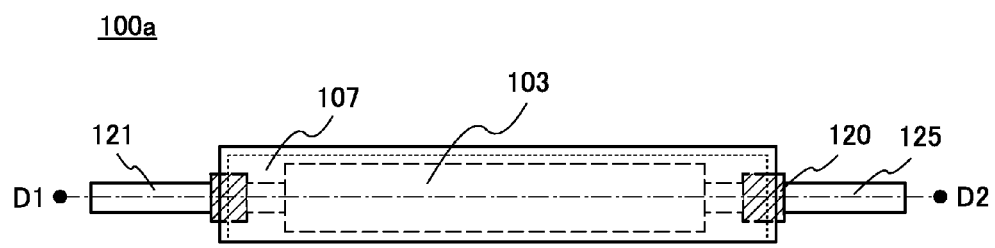
Figure 13C:
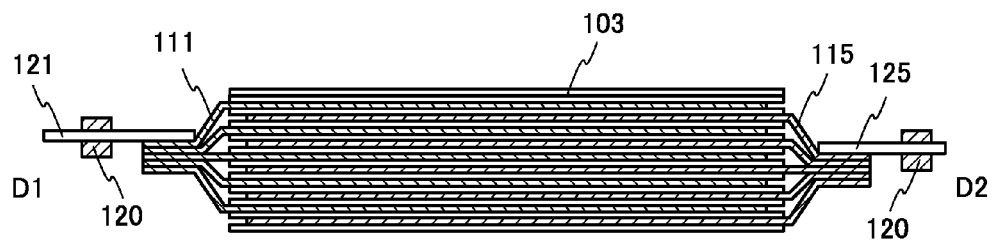

FIGS. 13A to 13C illustrate a secondary battery 100a, which is an example of a thin storage battery different from that illustrated in FIG. 6. FIG. 13A is a perspective view of the secondary battery 100a, and FIG. 13B is a top view thereof. FIG. 13C is a cross-sectional view taken along the dashed-dotted line D1-D2 in FIG. 13B. In FIG. 13C, a positive electrode 111, a negative electrode 115, a separator 103, a positive electrode lead 121, a negative electrode lead 125, and a sealing layer 120 are selectively illustrated for the sake of clarity.

Here, some steps in the method for manufacturing the secondary battery 100a illustrated in FIGS. 13A to 13C will be described with reference to FIGS. 14A to 14D.

First, the negative electrode 115 is positioned over the separator 103 (FIG. 14A) such that a negative electrode active material layer in the negative electrode 115 overlaps with the separator 103.

Then, the separator 103 is folded such that part of the separator 103 is positioned over the negative electrode 115. Next, the positive electrode 111 is positioned over the separator 103 (FIG. 14B) such that a positive electrode active material layer included in the positive electrode 111 overlaps with the separator 103 and the negative electrode active material layer. In the case where an electrode in which an active material layer is formed on one surface of a current collector is used, the positive electrode active material layer of the positive electrode 111 and the negative electrode active material layer of the negative electrode 115 are positioned so as to face each other with the separator 103 therebetween.

Figure 14A:
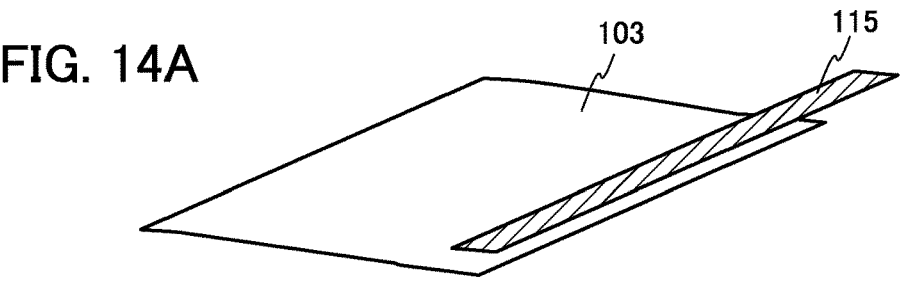
FIGS. 14A to 14D illustrate an example of a method of manufacturing the secondary battery.
Figure 14B:
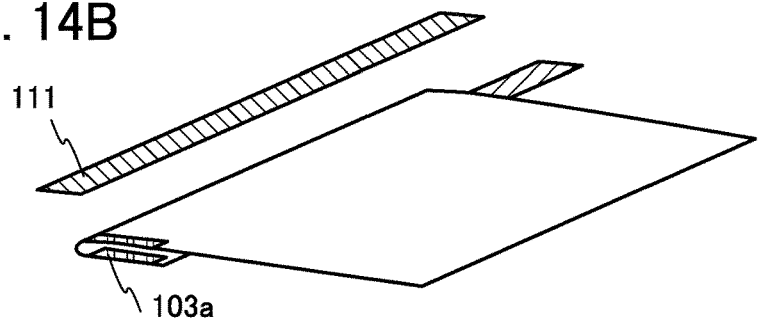

In the case where the separator 103 is formed using a material that can be thermally welded, such as polypropylene, a region where the separator 103 overlap with itself is thermally welded and then another electrode is positioned so as to overlap with the separator 103, whereby the slippage of the electrode in the fabrication process can be minimized. Specifically, a region which does not overlap with the negative electrode 115 or the positive electrode 111 and in which the separator 103 overlaps with itself, e.g., a region 103a in FIG. 14B, is preferably thermally welded.

Figure 14C:
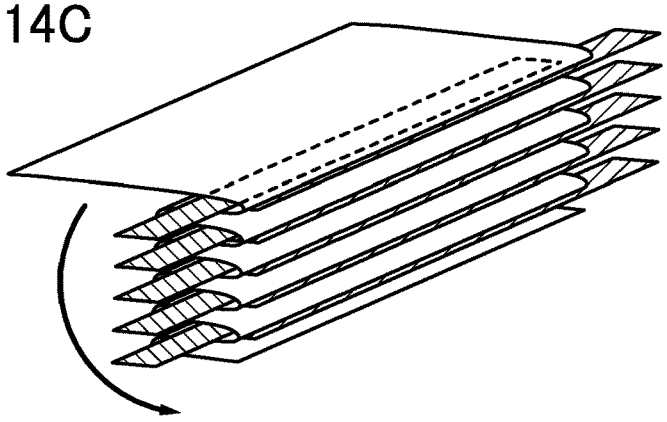

By repeating the above steps, the positive electrode 111 and the negative electrode 115 can overlap with each other with the separator 103 therebetween as illustrated in FIG. 14C.

Note that a plurality of positive electrodes 111 and a plurality of negative electrodes 115 may be placed to be alternately sandwiched by the separator 103 that is repeatedly folded in advance.

Next, as illustrated in FIG. 14C, the plurality of positive electrodes 111 and the plurality of negative electrodes 115 are covered with the separator 103.

Figure 14D:
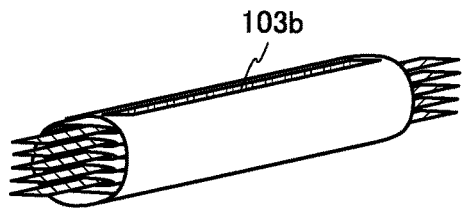

Then, as illustrated in FIG. 14D, a region where the separator 103 overlaps with itself, e.g., a region 103b in FIG. 14D, is thermally welded, and the plurality of positive electrodes 111 and the plurality of negative electrodes 115 are covered with the separator 103 to be bound.

Note that the plurality of positive electrodes 111, the plurality of negative electrodes 115, and the separator 103 may be bound with a binding material.

Since the positive electrodes 111 and the negative electrodes 115 are stacked through the above steps, one separator 103 has regions sandwiched between the plurality of positive electrodes 111 and the plurality of negative electrodes 115 and regions positioned so as to cover the plurality of positive electrodes 111 and the plurality of negative electrodes 115.

In other words, the separator 103 included in the secondary battery 100a in FIGS. 13A to 13C is a single separator which is partly folded. In the folded parts of the separator 103, the plurality of positive electrodes 111 and the plurality of negative electrodes 115 are interposed.

The description in Embodiment 1 can be referred to for, in the secondary battery 100a, bonding regions of an exterior body 107, the shapes of the positive electrodes 111, the negative electrodes 115, the separator 103, and the exterior body 107, and for the structures, except the positions, of the positive electrode lead 121 and the negative electrode lead 125. The manufacturing method described in Embodiment 1 can be referred to for the steps other than the steps of stacking the positive electrodes 111 and the negative electrodes 115 in the manufacturing method of the secondary battery 100a.

[Thin Storage Battery 3]

FIGS. 15A, 15B, 15C1, 15C2, and 15D illustrate a secondary battery 100b, which is an example of a thin storage battery different from that illustrated in FIGS. 13A to 13C. FIG. 15A is a perspective view of a secondary battery 100b, and FIG. 15B is a top view thereof. FIG. 15C1 is a cross-sectional view of a first electrode assembly 130, and FIG. 15C2 is a cross-sectional view of an electrode assembly 131. FIG. 15D is a cross-sectional view taken along the dashed-dotted line E1-E2 in FIG. 15B. In FIG. 15D, the first electrode assembly 130, the electrode assembly 131, and the separator 103 are selectively illustrated for the sake of clarity.

The secondary battery 100b illustrated in FIGS. 15A to 15D is different from the secondary battery 100a illustrated in FIGS. 13A to 13C in the positions of the positive electrodes 111, the negative electrodes 115, and the separator 103.

As illustrated in FIG. 15D, the secondary battery 100b includes a plurality of first electrode assemblies 130 and a plurality of electrode assemblies 131.

As illustrated in FIG. 15C1, in each of the first electrode assemblies 130, a positive electrode 111a including the positive electrode active material layers on both surfaces of a positive electrode current collector, the separator 103, a negative electrode 115a including the negative electrode active material layers on both surfaces of a negative electrode current collector, the separator 103, and the positive electrode 111a including the positive electrode active material layers on both surfaces of the positive electrode current collector are stacked in this order. As illustrated in FIG. 15C2, in each of the second electrode assemblies 131, the negative electrode 115a including the negative electrode active material layers on both surfaces of the negative electrode current collector, the separator 103, the positive electrode 111a including the positive electrode active material layers on both surfaces of the positive electrode current collector, the separator 103, and the negative electrode 115a including the negative electrode active material layers on both surfaces of the negative electrode current collector are stacked in this order.

As illustrated in FIG. 15D, the plurality of first electrode assemblies 130 and the plurality of electrode assemblies 131 are covered with the wound separator 103.

Here, some steps in the method for manufacturing the secondary battery 100b illustrated in FIGS. 15A, 15B, 15C1, 15C2, and 15D will be described with reference to FIGS. 16A to 16D.

Figure 16A:
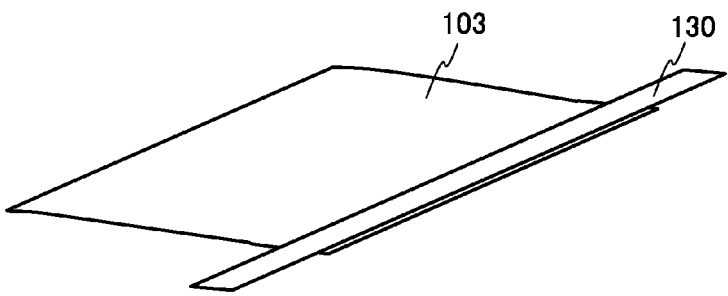
FIGS. 16A to 16D illustrate an example of a method of manufacturing the secondary battery.

First, the first electrode assembly 130 is positioned over the separator 103 (FIG. 16A).

Figure 16B:
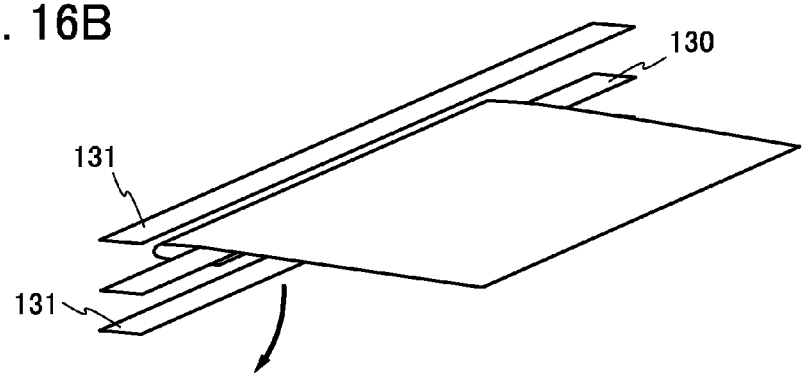

Then, the separator 103 is folded such that part of the separator 103 is positioned over the first electrode assembly 130. Next, two second electrode assemblies 131 are positioned over and under the first electrode assembly 130 with the separator 103 therebetween (FIG. 16B).

Figure 16C:
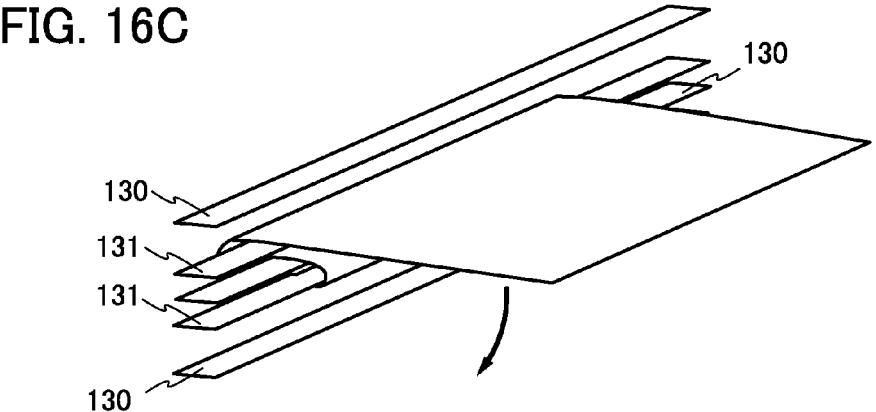

Then, the separator 103 is wound so as to cover the two second electrode assemblies 131. Next, two first electrode assemblies 130 are positioned over and under the two second electrode assemblies 131 with the separator 103 therebetween (FIG. 16C).

Figure 16D:
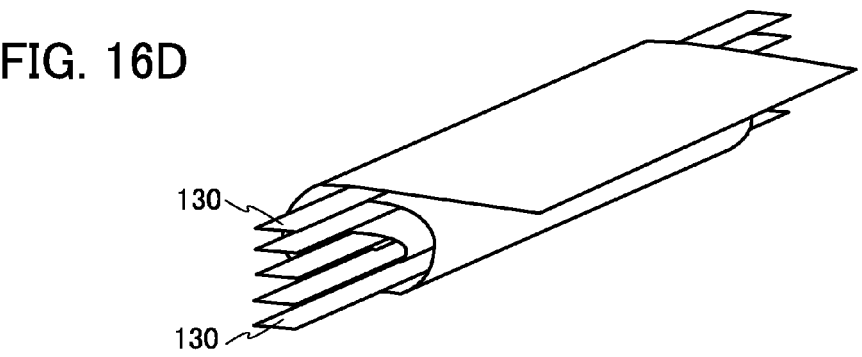

Then, the separator 103 is wound so as to cover the two first electrode assemblies 130 (FIG. 16D).

Since the plurality of first electrode assemblies 130 and the plurality of electrode assemblies 131 are stacked through the above steps, the electrode assemblies are positioned between the separator 103 that is spirally wound.

It is preferable that the positive electrode 111a of the electrode assembly 130 that is positioned on the outermost side not include the positive electrode active material layer on the outer side.

In the example illustrated in FIGS. 15C1 and 15C2, the electrode assembly includes three electrodes and two separators; however, one embodiment of the present invention is not limited to this example. The electrode assembly may include four or more electrodes and three or more separators. As the number of electrodes is increased, the capacity of the secondary battery 100b can be further improved. Note that the electrode assembly may include two electrodes and one separator. In the case where the number of electrodes is small, the secondary battery 100b can have higher resistance to bending. In the example illustrated in FIG. 15D, the secondary battery 100b includes three first electrode assemblies 130 and two second electrode assemblies; however, one embodiment of the present invention is not limited to this example. The secondary battery 100b may include more electrode assemblies. As the number of electrode assemblies is increased, the capacity of the secondary battery 100b can be further improved. Note that the secondary battery 100b may include a smaller number of electrode assemblies. In the case where the number of electrode assemblies is small, the secondary battery 100b can have higher resistance to bending.

The description of FIGS. 13A to 13C can be referred to for structures other than the positions of the positive electrodes 111, the negative electrodes 115, and the separator 103 of the secondary battery 100b.

[Structure Example of Power Storage System]

Structure examples of power storage systems will be described with reference to FIGS. 17A and 17B, FIGS. 18A1, 18A2, 18B1, and 18B2, and FIGS. 19A and 19B. Here, a power storage system refers to, for example, a device including a power storage device. The power storage system described in this embodiment includes a storage battery that is a power storage device manufactured according to one embodiment of the present invention.

Figure 17A:
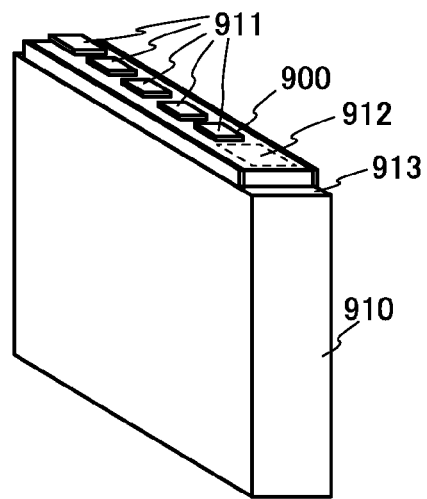
FIGS. 17A and 17B illustrate an example of a power storage system.
Figure 17B:
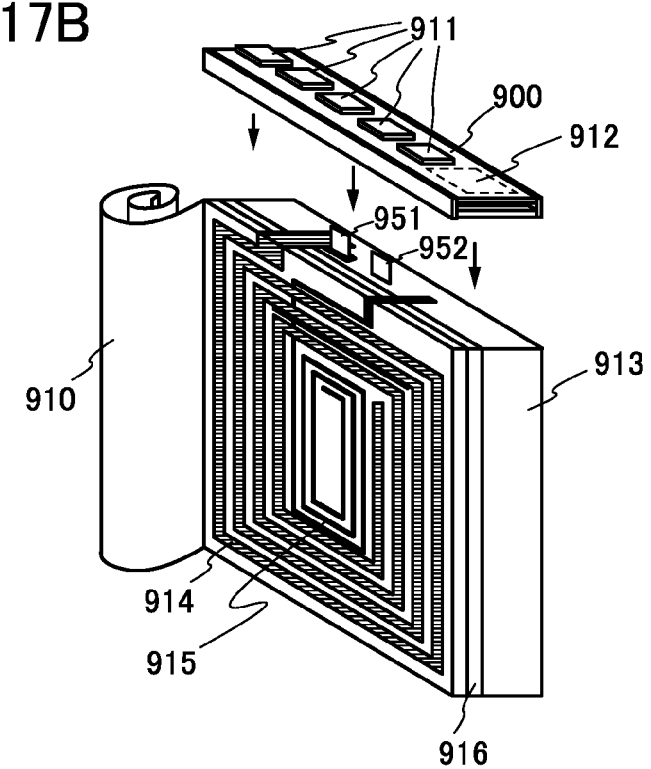

FIGS. 17A and 17B are external views of a power storage system. The power storage system includes a circuit board 900 and a storage battery 913. A label 910 is attached to the storage battery 913. As shown in FIG. 17B, the power storage system includes a terminal 951 and a terminal 952, and further includes an antenna 914 and an antenna 915 on a surface of the storage battery 913, to which the label 910 is to be attached.

The circuit board 900 includes terminals 911 and a circuit 912. The terminals 911 are connected to the terminal 951, the terminal 952, and the circuit 912. Note that a plurality of terminals 911 serving as a control signal input terminal, a power supply terminal, and the like may be provided.

The circuit 912 may be provided on the rear surface of the circuit board 900. The shape of each of the antennas 914 and 915 is not limited to a coil shape and may be a linear shape or a plate shape. Furthermore, a planar antenna, an aperture antenna, a traveling-wave antenna, an EH antenna, a magnetic-field antenna, or a dielectric antenna may be used. Alternatively, the antenna 914 or the antenna 915 may be a flat-plate conductor. The flat-plate conductor can serve as one of conductors for electric field coupling. That is, the antenna 914 or the antenna 915 can serve as one of two conductors of a capacitor. Thus, electric power can be transmitted and received not only by an electromagnetic field or a magnetic field but also by an electric field.

The line width of the antenna 914 is preferably larger than that of the antenna 915. This makes it possible to increase the amount of electric power received by the antenna 914.

The power storage system includes a layer 916 between the storage battery 913 and the antennas 914 and 915. The layer 916 has a function of blocking an electromagnetic field by the storage battery 913. As the layer 916, for example, a magnetic body can be used.

Note that the structure of the power storage system is not limited to that illustrated in FIGS. 17A and 17B.

For example, as shown in FIGS. 18A1 and 18A2, two opposite surfaces of the storage battery 913 in FIGS. 17A and 17B may be provided with respective antennas. FIG. 18A1 is an external view showing one side of the opposite surfaces, and FIG. 18A2 is an external view showing the other side of the opposite surfaces. For portions similar to those in FIGS. 17A and 17B, the description of the power storage system illustrated in FIGS. 17A and 17B can be referred to as appropriate.

As illustrated in FIG. 18A1, the antenna 914 is provided on one of the opposite surfaces of the storage battery 913 with the layer 916 interposed therebetween, and as illustrated in FIG. 18A2, the antenna 915 is provided on the other of the opposite surfaces of the storage battery 913 with a layer 917 interposed therebetween. The layer 917 may have a function of preventing an adverse effect on an electromagnetic field by the storage battery 913. As the layer 917, for example, a magnetic body can be used.

With the above structure, both of the antennas 914 and 915 can be increased in size.

Alternatively, as illustrated in FIGS. 18B1 and 18B2, two opposite surfaces of the storage battery 913 in FIGS. 17A and 17B may be provided with different types of antennas. FIG. 18B1 is an external view showing one side of the opposite surfaces, and FIG. 18B2 is an external view showing the other side of the opposite surfaces. For portions similar to those in FIGS. 17A and 17B, the description of the power storage system illustrated in FIGS. 17A and 17B can be referred to as appropriate.

As illustrated in FIG. 18B1, the antennas 914 and 915 are provided on one of the opposite surfaces of the storage battery 913 with the layer 916 provided between the storage battery 913 and the antennas 914 and 915, and as illustrated in FIG. 18A2, an antenna 918 is provided on the other of the opposite surfaces of the storage battery 913 with the layer 917 provided therebetween. The antenna 918 has a function of communicating data with an external device, for example. An antenna with a shape that can be used for the antennas 914 and 915, for example, can be used as the antenna 918. As a system for communication using the antenna 918 between the power storage system and another device, a response method that can be used between the power storage system and another device, such as NFC, can be employed.

Figure 19A:
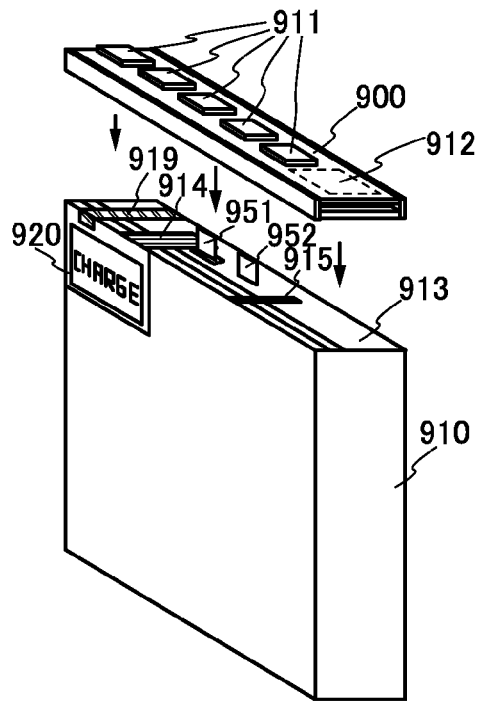
FIGS. 19A and 19B illustrate examples of a power storage system.

Alternatively, as illustrated in FIG. 19A, the storage battery 913 in FIGS. 17A and 17B may be provided with a display device 920. The display device 920 is electrically connected to the terminal 911 via a terminal 919. It is possible that the label 910 is not provided in a portion where the display device 920 is provided. For portions similar to those in FIGS. 17A and 17B, the description of the power storage system illustrated in FIGS. 17A and 17B can be referred to as appropriate.

The display device 920 can display, for example, an image showing whether charge is being carried out, an image showing the amount of stored power, or the like. As the display device 920, electronic paper, a liquid crystal display device, an electroluminescent (EL) display device, or the like can be used. For example, the use of electronic paper can reduce power consumption of the display device 920.

Figure 19B:
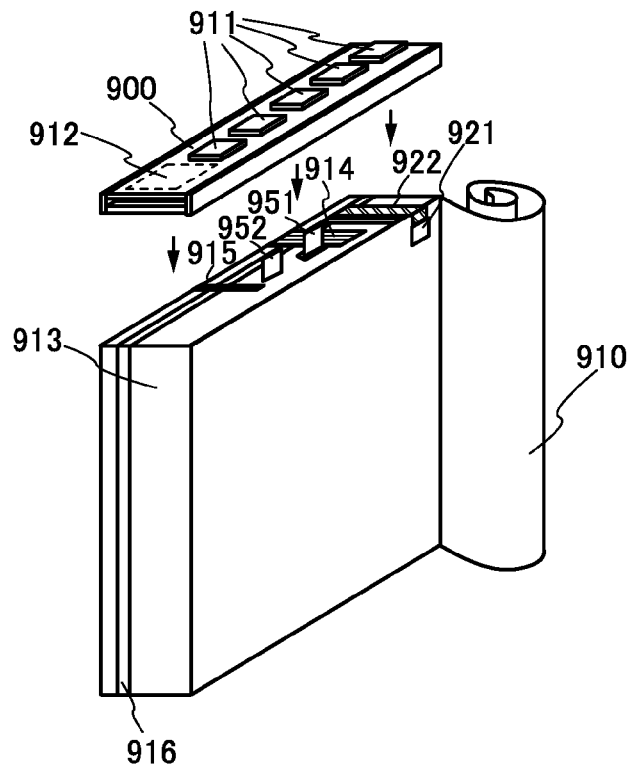

Alternatively, as illustrated in FIG. 19B, the storage battery 913 illustrated in FIGS. 17A and 17B may be provided with a sensor 921. The sensor 921 is electrically connected to the terminal 911 via a terminal 922. For portions similar to those in FIGS. 17A and 17B, the description of the power storage system illustrated in FIGS. 17A and 17B can be referred to as appropriate.

As the sensor 921, a sensor that has a function of measuring, for example, force, displacement, position, speed, acceleration, angular velocity, rotational frequency, distance, light, liquid, magnetism, temperature, chemical substance, sound, time, hardness, electric field, electric current, voltage, electric power, radiation, flow rate, humidity, gradient, oscillation, odor, or infrared rays can be used. With the sensor 921, for example, data on an environment (e.g., temperature) where the power storage system is placed can be determined and stored in a memory inside the circuit 912.

The electrode of one embodiment of the present invention is used in the storage battery and the power storage system that are described in this embodiment. The capacity of the storage battery and the power storage system can thus be high. Furthermore, energy density can be high. Moreover, reliability can be high, and life can be long.

This embodiment can be implemented in appropriate combination with any of the other embodiments.

Embodiment 3

In this embodiment, an example of an electronic device including a flexible storage battery which is a power storage device manufactured according to one embodiment of the present invention will be described.

FIGS. 20A to 20G illustrate examples of electronic devices including the flexible power storage device described in the above embodiment. Examples of electronic devices each including the flexible power storage device include television devices (also referred to as televisions or television receivers), monitors of computers or the like, cameras such as digital cameras and digital video cameras, digital photo frames, mobile phones (also referred to as mobile phones or mobile phone devices), portable game machines, portable information terminals, audio reproducing devices, and large game machines such as pachinko machines.

In addition, the flexible power storage device can be incorporated along a curved inside/outside wall surface of a house or a building or a curved interior/exterior surface of a car.

FIG. 20A illustrates an example of a mobile phone. A mobile phone 7400 is provided with a display portion 7402 incorporated in a housing 7401, an operation button 7403, an external connection port 7404, a speaker 7405, a microphone 7406, and the like. Note that the mobile phone 7400 includes a power storage device 7407.

FIG. 20B illustrates the mobile phone 7400 that is bent. When the whole mobile phone 7400 is bent by the external force, the power storage device 7407 included in the mobile phone 7400 is also bent. FIG. 20C illustrates the bent power storage device 7407. The power storage device 7407 is a thin storage battery. The power storage device 7407 is fixed in a state of being bent. Note that the power storage device 7407 includes a lead electrode 7408 electrically connected to a current collector 7409. The current collector 7409 is, for example, copper foil, and partly alloyed with gallium; thus, adhesion between the current collector 7409 and an active material layer in contact with the current collector 7409 is improved and the power storage device 7407 can have high reliability even in a state of being bent.

FIG. 20D illustrates an example of a bangle display device. A portable display device 7100 includes a housing 7101, a display portion 7102, an operation button 7103, and a power storage device 7104. FIG. 20E illustrates the bent power storage device 7104. When the display device is worn on a user's arm while the power storage device 7104 is bent, the housing changes its form and the curvature of a part or the whole of the power storage device 7104 is changed. Note that the radius of curvature of a curve at a point refers to the radius of the circular arc that best approximates the curve at that point. The reciprocal of the radius of curvature is curvature. Specifically, a part or the whole of the housing or the main surface of the power storage device 7104 is changed in the range of radius of curvature from 40 mm to 150 mm. When the radius of curvature at the main surface of the power storage device 7104 is greater than or equal to 40 mm and less than or equal to 150 mm, the reliability can be kept high.

FIG. 20F illustrates an example of a watch-type portable information terminal. A portable information terminal 7200 includes a housing 7201, a display portion 7202, a band 7203, a buckle 7204, an operation button 7205, an input output terminal 7206, and the like.

The portable information terminal 7200 is capable of executing a variety of applications such as mobile phone calls, e-mailing, viewing and editing texts, music reproduction, Internet communication, and a computer game.

The display surface of the display portion 7202 is curved, and images can be displayed on the curved display surface. In addition, the display portion 7202 includes a touch sensor, and operation can be performed by touching the screen with a finger, a stylus, or the like. For example, by touching an icon 7207 displayed on the display portion 7202, application can be started.

With the operation button 7205, a variety of functions such as time setting, on/off of the power, on/off of wireless communication, setting and cancellation of a silent mode, and setting and cancellation of a power saving mode can be performed. For example, the functions of the operation button 7205 can be set freely by setting the operating system incorporated in the portable information terminal 7200.

The portable information terminal 7200 can employ near field communication that is a communication method based on an existing communication standard. In that case, for example, mutual communication between the portable information terminal 7200 and a headset capable of wireless communication can be performed, and thus hands-free calling is possible.

Moreover, the portable information terminal 7200 includes the input output terminal 7206, and data can be directly transmitted to and received from another information terminal via a connector. In addition, charging via the input output terminal 7206 is possible. Note that the charging operation may be performed by wireless power feeding without using the input output terminal 7206.

The display portion 7202 of the portable information terminal 7200 is provided with a power storage device including the electrode member of one embodiment of the present invention. For example, the power storage device 7104 illustrated in FIG. 20E that is in the state of being curved can be provided in the housing 7201. Alternatively, the power storage device 7104 illustrated in FIG. 20E can be provided in the band 7203 such that it can be curved.

FIG. 20G illustrates an example of an armband display device. A display device 7300 includes a display portion 7304 and the power storage device of one embodiment of the present invention. The display device 7300 can include a touch sensor in the display portion 7304 and can serve as a portable information terminal.

The display surface of the display portion 7304 is bent, and images can be displayed on the bent display surface. A display state of the display device 7300 can be changed by, for example, near field communication, which is a communication method based on an existing communication standard.

The display device 7300 includes an input output terminal, and data can be directly transmitted to and received from another information terminal via a connector. In addition, charging via the input output terminal is possible. Note that the charging operation may be performed by wireless power feeding without using the input output terminal.

This embodiment can be implemented in appropriate combination with any of the other embodiments.

Embodiment 4

In this embodiment, examples of electronic devices that can include power storage devices will be described.

Figure 21A:
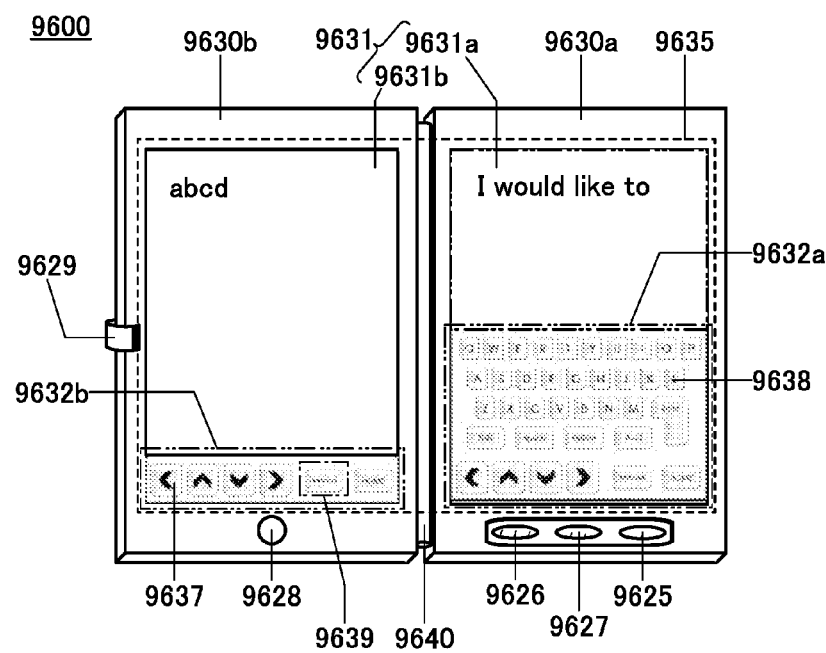
FIGS. 21A to 21C illustrate an example of an electronic device.
Figure 21B:
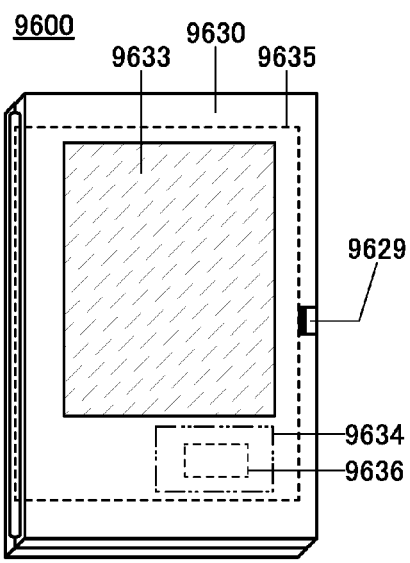

FIGS. 21A and 21B illustrate an example of a tablet terminal that can be folded in half. A tablet terminal 9600 illustrated in FIGS. 21A and 21B includes a housing 9630a, a housing 9630b, a movable portion 9640 connecting the housings 9630*a* and 9630*b*, a display portion 9631 including a display portion 9631*a* and a display portion 9631*b*, a display mode changing switch 9626, a power switch 9627, a power saving mode changing switch 9625, a fastener 9629, and an operation switch 9628. FIG. 21A illustrates the tablet terminal 9600 that is opened, and FIG. 21B illustrates the tablet terminal 9600 that is closed.

The tablet terminal 9600 includes a power storage unit 9635 inside the housings 9630*a* and 9630*b*. The power storage unit 9635 is provided across the housings 9630*a* and 9630*b*, passing through the movable portion 9640.

Part of the display portion 9631*a* can be a touch panel region 9632*a*, and data can be input by touching operation keys 9638 that are displayed. Note that the figure shows, as an example, that half of the area of the display portion 9631*a* has only a display function and the other half of the area has a touch panel function. However, the structure of the display portion 9631*a* is not limited to this, and all the area of the display portion 9631*a* may have a touch panel function. For example, all the area of the display portion 9631*a* can display a keyboard and serve as a touch panel while the display portion 9631*b* can be used as a display screen.

As in the display portion 9631*a*, part of the display portion 9631*b* can be a touch panel region 9632*b*. When a keyboard display switching button 9639 displayed on the touch panel is touched with a finger, a stylus, or the like, a keyboard can be displayed on the display portion 9631*b*.

Touch input can be performed in the touch panel region 9632*a* and the touch panel region 9632*b* at the same time.

The display mode changing switch 9626 allows switching between a landscape mode and a portrait mode, color display and black-and-white display, and the like. The power saving mode changing switch 9625 can control display luminance in accordance with the amount of external light in use of the tablet terminal 9600, which is measured with an optical sensor incorporated in the tablet terminal 9600. In addition to the optical sensor, other detecting devices such as sensors for determining inclination, such as a gyroscope or an acceleration sensor, may be incorporated in the tablet terminal.

Although the display portion 9631*a* and the display portion 9631*b* have the same area in FIG. 21A, one embodiment of the present invention is not limited to this example. The display portion 9631*a* and the display portion 9631*b* may have different areas or different display quality. For example, one of the display portions 9631*a* and 9631*b* may display higher definition images than the other.

The tablet terminal is closed in FIG. 21B. The tablet terminal includes the housing 9630, a solar cell 9633, and a charge and discharge control circuit 9634 including a DCDC converter 9636. The power storage unit of one embodiment of the present invention is used as the power storage unit 9635.

The tablet terminal 9600 can be folded such that the housings 9630*a* and 9630*b* overlap with each other when not in use. Thus, the display portions 9631*a* and 9631*b* can be protected, which increases the durability of the tablet terminal 9600. In addition, the power storage unit 9635 of one embodiment of the present invention has flexibility and can be repeatedly bent without a significant decrease in charge and discharge capacity. Thus, a highly reliable tablet terminal can be provided.

The tablet terminal illustrated in FIGS. 21A and 21B can also have a function of displaying various kinds of data (e.g., a still image, a moving image, and a text image), a function of displaying a calendar, a date, or the time on the display portion, a touch-input function of operating or editing data displayed on the display portion by touch input, a function of controlling processing by various kinds of software (programs), and the like.

The solar cell 9633, which is attached on the surface of the tablet terminal, supplies electric power to a touch panel, a display portion, an image signal processing portion, and the like. Note that the solar cell 9633 is preferable because the solar cell 9633 can be provided on one or both surfaces of the housing 9630 and the power storage unit 9635 can be charged efficiently. The use of a lithium-ion battery as the power storage unit 9635 brings an advantage such as reduction in size.

Figure 21C:
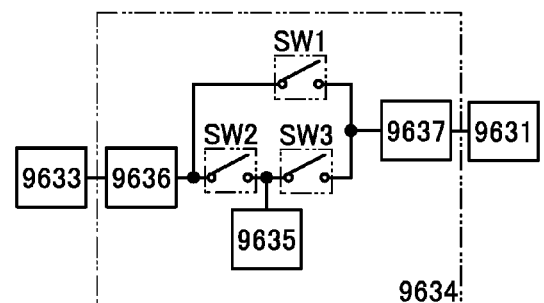

The structure and operation of the charge and discharge control circuit 9634 illustrated in FIG. 21B will be described with reference to a block diagram in FIG. 21C. The solar cell 9633, the power storage unit 9635, the DCDC converter 9636, a converter 9637, switches SW1 to SW3, and the display portion 9631 are illustrated in FIG. 21C, and the power storage unit 9635, the DCDC converter 9636, the converter 9637, and the switches SW1 to SW3 correspond to the charge and discharge control circuit 9634 in FIG. 21B.

First, an example of operation when electric power is generated by the solar cell 9633 using external light will be described. The voltage of electric power generated by the solar cell is raised or lowered by the DCDC converter 9636 to a voltage for charging the power storage unit 9635. When the display portion 9631 operates with the electric power from the solar cell 9633, the switch SW1 is turned on and the voltage of the electric power is raised or lowered by the converter 9637 to a voltage needed for operating the display portion 9631. When display on the display portion 9631 is not performed, the switch SW1 is turned off and the switch SW2 is turned on, so that the power storage unit 9635 can be charged.

Note that the solar cell 9633 is described as an example of a power generation means; however, one embodiment of the present invention is not limited to this example. The power storage unit 9635 may be charged using another power generation means such as a piezoelectric element or a thermoelectric conversion element (Peltier element). For example, the power storage unit 9635 may be charged with a non-contact power transmission module capable of performing charging by transmitting and receiving electric power wirelessly (without contact), or any of the other charge means used in combination.

Figure 22:
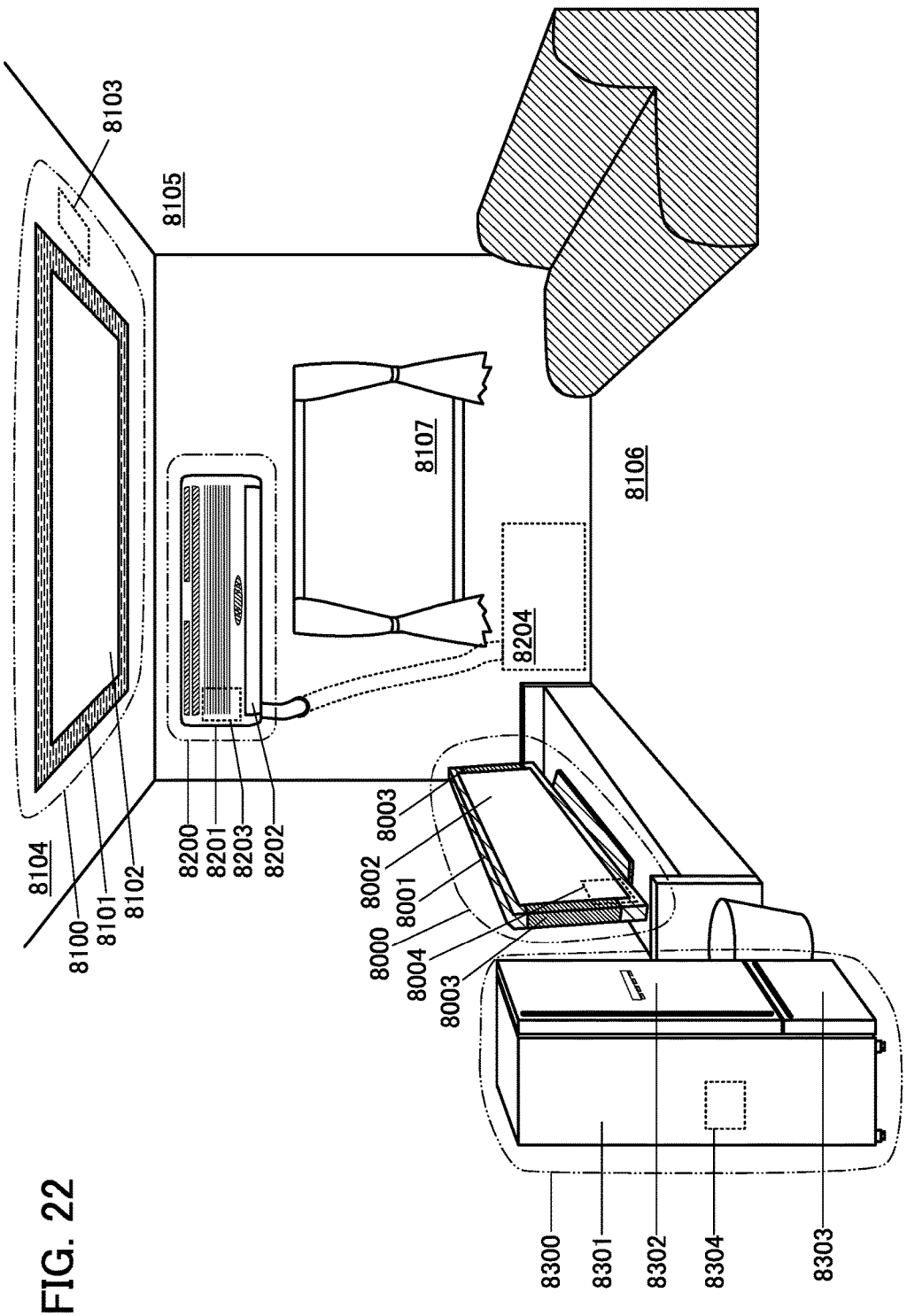
FIG. 22 illustrates examples of electronic devices.

FIG. 22 illustrates other examples of electronic devices. In FIG. 22, a display device 8000 is an example of an electronic device including a power storage device 8004 of one embodiment of the present invention. Specifically, the display device 8000 corresponds to a display device for TV broadcast reception and includes a housing 8001, a display portion 8002, speaker portions 8003, and the power storage device 8004. The power storage device 8004 of one embodiment of the present invention is provided in the housing 8001. The display device 8000 can receive electric power from a commercial power supply. Alternatively, the display device 8000 can use electric power stored in the power storage device 8004. Thus, the display device 8000 can operate with the use of the power storage device 8004 of one embodiment of the present invention as an uninterruptible power supply even when electric power cannot be supplied from a commercial power supply due to power failure or the like.

A semiconductor display device such as a liquid crystal display device, a light-emitting device in which a light-emitting element such as an organic EL element is provided in each pixel, an electrophoresis display device, a digital micromirror device (DMD), a plasma display panel (PDP), or a field emission display (FED) can be used for the display portion 8002.

Note that the display device includes, in its category, all of information display devices for personal computers, advertisement displays, and the like besides TV broadcast reception.

In FIG. 22, an installation lighting device 8100 is an example of an electronic device including a power storage device 8103 of one embodiment of the present invention. Specifically, the lighting device 8100 includes a housing 8101, a light source 8102, and the power storage device 8103. Although FIG. 22 illustrates the case where the power storage device 8103 is provided in a ceiling 8104 on which the housing 8101 and the light source 8102 are installed, the power storage device 8103 may be provided in the housing 8101. The lighting device 8100 can receive electric power from a commercial power supply. Alternatively, the lighting device 8100 can use electric power stored in the power storage device 8103. Thus, the lighting device 8100 can operate with the use of power storage device 8103 of one embodiment of the present invention as an uninterruptible power supply even when electric power cannot be supplied from a commercial power supply due to power failure or the like.

Note that although the installation lighting device 8100 provided in the ceiling 8104 is illustrated in FIG. 22 as an example, the power storage device of one embodiment of the present invention can be used in an installation lighting device provided in, for example, a wall 8105, a floor 8106, a window 8107, or the like other than the ceiling 8104. Alternatively, the power storage device of one embodiment of the present invention can be used in a tabletop lighting device or the like.

As the light source 8102, an artificial light source which emits light artificially by using electric power can be used. Specifically, an incandescent lamp, a discharge lamp such as a fluorescent lamp, and light-emitting elements such as an LED and an organic EL element are given as examples of the artificial light source.

In FIG. 22, an air conditioner including an indoor unit 8200 and an outdoor unit 8204 is an example of an electronic device including a power storage device 8203 of one embodiment of the present invention. Specifically, the indoor unit 8200 includes a housing 8201, an air outlet 8202, and the power storage device 8203. Although FIG. 22 illustrates the case where the power storage device 8203 is provided in the indoor unit 8200, the power storage device 8203 may be provided in the outdoor unit 8204. Alternatively, the power storage devices 8203 may be provided in both the indoor unit 8200 and the outdoor unit 8204. The air conditioner can receive electric power from a commercial power supply. Alternatively, the air conditioner can use electric power stored in the power storage device 8203. Particularly in the case where the power storage devices 8203 are provided in both the indoor unit 8200 and the outdoor unit 8204, the air conditioner can operate with the use of the power storage device 8203 of one embodiment of the present invention as an uninterruptible power supply even when electric power cannot be supplied from a commercial power supply due to power failure or the like.

Note that although the split-type air conditioner including the indoor unit and the outdoor unit is illustrated in FIG. 22 as an example, the power storage device of one embodiment of the present invention can be used in an air conditioner in which the functions of an indoor unit and an outdoor unit are integrated in one housing.

In FIG. 22, an electric refrigerator-freezer 8300 is an example of an electronic device including a power storage device 8304 of one embodiment of the present invention. Specifically, the electric refrigerator-freezer 8300 includes a housing 8301, a refrigerator door 8302, a freezer door 8303, and the power storage device 8304. The power storage device 8304 is provided in the housing 8301 in FIG. 22. The electric refrigerator-freezer 8300 can receive electric power from a commercial power supply. Alternatively, the electric refrigerator-freezer 8300 can use electric power stored in the power storage device 8304. Thus, the electric refrigerator-freezer 8300 can operate with the use of the power storage device 8304 of one embodiment of the present invention as an uninterruptible power supply even when electric power cannot be supplied from a commercial power supply due to power failure or the like.

Note that among the electronic devices described above, a high-frequency heating apparatus such as a microwave oven and an electronic device such as an electric rice cooker require high power in a short time. The tripping of a breaker of a commercial power supply in use of an electronic device can be prevented by using the power storage device of one embodiment of the present invention as an auxiliary power supply for supplying electric power which cannot be supplied enough by a commercial power supply.

In addition, in a time period when electronic devices are not used, particularly when the proportion of the amount of electric power which is actually used to the total amount of electric power which can be supplied from a commercial power supply source (such a proportion referred to as a usage rate of electric power) is low, electric power can be stored in the power storage device, whereby the usage rate of electric power can be reduced in a time period when the electronic devices are used. For example, in the case of the electric refrigerator-freezer 8300, electric power can be stored in the power storage device 8304 in nighttime when the temperature is low and the refrigerator door 8302 and the freezer door 8303 are not often opened or closed. On the other hand, in daytime when the temperature is high and the refrigerator door 8302 and the freezer door 8303 are frequently opened and closed, the power storage device 8304 is used as an auxiliary power supply; thus, the usage rate of electric power in daytime can be reduced.

This embodiment can be implemented in combination with any of the other embodiments as appropriate.

Embodiment 5

In this embodiment, examples of vehicles using power storage devices will be described.

The use of power storage devices in vehicles enables production of next-generation clean energy vehicles such as hybrid electric vehicles (HEVs), electric vehicles (EVs), and plug-in hybrid electric vehicles (PHEVs).

Figure 23A:
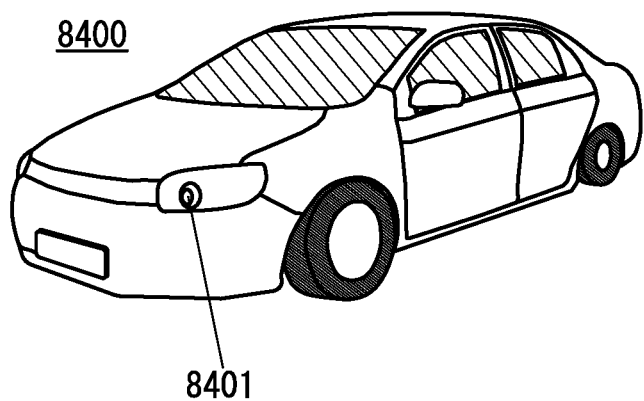
FIGS. 23A and 23B illustrate examples of electronic devices.
Figure 23B:
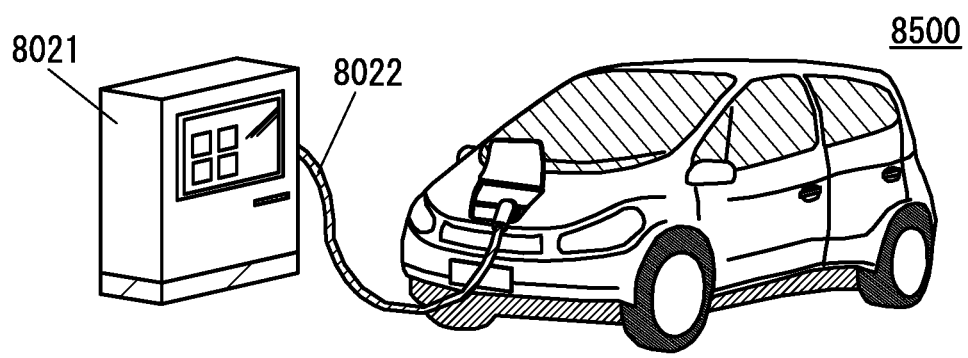

FIGS. 23A and 23B each illustrate an example of a vehicle using one embodiment of the present invention. An automobile 8400 illustrated in FIG. 23A is an electric vehicle that runs on the power of an electric motor. Alternatively, the automobile 8400 is a hybrid electric vehicle capable of driving appropriately using either the electric motor or the engine. One embodiment of the present invention can provide a high-mileage vehicle. The automobile 8400 includes the power storage device. The power storage device is used not only for driving an electric motor 8406, but also for supplying electric power to a light-emitting device such as a headlight 8401 or a room light (not illustrated).

The power storage device can also supply electric power to a display device of a speedometer, a tachometer, or the like included in the automobile 8400. Furthermore, the power storage device can supply electric power to a semiconductor device included in the automobile 8400, such as a navigation system.

FIG. 23B illustrates an automobile 8500 including a power storage device. The automobile 8500 can be charged when the power storage device is supplied with electric power through external charging equipment by a plug-in system, a contactless power feeding system, or the like. In FIG. 23B, the power storage device included in the automobile 8500 is charged with the use of a ground-based charging apparatus 8021 through a cable 8022. In charging, a given method such as CHAdeMO (registered trademark) or Combined Charging System may be employed as a charging method, the standard of a connector, or the like as appropriate. The ground-based charging apparatus 8021 may be a charging station provided in a commerce facility or a power source in a house. For example, with the use of a plug-in technique, the power storage device (not illustrated) included in the automobile 8500 can be charged by being supplied with electric power from outside. The charging can be performed by converting AC electric power into DC electric power through a converter such as an AC-DC converter.

Furthermore, although not illustrated, the vehicle may include a power receiving device so that it can be charged by being supplied with electric power from an above-ground power transmitting device in a contactless manner. In the case of the contactless power feeding system, by fitting a power transmitting device in a road or an exterior wall, charging can be performed not only when the electric vehicle is stopped but also when driven. In addition, the contactless power feeding system may be utilized to perform transmission and reception of electric power between vehicles. Furthermore, a solar cell may be provided in the exterior of the automobile to charge the power storage device when the automobile stops or moves. To supply electric power in such a contactless manner, an electromagnetic induction method or a magnetic resonance method can be used.

According to one embodiment of the present invention, the power storage device can have improved cycle characteristics and reliability. Furthermore, according to one embodiment of the present invention, the power storage device itself can be made more compact and lightweight as a result of improved characteristics of the power storage device. The compact and lightweight power storage device contributes to a reduction in the weight of a vehicle, and thus increases the driving distance. Furthermore, the power storage device included in the vehicle can be used as a power source for supplying electric power to products other than the vehicle. In such a case, the use of a commercial power source can be avoided at peak time of electric power demand.

This embodiment can be implemented in appropriate combination with any of the other embodiments.

Embodiment 6

In this embodiment, a battery management unit (BMU) which can be combined with a battery cell including the material described in the above embodiment and a transistor suitable for a circuit included in the battery management unit are described with reference to FIG. 24, FIGS. 25A to 25C, FIG. 26, FIG. 27, FIGS. 28A to 28C, FIG. 29, and FIG. 30.

In this embodiment, a battery management unit of a power storage device including battery cells that are connected in series is particularly described.

When a plurality of battery cells connected in series are charged and discharged repeatedly, each battery cell has different capacity (output voltage) from one another due to the variation in characteristics among the battery cells. A discharge capacity of all of the plurality of battery cells connected in series depends on a battery cell with small capacity. Capacity variation reduces the discharge capacity. Charging based on a battery cell with small capacity may cause insufficient charging. Charging based on a battery cell with high capacity may cause overcharge.

Thus, the battery management unit of the power storage device including battery cells connected in series has a function of reducing variation in capacities among the battery cells which causes insufficient charging or overcharge. Although circuit structures for reducing variation in capacities among the battery cells include a resistive type, a capacitor type, and an inductor type, here, a circuit structure which can reduce variation in capacities among the battery cells using transistors with a low off-state current is explained as an example.

As the transistor with a low off-state current, a transistor including an oxide semiconductor in its channel formation region (an OS transistor) is preferably used. When an OS transistor with a low off-state current is used in the circuit of the battery management unit of the power storage device, the amount of electric charge leaking from a battery can be reduced, and reduction in capacity with the lapse of time can be suppressed.

As the oxide semiconductor used in the channel formation region, an In-M-Zn oxide (M is Ga, Y, Zr, La, Ce, or Nd) is used. In the case where the atomic ratio of the metal elements of a target for forming an oxide semiconductor film is In:M:Zn=$x_1$:$y_1$:$z_1$, $x_1/y_1$ is preferably greater than or equal to 1/3 and less than or equal to 6, further preferably greater than or equal to 1 and less than or equal to 6, and $z_1/y_1$ is preferably greater than or equal to 1/3 and less than or equal to 6, further preferably greater than or equal to 1 and less than or equal to 6. Note that when $z_1/y_1$ is greater than or equal to 1 and less than or equal to 6, a CAAC-OS film as the oxide semiconductor film is easily formed.

Here, the details of the CAAC-OS film are described.

The CAAC-OS film is one of oxide semiconductor films having a plurality of c-axis aligned crystal parts.

In a combined analysis image (also referred to as a high-resolution TEM image) of a bright-field image and a diffraction pattern of a CAAC-OS film, which is obtained using a transmission electron microscope (TEM), a plurality of crystal parts can be observed. However, in the high-resolution TEM image, a boundary between crystal parts, that is, a grain boundary is not clearly observed. Thus, in the CAAC-OS film, a reduction in electron mobility due to the grain boundary is less likely to occur.

According to the high-resolution cross-sectional TEM image of the CAAC-OS film observed in a direction substantially parallel to a sample surface, metal atoms are arranged in a layered manner in the crystal parts. Each metal atom layer has a morphology reflecting unevenness of a surface over which the CAAC-OS film is formed (hereinafter, a surface over which the CAAC-OS film is formed is referred to as a formation surface) or of a top surface of the CAAC-OS film, and is arranged parallel to the formation surface or the top surface of the CAAC-OS film.

On the other hand, according to the high-resolution planar TEM image of the CAAC-OS film observed in a direction substantially perpendicular to the sample surface, metal atoms are arranged in a triangular or hexagonal configuration in the crystal parts. However, there is no regularity of arrangement of metal atoms between different crystal parts.

A CAAC-OS film is subjected to structural analysis with an X-ray diffraction (XRD) apparatus. For example, when the CAAC-OS film including an InGaZnO$_4$ crystal is analyzed by an out-of-plane method, a peak appears frequently when the diffraction angle (2θ) is around 31°. This peak is derived from the (009) plane of the InGaZnO$_4$ crystal, which indicates that crystals in the CAAC-OS film have c-axis alignment, and that the c-axes are aligned in a direction substantially perpendicular to the formation surface or the top surface of the CAAC-OS film.

Note that when the CAAC-OS film with an InGaZnO$_4$ crystal is analyzed by an out-of-plane method, a peak of 2θ may also be observed at around 36°, in addition to the peak of 2θ at around 31°. The peak of 2θ at around 36° indicates that a crystal having no c-axis alignment is included in part of the CAAC-OS film. It is preferable that in the CAAC-OS film, a peak of 2θ appear at around 31° and a peak of 2θ not appear at around 36°.

The CAAC-OS film is an oxide semiconductor film having low impurity concentration. The impurity is an element other than the main components of the oxide semiconductor film, such as hydrogen, carbon, silicon, or a transition metal element. In particular, an element that has higher bonding strength to oxygen than a metal element included in the oxide semiconductor film, such as silicon, disturbs the atomic arrangement of the oxide semiconductor film by depriving the oxide semiconductor film of oxygen and causes a decrease in crystallinity. Furthermore, a heavy metal such as iron or nickel, argon, carbon dioxide, or the like has a large atomic radius (molecular radius), and thus disturbs the atomic arrangement of the oxide semiconductor film and causes a decrease in crystallinity when it is contained in the oxide semiconductor film. Note that the impurity contained in the oxide semiconductor film might serve as a carrier trap or a carrier generation source.

The CAAC-OS film is an oxide semiconductor film having a low density of defect states. In some cases, oxygen vacancies in the oxide semiconductor film serve as carrier traps or serve as carrier generation sources when hydrogen is captured therein.

The state in which impurity concentration is low and density of defect states is low (the number of oxygen vacancies is small) is referred to as a "highly purified intrinsic" or "substantially highly purified intrinsic" state. A highly purified intrinsic or substantially highly purified intrinsic oxide semiconductor film has few carrier generation sources, and thus can have a low carrier density. Thus, a transistor including the oxide semiconductor film rarely has negative threshold voltage (is rarely normally on). The highly purified intrinsic or substantially highly purified intrinsic oxide semiconductor film has few carrier traps. Accordingly, the transistor including the oxide semiconductor film has little variation in electrical characteristics and high reliability. Electric charge trapped by the carrier traps in the oxide semiconductor film takes a long time to be released, and might behave like fixed electric charge. Thus, the transistor which includes the oxide semiconductor film having high impurity concentration and a high density of defect states has unstable electrical characteristics in some cases.

With the use of the CAAC-OS film in a transistor, variation in the electrical characteristics of the transistor due to irradiation with visible light or ultraviolet light is small.

Since an OS transistor has a wider band gap than a transistor including silicon in its channel formation region (a Si transistor), dielectric breakdown is unlikely to occur when a high voltage is applied. Although a voltage of several hundreds of volts is generated when battery cells are connected in series, the above-described OS transistor is suitable for a circuit of a battery management unit which is used for such battery cells in the power storage device.

Figure 24:
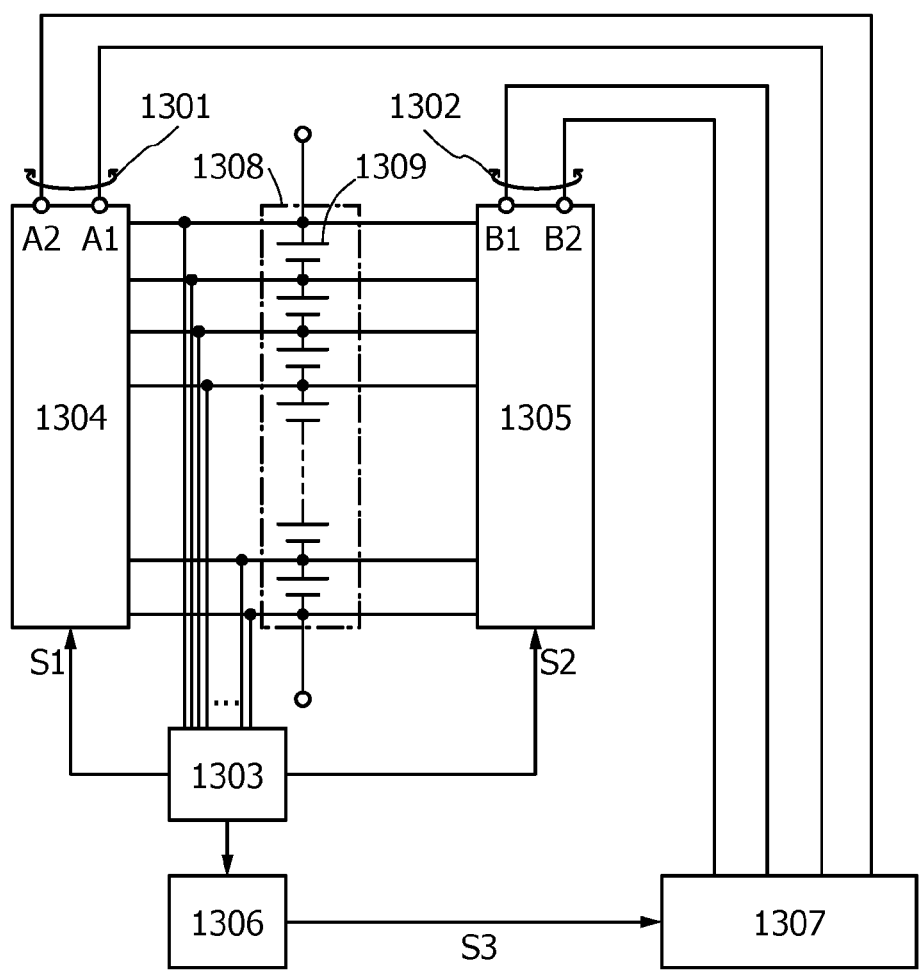
FIG. 24 is a block diagram illustrating one embodiment of the present invention.

FIG. 24 is an example of a block diagram of the power storage device. A power storage device 1300 illustrated in FIG. 24 includes a terminal pair 1301, a terminal pair 1302, a switching control circuit 1303, a switching circuit 1304, a switching circuit 1305, a voltage transformation control circuit 1306, a transformer circuit 1307, and a battery portion 1308 including a plurality of battery cells 1309 connected in series.

In the power storage device 1300 illustrated in FIG. 24, a portion including the terminal pair 1301, the terminal pair 1302, the switching control circuit 1303, the switching circuit 1304, the switching circuit 1305, the voltage transformation control circuit 1306, and the voltage transformer circuit 1307 can be referred to as a battery management unit.

The switching control circuit 1303 controls operations of the switching circuits 1304 and 1305. Specifically, the switching control circuit 1303 selects battery cells to be discharged (a discharge battery cell group) and battery cells to be charged (a charge battery cell group) in accordance with voltage measured for every battery cell 1309.

Furthermore, the switching control circuit 1303 outputs a control signal S1 and a control signal S2 on the basis of the selected discharge battery cell group and the selected charge battery cell group. The control signal S1 is output to the switching circuit 1304. The control signal S1 controls the switching circuit 1304 so that the terminal pair 1301 and the discharge battery cell group are connected. In addition, the control signal S2 is output to the switching circuit 1305. The control signal S2 controls the switching circuit 1305 so that the terminal pair 1302 and the charge battery cell group are connected.

The switching control circuit 1303 generates the control signal S1 and the control signal S2 on the basis of connection relation of the switching circuit 1304, the switching circuit 1305, and the voltage transformer circuit 1307 so that terminals with the same polarity are connected to each other in the terminal pair 1302 and the charge battery cell group.

An operation of the switching control circuit 1303 is described in detail.

First, the switching control circuit 1303 measures the voltage of each of the plurality of battery cells 1309. Then, the switching control circuit 1303 determines that the battery cell 1309 having a voltage higher than a predetermined threshold value is a high-voltage battery cell (high-voltage cell) and that the battery cell 1309 having a voltage lower than the predetermined threshold value is a low-voltage battery cell (low-voltage cell), for example.

As a method to determine whether a battery cell is a high-voltage cell or a low-voltage cell, any of various methods can be employed. For example, the switching control circuit 1303 may determine whether each battery cell 1309 is a high-voltage cell or a low-voltage cell on the basis of the voltage of a battery cell 1309 having the highest voltage or the lowest voltage among the plurality of battery cells 1309. In this case, the switching control circuit 1303 can determine whether each battery cell 1309 is a high-voltage cell or a low-voltage cell by determining whether or not a ratio of a voltage of each battery cell 1309 to the reference voltage is the predetermined value or more. Then, the switching control circuit 1303 determines a charge battery cell group and a discharge battery cell group on the basis of the determination result.

Note that high-voltage cells and low-voltage cells are possibly mixed in various states in the plurality of battery cells 1309. The switching control circuit 1303 selects a portion having the largest number of consecutive high-voltage cells connected in series as the discharge battery cell group of mixed high-voltage cells and low-voltage cells, for example. Furthermore, the switching control circuit 1303 selects a portion having the largest number of consecutive low-voltage cells connected in series as the charge battery cell group. In addition, the switching control circuit 1303 may preferentially select battery cells 1309 which are nearly overcharged or overdischarged as the discharge battery cell group or the charge battery cell group.

Figure 25A:
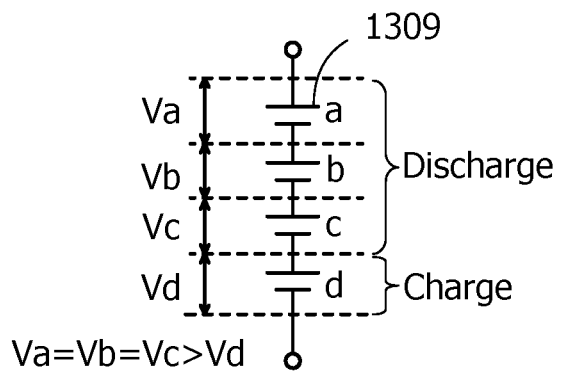
FIGS. 25A to 25C are conceptual diagrams each illustrating one embodiment of the present invention.
Figure 25B:
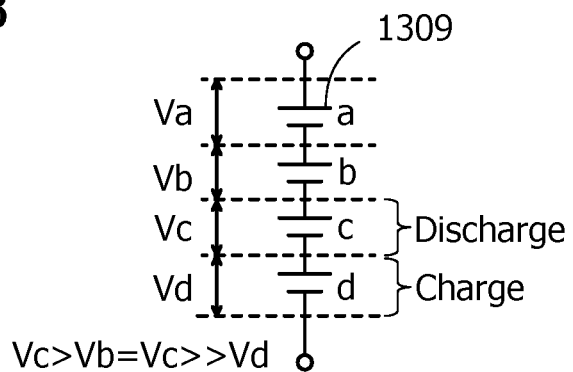
Figure 25C:
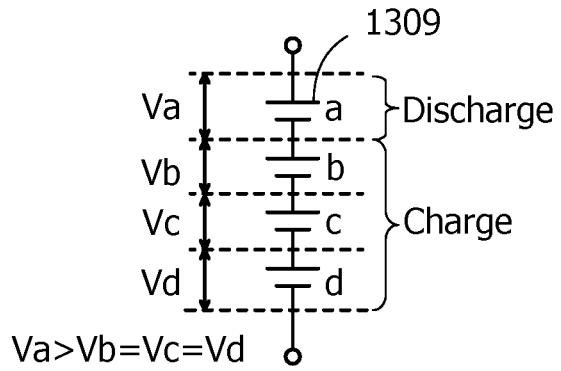

Here, operation examples of the switching control circuit 1303 in this embodiment are described with reference to FIGS. 25A to 25C. FIGS. 25A to 25C illustrate operation examples of the switching control circuit 1303. Note that FIGS. 25A to 25C each illustrate the case where four battery cells 1309 are connected in series as an example for convenience of explanation.

FIG. 25A shows the case where the relation of voltages Va, Vb, Vc, and Vd is Va=Vb=Vc>Vd where the voltages Va, Vb, Vc, and Vd are voltages of a battery cell 1309a, a battery cell 1309b, a battery cell 1309c, and a battery cell 1309d, respectively. That is, a series of three high-voltage cells a to c and a low-voltage cell d are connected in series. In that case, the switching control circuit 1303 selects the three consecutive high-voltage cells a to c as the discharge battery cell group. In addition, the switching control circuit 1303 selects the low-voltage cell D as the charge battery cell group.

Next, FIG. 25B shows the case where the relation of the voltages is Vc>Vb=Va>>Vd. That is, a series of two low-voltage cells a and b, one high-voltage cell c, and one low-voltage cell D which is nearly overdischarged are connected in series. In that case, the switching control circuit 1303 selects the high-voltage cell c as the discharge battery cell group. Since the low-voltage cell D is nearly overdischarged, the switching control circuit 1303 preferentially selects the low-voltage cell D as the charge battery cell group instead of the two consecutive low-voltage cells a and b.

Lastly, FIG. 25C shows the case where the relation of the voltages is Va>Vb=Vc=Vd. That is, one high-voltage cell a and a series of three low-voltage cells b to d are connected in series. In that case, the switching control circuit 1303 selects the high-voltage cell a as the discharge battery cell group. In addition, the switching control circuit 1303 selects the series of three low-voltage cells b to d as the charge battery cell group.

On the basis of the determination result shown in the examples of FIGS. 25A to 25C, the switching control circuit 1303 outputs the control signal S1 and the control signal S2 to the switching circuit 1304 and the switching circuit 1305, respectively. Information showing the discharge battery cell group being the connection destination of the switching circuit 1304 is set in the control signal S1. Information showing the charge battery cell group being a connection destination of the switching circuit 1305 is set in the control signal S2.

The above is the detailed description of the operation of the switching control circuit 1303.

The switching circuit 1304 sets the discharge battery cell group selected by the switching control circuit 1303 as the connection destination of the terminal pair 1301 in response to the control signal Si output from the switching control circuit 1303.

The terminal pair 1301 includes a pair of terminals A1 and A2. The switching circuit 1304 sets the connection destination of the terminal pair 1301 by connecting one of the pair of terminals A1 and A2 to a positive electrode terminal of the battery cell 1309 positioned on the most upstream side (on the high potential side) of the discharge battery cell group, and the other to a negative electrode terminal of the battery cell 1309 positioned on the most downstream side (on the low potential side) of the discharge battery cell group. Note that the switching circuit 1304 can recognize the position of the discharge battery cell group on the basis of the information set in the control signal S1.

The switching circuit 1305 sets the charge battery cell group selected by the switching control circuit 1303 as the connection destination of the terminal pair 1302 in response to the control signal S2 output from the switching control circuit 1303.

The terminal pair 1302 includes a pair of terminals B1 and B2. The switching circuit 1305 sets the connection destination of the terminal pair 1302 by connecting one of the pair of terminals B1 and B2 to a positive electrode terminal of the battery cell 1309 positioned on the most upstream side (on the high potential side) of the charge battery cell group, and the other to a negative electrode terminal of the battery cell 1309 positioned on the most downstream side (on the low potential side) of the charge battery cell group. Note that the switching circuit 1305 can recognize the position of the charge battery cell group on the basis of the information set in the control signal S2.

Figure 26:
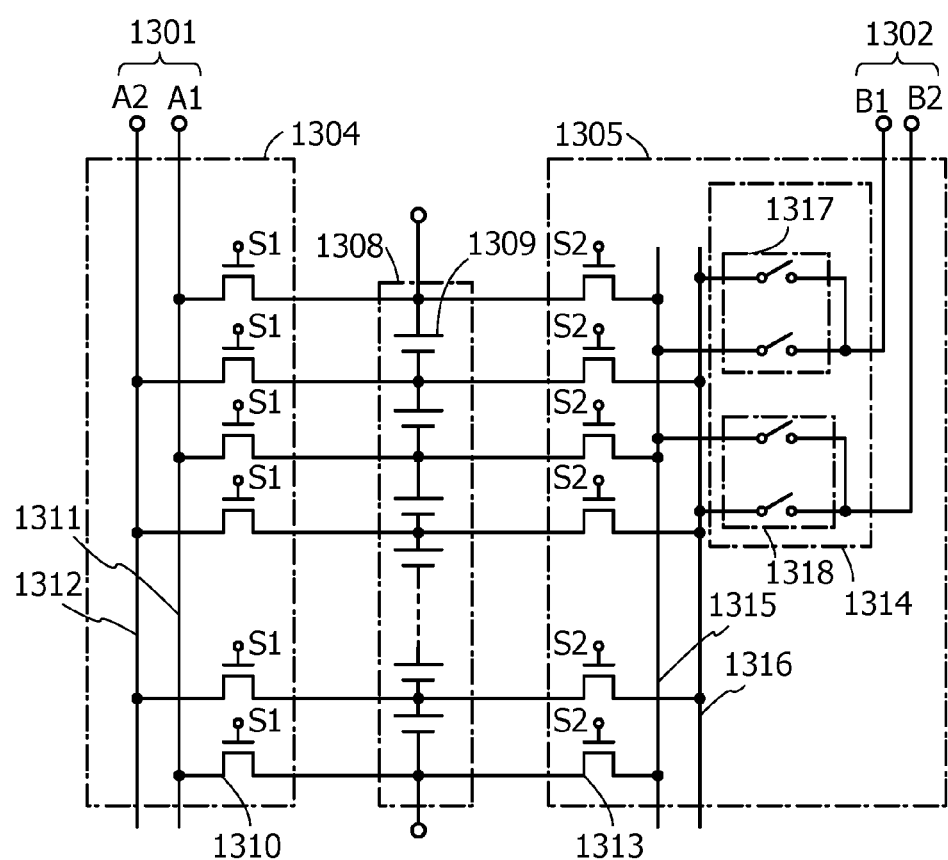
FIG. 26 is a circuit diagram illustrating one embodiment of the present invention.
Figure 27:
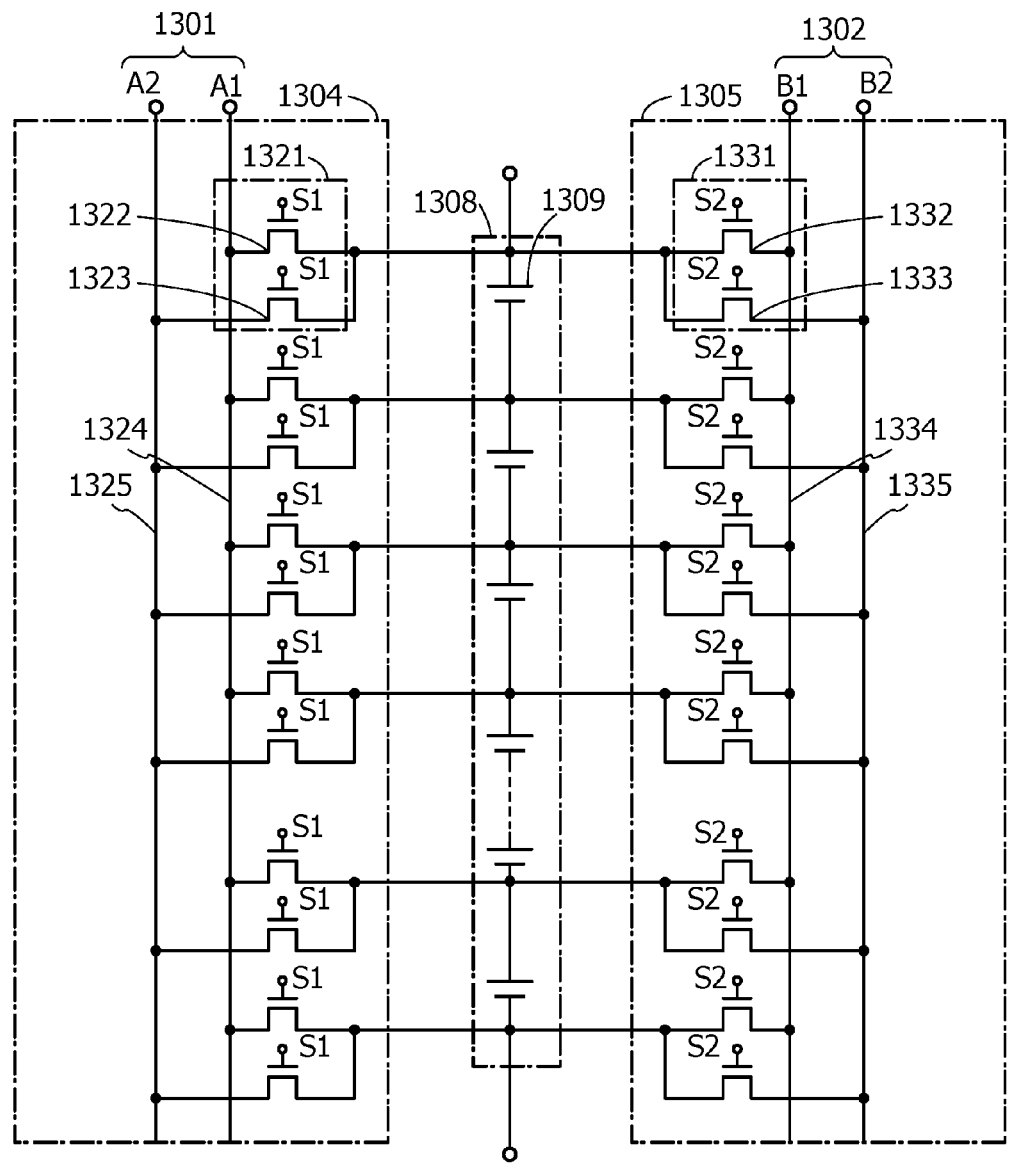
FIG. 27 is a circuit diagram illustrating one embodiment of the present invention.

FIG. 26 and FIG. 27 are circuit diagrams each showing a configuration example of the switching circuits 1304 and 1305.

In FIG. 26, the switching circuit 1304 includes a plurality of transistors 1310, a bus 1311, and a bus 1312. The bus 1311 is connected to the terminal A1. The bus 1312 is connected to the terminal A2. Sources or drains of the plurality of transistors 1310 are connected alternately to the bus 1311 and the bus 1312. The drains or the sources of the plurality of transistors 1310 are each connected between two adjacent battery cells 1309.

The drain or the source of the transistor 1310 on the most upstream side of the plurality of transistors 1310 is connected to a positive electrode terminal of the battery cell 1309 on the most upstream side of the battery portion 1308. The drain or the source of the transistor 1310 on the most downstream side of the plurality of transistors 1310 is connected to a negative electrode terminal of the battery cell 1309 on the most downstream side of the battery portion 1308.

The switching circuit 1304 connects the discharge battery cell group to the terminal pair 1301 by bringing one of the plurality of the transistors 1310 which are connected to the bus 1311 and one of the plurality of transistors 1310 which are connected to the bus 1312 into an on state in response to the control signal Si supplied to gates of the plurality of transistors 1310. Accordingly, the positive electrode terminal of the battery cell 1309 on the most upstream side of the discharge battery cell group is connected to one of the pair of terminals A1 and A2. In addition, the negative electrode terminal of the battery cell 1309 on the most downstream side of the discharge battery cell group is connected to the other of the pair of terminals A1 and A2 (i.e., a terminal which is not connected to the positive electrode terminal).

An OS transistor is preferably used as the transistor 1310. Since the off-state current of the OS transistor is low, the amount of electric charge leaking from battery cells which do not belong to the discharge battery cell group can be reduced, and reduction in capacity with the lapse of time can be suppressed. In addition, dielectric breakdown is unlikely to occur in the OS transistor when a high voltage is applied. Therefore, the battery cell 1309 and the terminal pair 1301, which are connected to the transistor 1310 in an off state, can be insulated from each other even when an output voltage of the discharge battery cell group is high.

In FIG. 26, the switching circuit 1305 includes a plurality of transistors 1313, a current control switch 1314, a bus 1315, and a bus 1316. The bus 1315 and the bus 1316 are provided between the plurality of transistors 1313 and the current control switch 1314. Sources or drains of the plurality of transistors 1313 are connected alternately to the bus 1315 and the bus 1316. The drains or the sources of the plurality of transistors 1313 are each connected between two adjacent battery cells 1309.

The drain or the source of the transistor 1313 on the most upstream side of the plurality of transistors 1313 is connected to a positive electrode terminal of the battery cell 1309 on the most upstream side of the battery portion 1308. The drain or the source of the transistor 1313 on the most downstream side of the plurality of transistors 1313 is connected to a negative electrode terminal of the battery cell 1309 on the most downstream side of the battery portion 1308.

An OS transistor is preferably used as the transistor 1313 like the transistors 1310. Since the off-state current of the OS transistor is low, the amount of electric charge leaking from the battery cells which do not belong to the charge battery cell group can be reduced, and reduction in capacity due to the lapse of time can be suppressed. In addition, dielectric breakdown is unlikely to occur in the OS transistor when a high voltage is applied. Therefore, the battery cell 1309 and the terminal pair 1302, which are connected to the transistor 1313 in an off state, can be insulated from each other even when a voltage for charging the charge battery cell group is high.

The current control switch 1314 includes a switch pair 1317 and a switch pair 1318. Terminals on one end of the switch pair 1317 are connected to the terminal B1. In addition, terminals on the other end of the switch pair 1317 are connected to different buses: one switch is connected to the bus 1315 and the other switch is connected to the bus 1316. Terminals on one end of the switch pair 1318 are connected to the terminal B2. In addition, terminals on the other end of the switch pair 1318 are connected to different buses: one switch is connected to the bus 1315 and the other switch is connected to the bus 1316.

OS transistors are preferably used for the switches included in the switch pair 1317 and the switch pair 1318 like the transistors 1310 and 1313.

The switching circuit 1305 connects the charge battery cell group and the terminal pair 1302 by controlling the combination of on and off states of the transistors 1313 and the current control switch 1314 in response to the control signal S2.

For example, the switching circuit 1305 connects the charge battery cell group and the terminal pair 1302 in the following manner.

The switching circuit 1305 brings a transistor 1313 connected to a positive electrode terminal of the battery cell 1309 on the most upstream side of the charge battery cell group into an on state in response to the control signal S2 supplied to gates of the plurality of the transistors 1313. In addition, the switching circuit 1305 brings a transistor 1313 connected to a negative electrode terminal of the battery cell 1309 on the most downstream side of the charge battery cell group into an on state in response to the control signal S2 supplied to gates of the plurality of the transistors 1313.

The polarities of voltages applied to the terminal pair 1302 can vary in accordance with the connection structures of the discharge battery cell group connected to the terminal pair 1301 and the voltage transformer circuit 1307. In order to supply current in a direction for charging the charge battery cell group, terminals with the same polarity are required to be connected to each other in the terminal pair 1302 and the charge battery cell group. In view of this, the current control switch 1314 is controlled by the control signal S2 so that the connection destination of the switch pair 1317 and that of the switch pair 1318 are changed in accordance with the polarities of the voltages applied to the terminal pair 1302.

The state where voltages are applied to the terminal pair 1302 so as to make the terminal B1 a positive electrode and the terminal B2 a negative electrode is described as an example. Here, in the case where the battery cell 1309 positioned on the most downstream side of the battery portion 1308 is in the charge battery cell group, the switch pair 1317 is controlled to be connected to the positive electrode terminal of the battery cell 1309 in response to the control signal S2. That is, the switch of the switch pair 1317 connected to the bus 1316 is turned on, and the switch of the switch pair 1317 connected to the bus 1315 is turned off. In contrast, the switch pair 1318 is controlled to be connected to the negative electrode terminal of the battery cell 1309 positioned on the most downstream side of the battery portion 1308 in response to the control signal S2. That is, the switch of the switch pair 1318 connected to the bus 1315 is turned on, and the switch of the switch pair 1318 connected to the bus 1316 is turned off. In this manner, terminals with the same polarity are connected to each other in the terminal pair 1302 and the charge battery cell group. In addition, the current which flows from the terminal pair 1302 is controlled to be supplied in a direction so as to charge the charge battery cell group.

In addition, instead of the switching circuit 1305, the switching circuit 1304 may include the current control switch 1314. In that case, the polarities of the voltages applied to the terminal pair 1302 are controlled by controlling the polarities of the voltages applied to the terminal pair 1301 in response to the operation of the current control switch 1314 and the control signal S1. Thus, the current control switch 1314 controls the direction of current which flows to the charge battery cell group from the terminal pair 1302.

FIG. 27 is a circuit diagram illustrating structure examples of the switching circuit 1304 and the switching circuit 1305 which are different from those of FIG. 26.

In FIG. 27, the switching circuit 1304 includes a plurality of transistor pairs 1321, a bus 1324, and a bus 1325. The bus 1324 is connected to the terminal A1. The bus 1325 is connected to the terminal A2. Terminals on one end of each of the plurality of transistor pairs 1321 are connected to different buses: a source or a drain of the transistor 1322 is connected to the bus 1324 and a sources or a drain of the transistor 1323 is connected to the bus 1325. In addition, terminals on the other end of the plurality of the transistor pairs are each connected between two adjacent battery cells 1309. Note that the terminal on the other end of the transistor pair 1321 on the most upstream side of the plurality of transistor pairs 1321 is connected to the positive electrode terminal of the battery cell 1309 on the most upstream side of the battery portion 1308. Note also that the terminal on the other end of the transistor pair 1321 on the most downstream side of the plurality of transistor pairs 1321 is connected to a negative electrode terminal of the battery cell 1309 on the most downstream side of the battery portion 1308.

The switching circuit 1304 switches the connection destination of the transistor pair 1321 to one of the terminal A1 and the terminal A2 by turning on or off the transistors 1322 and 1323 in response to the control signal S1. Specifically, when the transistor 1322 is turned on, the transistor 1323 is turned off, so that the connection destination of the transistor pair 1321 is the terminal A1. On the other hand, when the transistor 1323 is turned on, the transistor 1322 is turned off, so that the connection destination of the transistor pair 1321 is the terminal A2. Which of the transistors 1322 and 1323 is turned on is determined by the control signal S1.

Two transistor pairs 1321 are used to connect the terminal pair 1301 and the discharge battery cell group. Specifically, the connection destinations of the two transistor pairs 1321 are determined on the basis of the control signal S1, and the discharge battery cell group and the terminal pair 1301 are connected. The connection destinations of the two transistor pairs 1321 are controlled by the control signal S1 so that one of the connection destinations is the terminal A1 and the other is the terminal A2.

The switching circuit 1305 includes a plurality of transistor pairs 1331, a bus 1334 and a bus 1335. The bus 1334 is connected to the terminal B1. The bus 1335 is connected to the terminal B2. Terminals on one end of each of the plurality of transistor pairs 1331 are connected to different buses: the terminal on one end connected via the transistor 1332 is connected to the bus 1334 and the terminal on one end connected via the transistor 1333 is connected to the bus 1335. In addition, terminals on the other end of the plurality of the transistor pairs 1331 are each connected between two adjacent battery cells 1309. Note that the terminal on the other end of the transistor pair 1331 on the most upstream side of the plurality of transistor pairs 1331 is connected to a positive electrode terminal of a battery cell 1309 on the most upstream side of the battery portion 1308. Note also that the terminal on the other end of the transistor pair 1331 on the most downstream side of the plurality of transistor pairs 1331 is connected to a negative electrode terminal of a battery cell 1309 on the most downstream side of the battery portion 1308.

The switching circuit 1305 switches the connection destination of the transistor pair 1331 to one of the terminal B1 and the terminal B2 by turning on or off the transistors 1332 and 1333 in response to the control signal S2. Specifically, when the transistor 1332 is turned on, the transistor 1333 is turned off, so that the connection destination of the transistor pair 1331 is the terminal B1. On the other hand, when the transistor 1333 is turned on, the transistor 1332 is turned off, so that the connection destination of the transistor pair 1331 is the terminal B2. Which of the transistors 1332 and 1333 is turned on is determined by the control signal S2.

Two transistor pairs 1331 are used to connect the terminal pair 1302 and the charge battery cell group. Specifically, the connection destinations of the two transistor pairs 1331 are determined on the basis of the control signal S2, and the charge battery cell group and the terminal pair 1302 are connected. The connection destinations of the two transistor pairs 1331 are controlled by the control signal S2 so that one of the connection destinations is the terminal B1 and the other is the terminal B2.

The connection destinations of the two transistor pairs 1331 are determined by the polarities of the voltages applied to the terminal pair 1302. Specifically, in the case where voltages which make the terminal B1 a positive electrode and the terminal B2 a negative electrode are applied to the terminal pair 1302, the transistor pair 1331 on the upstream side is controlled by the control signal S2 so that the transistor 1332 is turned on and the transistor 1333 is turned off. In contrast, the transistor pair 1331 on the downstream side is controlled by the control signal S2 so that the transistor 1333 is turned on and the transistor 1332 is turned off. In the case where voltages which make the terminal B1 a negative electrode and the terminal B2 a positive electrode are applied to the terminal pair 1302, the transistor pair 1331 on the upstream side is controlled by the control signal S2 so that the transistor 1333 is turned on and the transistor 1332 is turned off. In contrast, the transistor pair 1331 on the downstream side is controlled by the control signal S2 so that the transistor 1332 is turned on and the transistor 1333 is turned off. In this manner, terminals with the same polarity are connected to each other in the terminal pair 1302 and the charge battery cell group. In addition, the current which flows from the terminal pair 1302 is controlled to be supplied in a direction for charging the charge battery cell group.

The voltage transformation control circuit 1306 controls operation of the voltage transformer circuit 1307. The voltage transformation control circuit 1306 generates a voltage transformation signal S3 for controlling the operation of the voltage transformer circuit 1307 on the basis of the number of battery cells 1309 included in the discharge battery cell group and the number of the battery cells 1309 included in the charge battery cell group and outputs the voltage transformation signal S3 to the voltage transformer circuit 1307.

In the case where the number of the battery cells 1309 included in the discharge battery cell group is larger than that included in the charge battery cell group, it is necessary to prevent a charging voltage which is too high from being applied to the charge battery cell group. Thus, the voltage transformation control circuit 1306 outputs the voltage transformation signal S3 for controlling the voltage transformer circuit 1307 so that a discharging voltage (Vdis) is lowered within a range where the charge battery cell group can be charged.

In the case where the number of the battery cells 1309 included in the discharge battery cell group is less than or equal to that included in the charge battery cell group, a voltage necessary for charging the charge battery cell group needs to be secured. Therefore, the voltage transformation control circuit 1306 outputs the voltage transformation signal S3 for controlling the voltage transformer circuit 1307 so that the discharging voltage (Vdis) is raised within a range where a charging voltage which is too high is not applied to the charge battery cell group.

The voltage value of the charging voltage which is too high is determined in the light of product specifications and the like of the battery cell 1309 used in the battery portion 1308. The voltage which is raised or lowered by the voltage transformer circuit 1307 is applied as a charging voltage (Vcha) to the terminal pair 1302.

Figure 28A:
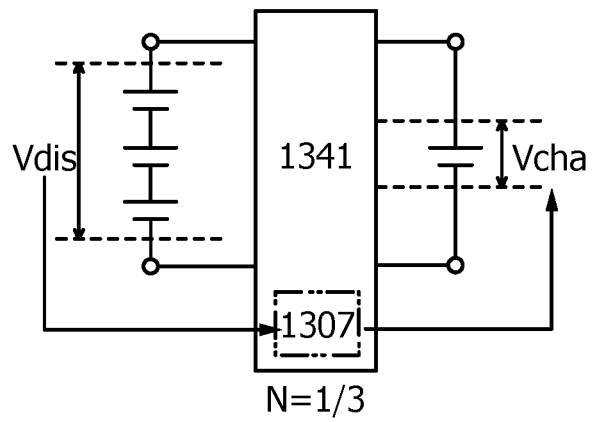
FIGS. 28A to 28C are conceptual diagrams illustrating one embodiment of the present invention.
Figure 28B:
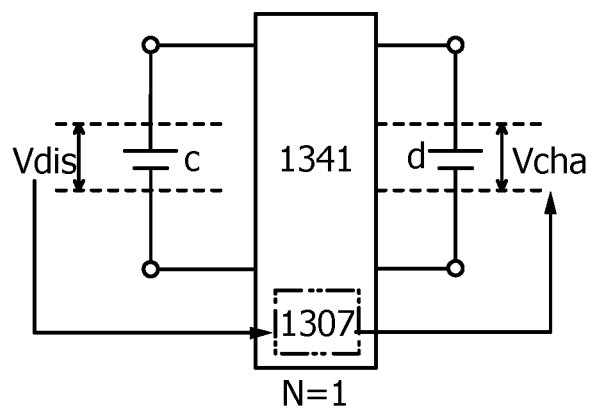
Figure 28C:
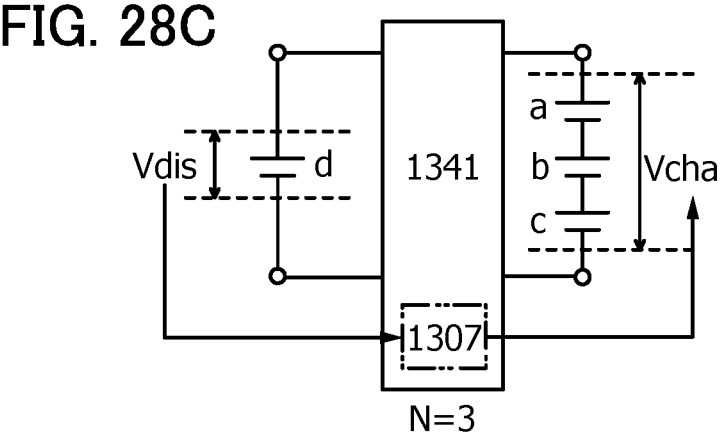

Here, an operation example of the voltage transformation control circuit 1306 in this embodiment is described with reference to FIGS. 28A to 28C. FIGS. 28A to 28C are conceptual diagrams for explaining the operation examples of the voltage transformation control circuit 1306 corresponding to the discharge battery cell group and the charge battery cell group described in FIGS. 25A to 25C. FIGS.

28A to 28C illustrate a battery management unit 1341. As described above, the battery management unit 1341 includes the terminal pair 1301, the terminal pair 1302, the switching control circuit 1303, the switching circuit 1304, the switching circuit 1305, the voltage transformation control circuit 1306, and the voltage transformer circuit 1307.

In an example illustrated in FIG. 28A, the series of three high-voltage cells a to c and one low-voltage cell D are connected in series as described in FIG. 25A. In that case, as described using FIG. 25A, the switching control circuit 1303 selects the high-voltage cells a to c as the discharge battery cell group, and selects the low-voltage cell D as the charge battery cell group. The voltage transformation control circuit 1306 calculates a conversion ratio N for converting the discharging voltage (Vdis) to the charging voltage (Vcha) based on the ratio of the number of the battery cells 1309 included in the charge battery cell group to the number of the battery cells 1309 included in the discharge battery cell group.

In the case where the number of the battery cells 1309 included in the discharge battery cell group is larger than that included in the charge battery cell group, when a discharging voltage is applied to the terminal pair 1302 without transforming the voltage, overvoltage may be applied to the battery cells 1309 included in the charge battery cell group through the terminal pair 1302. Thus, in the case of FIG. 28A, it is necessary that a charging voltage (Vcha) applied to the terminal pair 1302 be lowered than the discharging voltage. In addition, in order to charge the charge battery cell group, it is necessary that the charging voltage be larger than the total voltage of the battery cells 1309 included in the charge battery cell group. Thus, the voltage transformation control circuit 1306 sets the conversion ratio N greater than the ratio of the number of the battery cells 1309 included in the charge battery cell group to the number of the battery cells 1309 included in the discharge battery cell group.

Thus, the voltage transformation control circuit 1306 preferably sets the conversion ratio N greater than the ratio of the number of the battery cells 1309 included in the charge battery cell group to the number of the battery cells 1309 included in the discharge battery cell group by about 1% to 10%. Here, the charging voltage is made larger than the voltage of the charge battery cell group, but the charging voltage is equal to the voltage of the charge battery cell group in reality. Note that the voltage transformation control circuit 1306 feeds a current for charging the charge battery cell group in accordance with the conversion ratio N in order to make the voltage of the charge battery cell group equal to the charging voltage. The value of the current is set in the voltage transformation control circuit 1306.

In the example illustrated in FIG. 28A, since the number of the battery cells 1309 included in the discharge battery cell group is three and the number of the battery cells 1309 included in the charge battery cell group is one, the voltage transformation control circuit 1306 calculates a value which is slightly larger than 1/3 as the conversion ratio N. Then, the voltage transformation control circuit 1306 outputs the voltage transformation signal S3, which lowers the discharging voltage in accordance with the conversion ratio N and converting the voltage into a charging voltage, to the voltage transformer circuit 1307. The voltage transformer circuit 1307 applies the charging voltage which is obtained by transformation in response to the voltage transformation signal S3 to the terminal pair 1302. Then, the battery cells 1309 included in the charge battery cell group are charged with the charging voltage applied to the terminal pair 1302.

In each of examples illustrated in FIGS. 28B and 28C, the conversion ratio N is calculated in a manner similar to that of FIG. 28A. In each of the examples illustrated in FIGS. 28B and 28C, since the number of the battery cells 1309 included in the discharge battery cell group is less than or equal to the number of the battery cells 1309 included in the charge battery cell group, the conversion ratio N is 1 or more. Therefore, in this case, the voltage transformation control circuit 1306 outputs the voltage transformation signal S3 for raising the discharging voltage and converting the voltage into the charging voltage.

The voltage transformer circuit 1307 converts the discharging voltage applied to the terminal pair 1301 into a charging voltage on the basis of the voltage transformation signal S3. The voltage transformer circuit 1307 applies the converted charging voltage to the terminal pair 1302. Here, the voltage transformer circuit 1307 electrically insulates the terminal pair 1301 from the terminal pair 1302. Accordingly, the voltage transformer circuit 1307 prevents a short circuit due to a difference between the absolute voltage of the negative electrode terminal of the battery cell 1309 on the most downstream side of the discharge battery cell group and the absolute voltage of the negative electrode terminal of the battery cell 1309 on the most downstream side of the charge battery cell group. Furthermore, the voltage transformer circuit 1307 converts the discharging voltage, which is the total voltage of the discharge battery cell group, into the charging voltage on the basis of the voltage transformation signal S3 as described above.

An insulated direct current (DC)-DC converter or the like can be used in the voltage transformer circuit 1307. In that case, the voltage transformation control circuit 1306 controls the charging voltage converted by the voltage transformer circuit 1307 by outputting a signal for controlling the on/off ratio (the duty ratio) of the insulated DC-DC converter as the voltage transformation signal S3.

Examples of the insulated DC-DC converter include a flyback converter, a forward converter, a ringing choke converter (RCC), a push-pull converter, a half-bridge converter, and a full-bridge converter, and a suitable converter is selected in accordance with the value of the intended output voltage.

Figure 29:
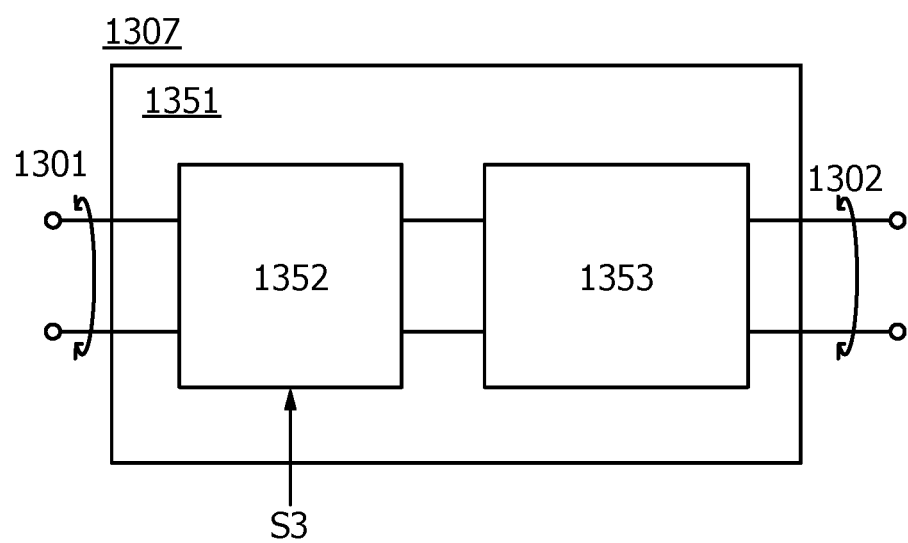
FIG. 29 is a block diagram illustrating one embodiment of the present invention.

The structure of the voltage transformer circuit 1307 including the insulated DC-DC converter is illustrated in FIG. 29. An insulated DC-DC converter 1351 includes a switch portion 1352 and a transformer 1353. The switch portion 1352 is a switch for switching on/off of the operation of the insulated DC-DC converter, and a metal oxide semiconductor field-effect transistor (MOSFET), a bipolar transistor, or the like is used as the switch portion 1352. The switch portion 1352 periodically turns on and off the insulated DC-DC converter 1351 in accordance with the voltage transformation signal S3 controlling the on/off ratio which is output from the voltage transformation control circuit 1306. The switch portion 1352 can have various structures in accordance with the type of the insulated DC-DC converter which is used. The transformer 1353 converts the discharging voltage applied from the terminal pair 1301 into the charging voltage. In detail, the transformer 1353 operates in conjunction with the on/off state of the switch portion 1352 and converts the discharging voltage into the charging voltage in synchronization with the on/off ratio. As the time during which the switch portion 1352 is on becomes longer in its switching period, the charging voltage is increased. On the other hand, as the time during which the switch portion 1352 is on becomes shorter in its switching period, the charging voltage is decreased. In the case where the insulated DC-DC converter is used, the terminal pair 1301 and the terminal pair 1302 can be insulated from each other inside the transformer 1353.

Figure 30:
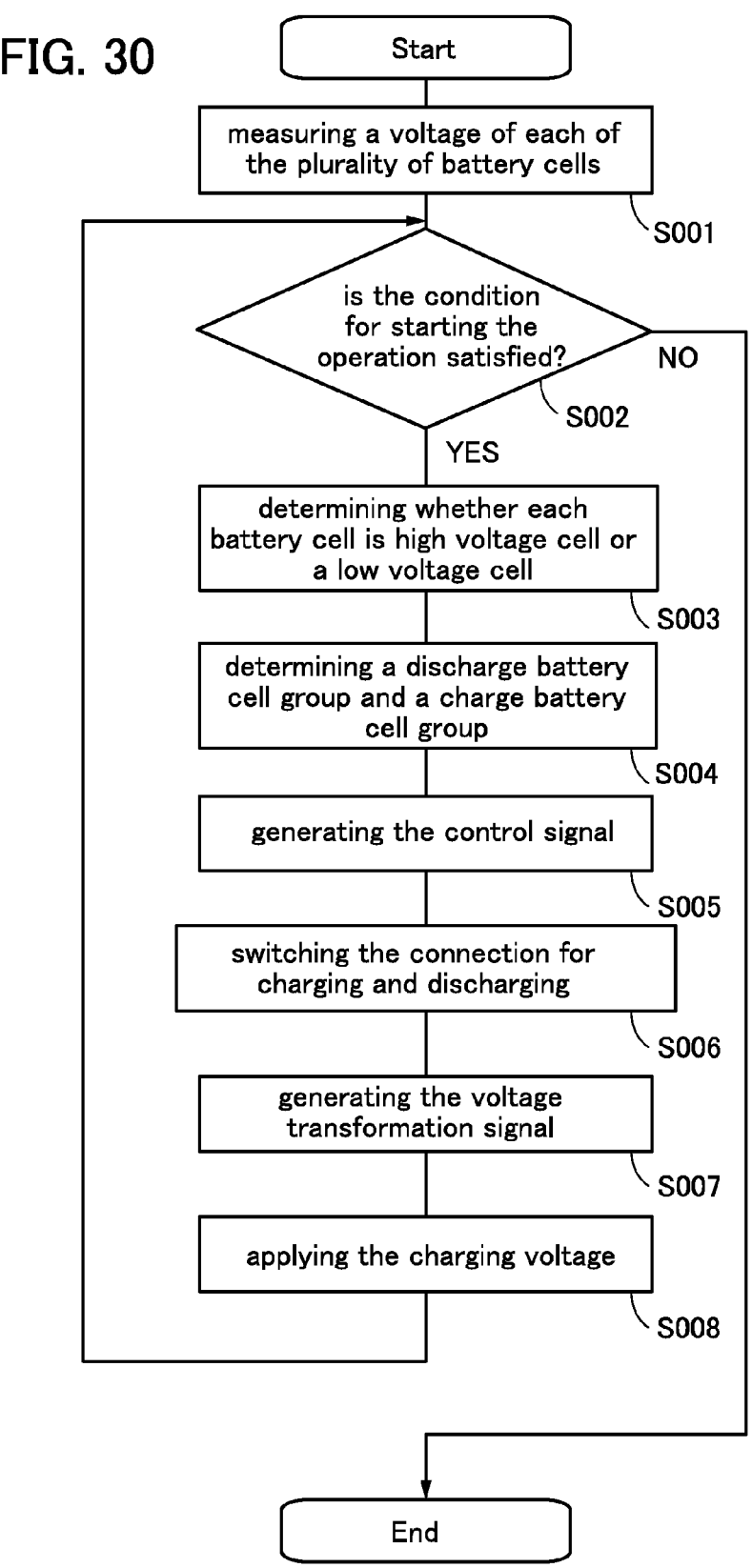
FIG. 30 is a flow chart illustrating one embodiment of the present invention.

A flow of operation of the power storage device 1300 in this embodiment is described with reference to FIG. 30. FIG. 30 is a flow chart illustrating the flow of the operation of the power storage device 1300.

First, the power storage device 1300 obtains a voltage measured for each of the plurality of battery cells 1309 (step S001). Then, the power storage device 1300 determines whether or not the condition for starting the operation of reducing variation in voltages of the plurality of the battery cells 1309 is satisfied (step S002). An example of the condition can be that the difference between the maximum value and the minimum value of the voltage measured for each of the plurality of the battery cells 1309 is higher than or equal to the predetermined threshold value. In the case where the condition is not satisfied (step S002: NO), the power storage device 1300 does not perform the following operation because voltages of the battery cells 1309 are well balanced. In contrast, in the case where the condition is satisfied (step S002: YES), the power storage device 1300 performs the operation of suppressing variation in the voltages of the battery cells 1309. In this operation, the power storage device 1300 determines whether each battery cell 1309 is a high voltage cell or a low voltage cell on the basis of the measured voltage of each cell (step S003). Then, the power storage device 1300 determines a discharge battery cell group and a charge battery cell group on the basis of the determination result (step S004). In addition, the power storage device 1300 generates the control signal S1 for setting the determined discharge battery cell group as the connection destination of the terminal pair 1301, and the control signal S2 for setting the determined charge battery cell group as the connection destination of the terminal pair 1302 (step S005). The power storage device 1300 outputs the generated control signals S1 and S2 to the switching circuit 1304 and the switching circuit 1305, respectively. Then, the switching circuit 1304 connects the terminal pair 1301 and the discharge battery cell group, and the switching circuit 1305 connects the terminal pair 1302 and the discharge battery cell group (step S006). The power storage device 1300 generates the voltage transformation signal S3 based on the number of battery cells 1309 included in the discharge battery cell group and the number of the battery cells 1309 included in the charge battery cell group (step S007). Then, the power storage device 1300 converts the discharging voltage applied to the terminal pair 1301 into a charging voltage based on the voltage transformation signal S3 and applies the charging voltage to the terminal pair 1302 (step S008). In this way, electric charge of the discharge battery cell group is transferred to the charge battery cell group.

Although the plurality of steps are shown in order in the flow chart of FIG. 30, the order of performing the steps is not limited to the order.

According to the above embodiment, when an electric charge is transferred from the discharge battery cell group to the charge battery cell group, a structure where an electric charge from the discharge battery cell group is temporarily stored, and the stored electric charge is sent to the charge battery cell group is unnecessary, unlike in the a capacitor type circuit. Accordingly, the charge transfer efficiency per unit time can be increased. In addition, the switching circuit 1304 and the switching circuit 1305 determine which battery cell in the discharge battery cell group and the charge battery cell group to be connected to the transformer circuit Furthermore, the voltage transformer circuit 1307 converts the discharging voltage applied to the terminal pair 1301 into the charging voltage based on the number of the battery cells 1309 included in the discharge battery cell group and the number of the battery cells 1309 included in the charge battery cell group, and applies the charging voltage to the terminal pair 1302. Thus, even when any battery cell 1309 is selected as the discharge battery cell group and the charge battery cell group, an electric charge can be transferred without any problems.

Furthermore, the use of OS transistors as the transistor 1310 and the transistor 1313 can reduce the amount of electric charge leaking from the battery cells 1309 which do not belong to the charge battery cell group or the discharge battery cell group. Accordingly, a decrease in capacity of the battery cells 1309 which do not contribute to charging or discharging can be suppressed. In addition, the variation in characteristics of the OS transistor due to heat is smaller than that of an Si transistor. Accordingly, even when the temperature of the battery cells 1309 is increased, an operation such as turning on or off the transistors in response to the control signals Si and S2 can be performed normally.

This application is based on Japanese Patent Application serial no. 2014-263238 filed with Japan Patent Office on Dec. 25, 2014, the entire contents of which are hereby incorporated by reference.

What is claimed is:

1. A method of manufacturing an electrode, comprising the steps of:
    placing an electrode into a first electrolytic solution comprising lithium, the electrode comprising an active material layer and a current collector;
    supplying a potential to the electrode while the first electrolytic solution is stirred;
    taking the electrode out of the first electrolytic solution after supplying the potential;
    surrounding a stack of the electrode, a separator and a counter electrode and a second electrolytic solution with an exterior material after supplying the potential; and
    sealing the exterior material after surrounding the electrode and the second electrolytic solution.

2. The method of manufacturing an electrode according to claim 1, wherein the first electrolytic solution comprises halogen.

3. The method of manufacturing an electrode according to claim 1, wherein the first electrolytic solution comprises fluorine.

4. The method of manufacturing an electrode according to claim 1, wherein the first electrolytic solution comprises fluorine and lithium.

5. The method of manufacturing an electrode according to claim 1, wherein an electrolyte of the first electrolytic solution comprises a perchlorate salt.

6. The method of manufacturing an electrode according to claim 1, wherein an electrolyte of the first electrolytic solution comprises at least one of lithium bis(trifluoromethylsulfonyl)imide, lithium bis(fluorosulfonyl)imide and lithium perchlorate.

7. The method of manufacturing an electrode according to claim 6, wherein the electrolyte of the first electrolytic solution further comprises lithium hexafluorophosphate or lithium tetrafluoroborate.

8. The method of manufacturing an electrode according to claim 1, wherein the first electrolytic solution comprises an aprotic organic solvent or an ionic liquid.

9. The method of manufacturing an electrode according to claim 8, wherein the aprotic organic solvent comprises at least one of ethylene carbonate and propylene carbonate.

10. The method of manufacturing an electrode according to claim 8, wherein the ionic liquid comprises an ethylmethylimidazolium cation or an N-methyl-N-propylpiperidinium cation.

11. A secondary battery comprising the electrode manufactured by the method according to claim 1.

12. An electronic device comprising:
the secondary battery according to claim 11; and
an antenna, an operation switch, a microphone or a speaker.

13. The method of manufacturing an electrode according to claim 1, further comprising the step of heating the electrolytic solution.

14. A method of manufacturing a secondary battery, comprising the steps of:
placing an electrode into a first electrolytic solution comprising lithium, the electrode comprising an active material layer and a current collector while the first electrolytic solution is stirred;
supplying a potential to the electrode to form a reaction product on at least one of the active material layer and the current collector;
taking the electrode out of the first electrolytic solution after supplying the potential;
forming a stack including the electrode, a separator and a counter electrode in an exterior body having an opening;
introducing a second electrolytic solution in the exterior body; and
closing the opening of the exterior body.

15. The method of manufacturing a secondary battery according to claim 14, wherein the first electrolytic solution is different from the second electrolytic solution.

16. The method of manufacturing a secondary battery according to claim 14, wherein the first electrolytic solution comprises halogen.

17. The method of manufacturing a secondary battery according to claim 14, wherein the first electrolytic solution comprises fluorine.

18. The method of manufacturing a secondary battery according to claim 14, wherein the first electrolytic solution comprises fluorine and lithium.

19. The method of manufacturing a secondary battery according to claim 14, wherein an electrolyte of the first electrolytic solution comprises perchlorate.

20. The method of manufacturing an electrode according to claim 1, further comprising the step of:
forming a reaction product on at least one of the active material layer and the current collector by supplying the potential.

21. The method of manufacturing an electrode according to claim 1, wherein supplying the potential is performed under an air atmosphere.

22. A method of manufacturing an electrode, comprising the steps of:
placing an electrode into an electrolytic solution comprising lithium, the electrode comprising an active material layer and a current collector;
supplying a potential to the electrode while the electrolytic solution is stirred;
taking the electrode out of the electrolytic solution after supplying the potential; and
processing the electrode into a first shape after taking the electrode out.

* * * * *